United States Patent
Shetler, Jr. et al.

(10) Patent No.: US 6,917,124 B2
(45) Date of Patent: Jul. 12, 2005

(54) UNINTERRUPTIBLE POWER SUPPLY

(75) Inventors: Russell Edward Shetler, Jr., Delaware, OH (US); Brian Paul Heber, Delaware, OH (US); Kevin Kim Eschhofen, Lewis Center, OH (US); Ramesh Subramanian, Irvine, CA (US); Nelson John Norris, Marengo, OH (US); Ronald Richard Rautenstrauch, Huntington Beach, CA (US); Jon Ross Funk, Lexington, OH (US); Kevin Jay Bell, Centerburg, OH (US); Suratkal Padmanabha Shenoy, Mission Viejo, CA (US); Terry Dwane Bush, Westerville, OH (US); Farzin Kafaipour, Rancho Santa Margarita, CA (US); Mohammad Nanda Rahmana Marwali, Lewis Center, OH (US); Andy Margraff, New Albany, OH (US)

(73) Assignee: Liebert Corporation, Columbus, OH (US)

( * ) Notice: Subject to any disclaimer, the term of this patent is extended or adjusted under 35 U.S.C. 154(b) by 476 days.

(21) Appl. No.: 10/007,273

(22) Filed: Oct. 26, 2001

(65) Prior Publication Data

US 2003/0048006 A1 Mar. 13, 2003

(Under 37 CFR 1.47)

Related U.S. Application Data

(60) Provisional application No. 60/244,005, filed on Oct. 27, 2000.

(51) Int. Cl.[7] .................................................. H02J 7/00

(52) U.S. Cl. ..................................... 307/66; 320/137

(58) Field of Search ................................. 320/137, 150, 320/114, 127, 128, 129, 134, 138; 307/64, 66

(56) References Cited

U.S. PATENT DOCUMENTS

| 5,920,189 A | 7/1999 | Fisher et al. ................. 324/115 |
| 6,274,950 B1 * | 8/2001 | Gottlieb et al. ............... 307/66 |

FOREIGN PATENT DOCUMENTS

EP          0 473 925 A2     3/1992     .......... H02M/3/156

OTHER PUBLICATIONS

Tzou Y. Y. et al., "Design and Implementation of a Multi-processor–based Uninterruptible Power Supply," Apr. 11–14, 1988, Proceedings of PESC '88, Power Electronics Specialists Conference, vol. 2, pp. 650–657, XP010070218 Kyoto (Japan).

Dhaussy P. et al., "Global Control Synthesis for an MIMD/FPGA Machine," FPGAS for Custom Computing Machines, 1994. Proceedings. IEEE Workshop on Napa Valley, CA, USA Apr. 10–13, 1994, Los Alamitos, CA, USA, IEEE Comput. Soc, Apr. 10, 1994, pp. 72–81.

International Search Report dated Nov. 15, 2002.

Moss, W.H., "What is a DeviceNet?", I & CS– Industrial and Process Control Magazine, Chilton Company. Radnor, PA, US, vol. 69, No. 12, Dec. 1, 1996, pp. 45–48, XP000721789.

(Continued)

Primary Examiner—Pia Tibbits
(74) Attorney, Agent, or Firm—Howrey Simon Arnold & White LLP

(57) ABSTRACT

An uninterruptible power supply is disclosed that includes a digital controller comprising a plurality of microprocessors. These microprocessors are programmed and arranged to provide various control features heretofore unavailable using analog controllers of the prior art.

21 Claims, 58 Drawing Sheets

OTHER PUBLICATIONS

Wong C. et al., "Adaptive Phase Control for Three Phase PWM AC–to–DC Converters With Constant Switching Frequency", Power Conversion Conference, 1993. Yokohama 1993., Conference Record of the Yokohama, Japan Apr. 19–21, 1993, New York, NY, USA, IEEE, US, Apr. 19, 1993, pp. 73–78, XP010056589.

Wall, R.W. et al., "Design and Microcontroller Implementation of a Three Phase SCR Power Converter", Journal of Circuits, Systems and Computers, World Scientific, London, GB, vol. 6, No. 6, Dec. 1996, pp. 619–633, XP008006403.

Shi–Liang Jung et al., "Discrete Feedforward Sliding Mode Control of a PWM Inverter for Sinusoidal Output Waveform Synthesis", Power Electronics Specialists Conference, PESC '94 Record., $25^{th}$ Annual IEEE Taipei, Taiwan Jun. 20–25, 1994, New York, NY, USA, IEEE, Jun. 20, 1994, pp. 552–559, XP010121201.

El–Bakry M.A. et al., "An UPS With Proper Crest Factor and Efficiency For Computer Loads", IECEC '97. Proceedings of the $32^{nd}$ Intersociety Energy Conversion Engineering Conference. Energy Systems, Renewable Energy Resources, Environmental Impact and Policy Impacts on Energy, Honolulu, HI, Jul. 27–Aug. 1, 1997, Intersociety Energy Convers, vol. 3 & 4, Jul. 27, 1997, pp. 1726–1731, XP010268850.

O'Mara, B.E., "Design and Fabrication of a Prototype ½ kW Smart Array Controller", IECEC '97. Proceedings of the $32^{nd}$ Intersociety Energy Conversion Engineering Conference. Energy Systems, Renewable Energy Resources, Environmental Impact and Policy Impacts on Energy, Honolulu, HI, Jul. 27–Aug. 1, 1997, Intersociety Energy Convers, vol. 3 & 4, Jul. 27, 1997, pp. 1569–1574, XP010268795.

O'Mara, B.E. "Smart Array Power Controllers: New DC PV System Design Element" Solar Energy Materials and Solar Cells, Elsevier Science Publishers, Amsterdam, NL, vol. 47, No. 1–4, Oct. 1, 1997, pp. 109–116, XP004099630.

Martins, A.P. et al., "A Control Method for High Power UPSs in Parallel Operation" Circuits and Systems, 1995., Proceedings., Proceedings of the $38^{th}$ Midwest Symposium on Rio de Janeiro, Brazil, Aug. 13–16, 1995, New York, NY USA, IEEE, US, Aug. 13, 1995, pp. 208–211, XP010165084.

* cited by examiner

Static Bypass Switch L-L Voltage

| Switch (0=OFF, i=ON) | | | Line to Neutral Voltage Vectors | | | | | Line to Line Voltage Vectors | | | | |
|---|---|---|---|---|---|---|---|---|---|---|---|---|
| $S_{C+}$ | $S_{B+}$ | $S_{A+}$ | $V_{AN}$ | $V_{BN}$ | $V_{CN}$ | $V=[V_{QS}\ V_{DS}]^T$ | Vector | $V_{AB}$ | $V_{BC}$ | $V_{CA}$ | $V=[V_{QS}\ V_{DS}]^T$ | Vector |
| 0 | 0 | 1 | $2/3\ V_{dc}$ | $-1/3\ V_{dc}$ | $-1/3\ V_{dc}$ | $2/3\ V_{dc} \angle 0°$ | $\vec{V}_1$ | $V_{dc}$ | 0 | $-V_{dc}$ | $2/\sqrt{3}\ V_{dc} \angle -30°$ | $\vec{V}_1$ |
| 1 | 0 | 1 | $1/3\ V_{dc}$ | $-2/3\ V_{dc}$ | $1/3\ V_{dc}$ | $2/3\ V_{dc} \angle 60°$ | $\vec{V}_2$ | $V_{dc}$ | $-V_{dc}$ | 0 | $2/\sqrt{3}\ V_{dc} \angle 30°$ | $\vec{V}_2$ |
| 1 | 0 | 0 | $-1/3\ V_{dc}$ | $-1/3\ V_{dc}$ | $2/3\ V_{dc}$ | $2/3\ V_{dc} \angle 120°$ | $\vec{V}_3$ | 0 | $-V_{dc}$ | $V_{dc}$ | $2/\sqrt{3}\ V_{dc} \angle 90°$ | $\vec{V}_3$ |
| 1 | 1 | 0 | $-2/3\ V_{dc}$ | $1/3\ V_{dc}$ | $1/3\ V_{dc}$ | $2/3\ V_{dc} \angle 180°$ | $\vec{V}_4$ | $-V_{dc}$ | 0 | $V_{dc}$ | $2/\sqrt{3}\ V_{dc} \angle 150°$ | $\vec{V}_4$ |
| 0 | 1 | 0 | $-1/3\ V_{dc}$ | $2/3\ V_{dc}$ | $-1/3\ V_{dc}$ | $2/3\ V_{dc} \angle 240°$ | $\vec{V}_5$ | $-V_{dc}$ | $V_{dc}$ | 0 | $2/\sqrt{3}\ V_{dc} \angle 210°$ | $\vec{V}_5$ |
| 0 | 1 | 1 | $1/3\ V_{dc}$ | $1/3\ V_{dc}$ | $-2/3\ V_{dc}$ | $2/3\ V_{dc} \angle 300°$ | $\vec{V}_6$ | 0 | $V_{dc}$ | $-V_{dc}$ | $2/\sqrt{3}\ V_{dc} \angle 270°$ | $\vec{V}_6$ |
| 0 | 0 | 0 | 0 | 0 | 0 | 0 | $\vec{V}_7$ | 0 | 0 | 0 | 0 | $\vec{V}_7$ |
| 1 | 1 | 1 | 0 | 0 | 0 | 0 | $\vec{V}_8$ | 0 | 0 | 0 | 0 | $\vec{V}_8$ |

FIG. 20

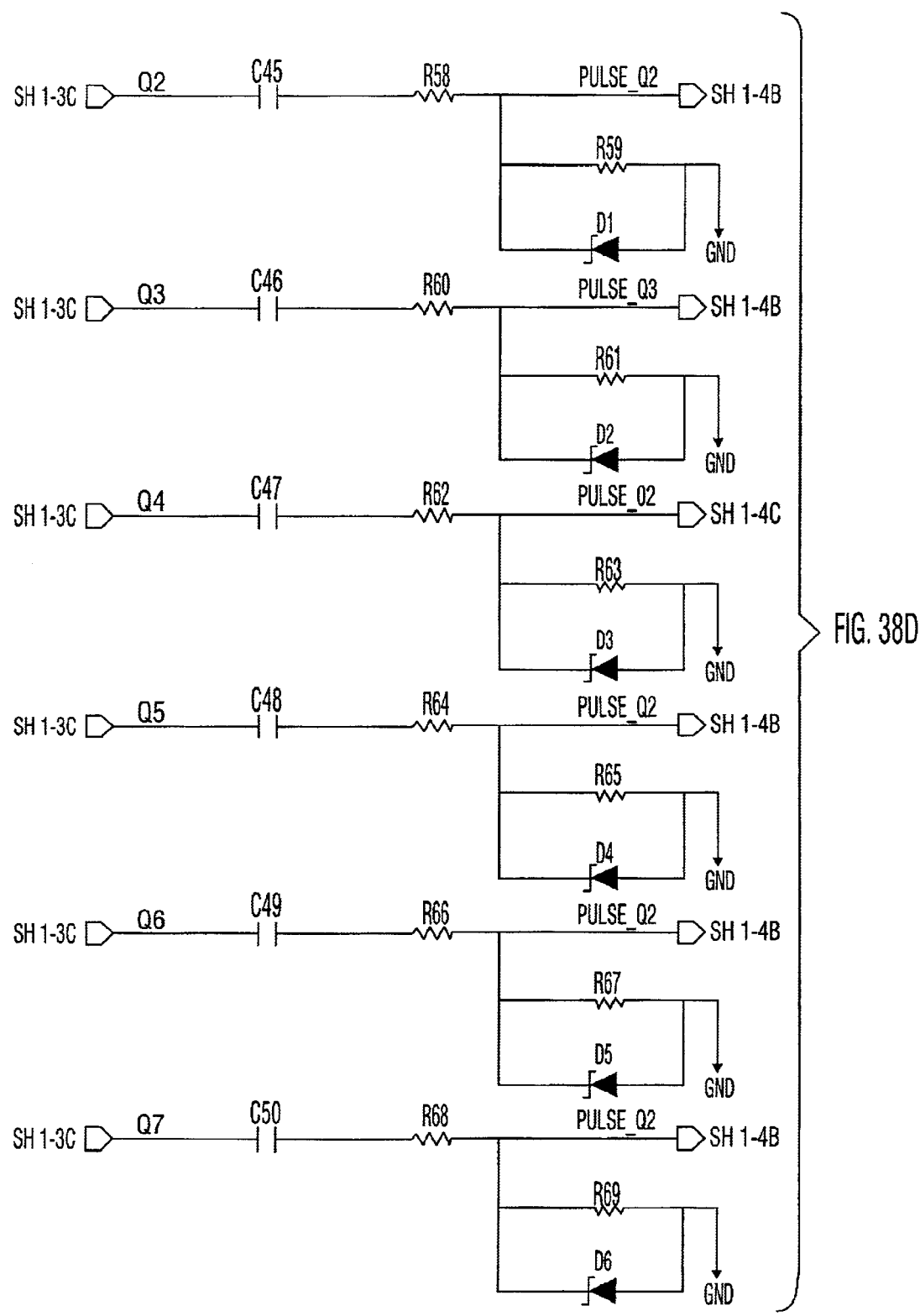

UNINTERRUPTIBLE POWER SUPPLY

CROSS REFERENCE TO RELATED APPLICATION

This application claims the benefit of U.S. Provisional Application Ser. No. 60/244,005, filed Oct. 27, 2000.

BACKGROUND OF THE INVENTION

The present invention relates to uninterruptible power supplies, and, in particular, the control of uninterruptible power supplies. Historically, uninterruptible power supplies have relied on traditional analog control techniques, which are limiting in the level of control that can be provided and in the aspects of the uninterruptible power supply's operation that can be controlled. Accordingly, what is needed in the art is an uninterruptible power supply featuring digital control, which allows greater flexibility and more precise control of the uninterruptible power supply.

SUMMARY OF THE INVENTION

In one aspect the present invention is directed to an uninterruptible power supply comprising a controlled rectifier a battery an inverter and a control system. The control system is coupled to the controlled rectifier and the inverter, as well as other uninterruptible power supply components. The control system comprises three microprocessors, with the first microprocessor functioning as an overall controller, the second microprocessor controlling the rectifier, and the third microprocessor controlling the inverter. In another aspect of the invention, the three microprocessors communicate via a common global memory. This common global memory is facilitated by a memory arbitration circuit that allows priority-driven, non-preemptive access by the microprocessors to the common global memory.

In another aspect of the present invention, the various components of the UPS are connected by a peer-to-peer controller area network that accommodates fragmented messaging.

In still another aspect of the present invention the uninterruptible power supply includes a battery monitoring circuit that allows a single sensor to be used despite the wide disparity in dynamic range between the battery charging current and the battery discharging current. The battery monitoring circuit includes a current sensor disposed to monitor the battery current, with a first amplifier circuit receiving an output from the current sensor corresponding to discharging battery current and a second amplifier circuit receiving an output from the current sensor corresponding to a charging battery current. The two amplifier circuits amplifying the received current signal by a relatively smaller factor for the relatively larger discharging current and by a relatively larger factor for the relatively smaller charging current respectively. The digital control system then selects the appropriate amplifier's output as its input depending upon whether the battery is charging or discharging.

In yet another aspect of the present invention, the digitally controlled UPS having a three-phase input features independent zero-crossing detection circuits for each input phase. The zero-crossing detection circuits are used to synchronize the firing of the controlled rectifier to the input voltage. The rectifier control microprocessor independently determines a phase shift introduced by each zero cross detection circuit and adjusts the firing signal timing for each rectifier phase to negate the phase shift.

Still another aspect of the present invention allows the second microprocessor of the uninterruptible power supply to change the firing sequence of the rectifier to compensate for a phase rotation of the three-phase input. In yet another aspect of the present invention, the second microprocessor qualifies the input voltage by measuring the voltage on a first phase of said three-phase input, the frequency on a second phase of said three-phase input, and the phase sequence between either said first phase or said second phase and a third phase of said three-phase input. In another aspect of the present invention the second microprocessor implements a phase lock loop for synchronizing rectifier firing. The phase lock loop includes a finite impulse response filter on the input voltages, thereby removing low frequency harmonics from the input signal.

In another aspect of the invention-relating to control of the inverter, the third microprocessor implements a nested control loop having an inner loop and outer loop. The inner loop regulates inverter current using a discrete sliding mode controller, and the outer loop regulates the inverter voltage using a harmonic servomechanism controller.

In another aspect of the invention relating to control of the rectifier, there is a method of controlling the output of the controlled rectifier. The method includes, sensing the voltage on the DC bus at the rectifier's output, comparing the sensed voltage to a voltage setpoint, increasing or decreasing the rectifier firing angle to minimize a difference between the sensed voltage and the voltage setpoint, and determining whether an input current of the rectifier or a charging current of the battery is above a predetermined limit; and, if so, switching control to a different control loop to maintain the input current or the charging current within the predetermined limit. In implementing this method, it is beneficial to pre-load the integrator of the different control loop when switching to a different control loop to prevent a discontinuity in an output signal of the different control loop. It is also advantageous to include a non-linear element in the control loop to improve the response to a step change in the applied load.

In another aspect of controlling the rectifier, it is also advantageous to gradually increase the voltage setpoint on startup to softly start the rectifier and avoid undesirable startup transients. Additionally, the voltage setpoint is selected to cause a particular charging current to flow into said battery, and the setpoint may be selected from a plurality of different values to vary the charging rate. The voltage setpoint may selected to cause zero charging current to flow into said battery. Finally, voltage setpoint may be selected as a function of battery temperature.

In still another aspect of the present invention, a technique is disclosed for operating a plurality of uninterruptible power supplies in parallel. The method includes controlling real power sharing between the uninterruptible power supplies by adjusting the relative phase angles of the generated voltages. Reactive power sharing is achieved by relative adjustment of the amplitude of the voltage generated by each uninterruptible power supply. Harmonic current sharing among the uninterruptible power supplies is achieved by shifting the poles of the harmonic controller to reduce the bandwidth for the controller corresponding to the harmonic, thereby increasing the impedance to that harmonic.

BRIEF DESCRIPTION OF THE DRAWINGS

FIG. 13 is not used.

FIG. 20 is a table illustrating the inverter switching states and corresponding output voltages for the inverter illustrated in FIG. 19.

FIG. 34 is not used.

DESCRIPTION OF ILLUSTRATIVE EMBODIMENTS

I. UPS Topology

Figure 1:
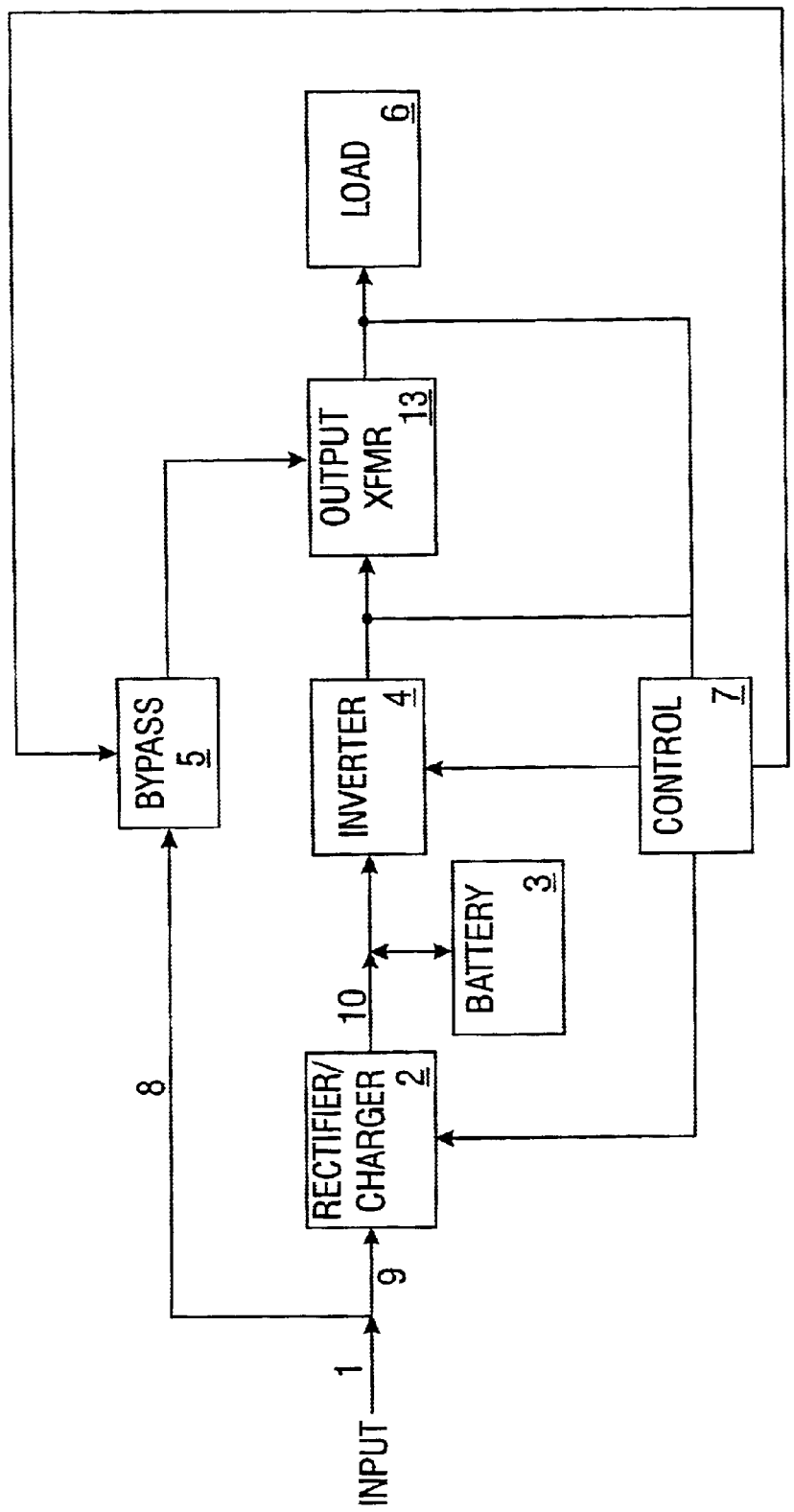
FIG. 1 is a block diagram of an uninterruptible power supply in accordance with the present invention.

An uninterruptible power supply ("UPS") in accordance with the present invention is illustrated in FIG. 1. The UPS includes the rectifier/charger 2, battery 3, DC bus 10, inverter 4, bypass switch 5, control module 7, and output transformer 13. Under normal operating conditions, alternating current ("AC") power is supplied at the input 1. The AC power follows the first power path 9 to the rectifier/charger 2. The rectifier/charger 2 converts the incoming AC voltage to a direct current ("DC") voltage. This DC voltage is supplied to battery 3 to charge the battery. The DC voltage is also supplied to the DC bus 10, which powers inverter 4. Inverter 4 converts the supplied DC voltage to an AC voltage that is then supplied to the load 6 via the output transformer 13.

If one of the UPS components fails or if the UPS power rating is insufficient to power load 6, power flows from the input 1, along a second power path 8, to bypass switch 5. Bypass switch 5 is closed, enabling power flow directly from input 1 to load 6 via the output transformer 13. If the normal AC power source fails, battery 3 provides power to the DC bus 10. Inverter 4 takes DC power from bus 10, converts it to AC power, and supplies it to the load 6 via the output transformer 13.

Control system 7 controls the rectifier/charger 2, inverter 4, and bypass switch 5. Control system 7 monitors the input and output voltages and currents and controls the rectifier to charge the battery and regulate the DC bus voltage. The control system is discussed in greater detail below.

Figure 2:
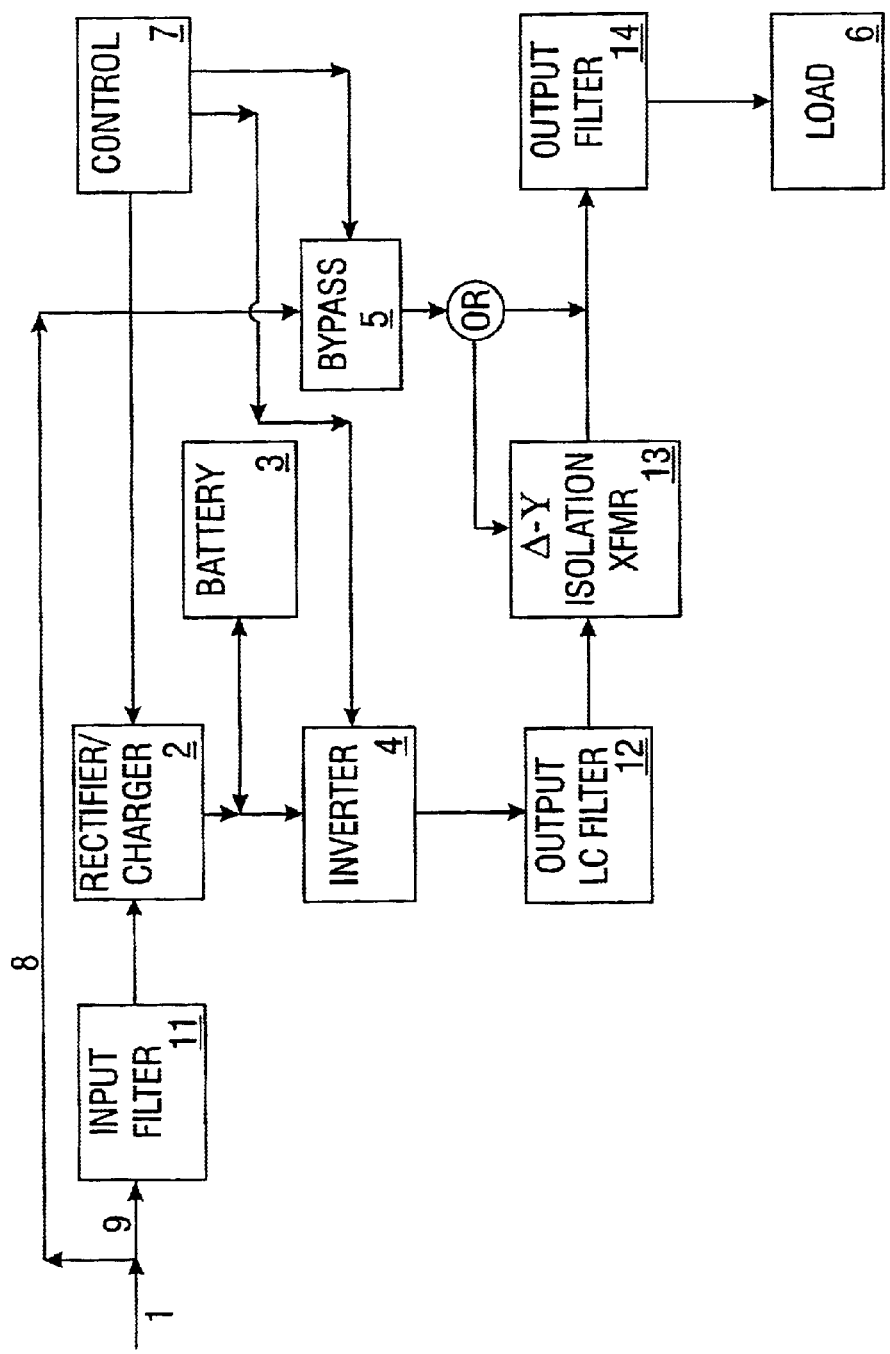
FIG. 2 is an expanded block diagram of an uninterruptible power supply in accordance with the present invention

A preferred embodiment of the UPS of the present invention is illustrated in FIG. 2. Input filter 11 has been inserted along first power path 9 before rectifier/charger 2. This input filter reduces the THD of the AC power supplied at input 1. Input filter 11 is a 10% harmonic trap filter. The design construction of such filters is known to those skilled in the art. The filter includes a three-phase input filter inductor. The first terminals of said inductor are connected to the AC input lines, and the second terminals are connected in parallel with a trap inductor and a trap capacitor connected in a second order low pass LC filter arrangement. The output of input filter 11 is connected to the input of rectifier/charger 2.

The preferred UPS embodiment shown in FIG. 2 further includes an output LC filter 12 connected to the output of inverter 4. This output filter reduces the distortion of the power waveform supplied to load 6. Output LC filter 12 is a three-phase, second order LC filter that eliminates high frequencies from the voltage generated by inverter 4. Construction and implementation of such filters is well known in the art.

The preferred UPS embodiment further includes an isolation transformer 13 connected at the output of LC filter 12. This transformer provides electrical isolation between critical load 6 and the UPS. Isolation transformer 13 is preferably a three-winding delta-wye isolation transformer, but other transformer designs may also be used.

An output filter 14 is also included in the preferred UPS embodiment illustrated in FIG. 2. This output filter serves to further reduce distortion in the voltage waveform at the output of isolation transformer 13. Output filter 14 is preferably a three-phase capacitor connected across output windings of isolation transformer 13. The capacitor in combination with the leakage inductance of the transformer operates as a second order low pass filter. The output of filter 14 is connected between isolation transformer 13 and load 6.

Major components of the UPS will now be discussed in greater detail.

A. Power Circuitry

1. Rectifier

Rectifier/charger 2 is a phase fired, six-pulse rectifier. The rectifier comprises three pair of series connected SCRs, i.e., a six-pulse rectifier. Optionally, the UPS of the present invention may include a twelve-pulse rectifier. Use of a twelve-pulse rectifier design improves the total harmonic distortion ("THD") reflected back on the AC input lines. Those skilled in the art are familiar with the design and implementation of such rectifiers. The purposes of the rectifier are to provide a stable DC bus and to maintain the battery's charge.

All rectifier control is accomplished by controlling the firing angle of the rectifier SCRs. The required phase information is derived using a digitally-implemented zero cross detector. An alternate method of deriving the phase information is by use of a digitally implemented phase lock loop (PLL). In either case, each phase of the rectifier is controlled independently. Both of these methods are discussed in greater detail below.

Control of the rectifier firing angle controls the DC bus voltage under the direction of control system 7. The rectifier controls the incoming AC current to produce an acceptable voltage on the DC bus 10, provided that the AC input voltage is at least −20% and less than +15% of the nominal AC voltage. If the supplied AC voltage is outside this range, power is drawn from the battery to make up the difference between the output power and input power. If the incoming line voltage decreases below the acceptable tolerance, the control system increases the firing angle of the SCRs to draw the maximum possible power from the incoming AC line. The control system will continue to increase the SCR firing angle until the incoming line current reaches the rectifier input current limit or the firing angle is fully on.

On startup, the rectifier controls the DC bus voltage in a technique known as battery walk-in. Battery walk-in is used to prevent transient battery currents when the UPS is started. During UPS startup, the DC bus voltage is lowered to match the battery voltage. After the battery is connected to the DC bus by closing the battery circuit breaker, the DC bus voltage is slowly increased to begin battery charging.

The rectifier also charges the battery. Charging is controlled by regulating the DC bus voltage, the DC bus voltage being a function of the rectifier firing angle. The battery charging current is directly related to the difference between the DC bus voltage and the battery voltage. By keeping the DC bus voltage relatively constant the battery may be charged with a current that has minimal ripple and other transient components. Eliminating ripple and transients from the battery current prolongs battery life by preventing the negative electrochemical reactions within the battery that are associated with a non-constant charging current.

The rectifier has three different charging modes. A slower ("battery saver") charging mode requires a longer time to fully charge the battery, but prolongs battery life. The battery saver charging mode sets a lower value for the battery current limit, which has a corresponding lower DC bus voltage. A faster ("turbo") charging mode keeps the battery charged with minimal charging time, but fast charging causes negative electrochemical reactions in the battery that shorten battery life. The faster charging mode sets a higher value for the battery current limit, which corresponds to a higher DC bus voltage. A more detailed discussion of the battery current limit and its effect on DC bus control is discussed below in conjunction with the rectifier control processor.

The rectifier may also implement delayed charging. Delayed charging is used when the AC input source has a limited amount of power available, e.g., a standby generator. Prior art UPS systems that charge from the DC bus have typically inhibited charging by using a mechanical contact to isolate the battery from the DC bus. The mechanical contact in such systems is typically actuated by an external source, such as a run indication from a standby generator. In the UPS of the present invention, charging is inhibited by lowering the DC bus voltage to match the battery voltage so that no charging current flows into the battery. The rectifier and inverter are designed so that a DC bus voltage equal to the minimum battery voltage is sufficient for the inverter to deliver full power at full voltage to the critical load. Advantages of this system include providing a reduced number of components that are subject to failure and prolonging battery life by using the walk-in procedure discussed above to slowly change the battery current.

Battery charging implemented is also temperature compensated by the control system. As the temperature increases above 25 degrees C., the charging current that can be supplied without damaging the battery decreases. To compensate for temperatures above 25 degrees C., the control system decreases the battery charging current limit, which in turn decreases the DC bus voltage by decreasing the rectifier firing angle. Details of the control system implementation of temperature compensated battery charging are discussed below.

2. Inverter

Inverter 4 is a three-phase "bridge type" pulse width modulated ("PWM") inverter. Those of skill in the art are familiar with the design and construction of such inverters. Each pole or phase of the inverter is constructed from two series-connected insulated gate bipolar transistors ("IGBTs"). The inverter uses a space vector PWM technique, which will be discussed below.

Figure 19:
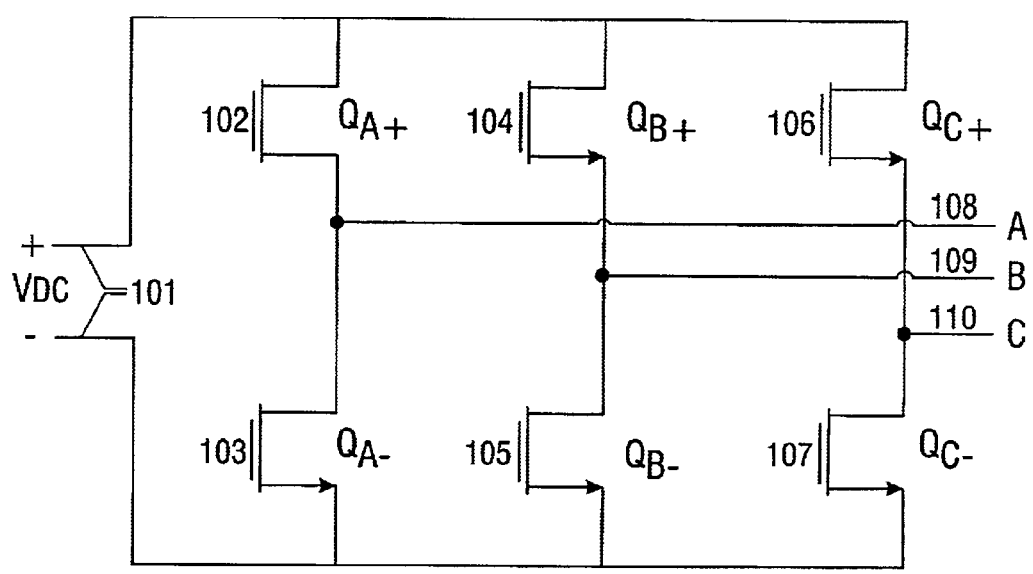
FIG. 19 is a simplified schematic of an inverter for use in a UPS according to the present invention.

A simplified schematic diagram of the three phase voltage source inverter used in the UPS of the present invention is illustrated in FIG. 19. A DC input voltage is supplied at the input terminals 101. A three phase output voltage is generated on output terminals 108, 109 and 110. The output voltage is generated by switching of transistors 102–107. Transistors 102 and 103 form a totem-pole transistor pair for phase A, transistors 104 and 105 form a totem-pole pair for phase B, and transistors 106 and 107 form a totem-pole pair for phase C. The transistors of each totem-pole pair are always in opposite states, e.g., if transistor 102 is on, transistor 103 is off, if transistor 104 is on, transistor 105 is off, etc. Because the transistors operate in complimentary pairs, there are eight possible switching states for the inverter. The eight switching states and corresponding output voltages are illustrated in FIG. 20. The technique for manipulating these switching states to produce the desired output voltage is discussed in greater detail below.

3. Bypass Switch

Bypass switch 5 is a static switch comprised of six SCRs with contactors at the input and output of the semiconductor switch. Each pole of the static switch is a single back-to-back SCR module comprising two SCRs. Each pair of SCRs is driven by an independent drive circuit on the static switch driver board, discussed below.

The bypass switch provides a means to quickly connect the bypass source to the output load. The UPS system can automatically turn on the bypass switch if any abnormal conditions are detected that may jeopardize the quality of the power supplied to the load. The bypass switch can also be turned on and paralleled with the inverter to supplement power to the load in the event of a large transient overload. Furthermore, the bypass switch provides a means to connect an alternate source (bypass source) to the load thus allowing the inverter source to be isolated and disabled for servicing.

B. Control Circuitry

1. Control Architecture

Figure 3:
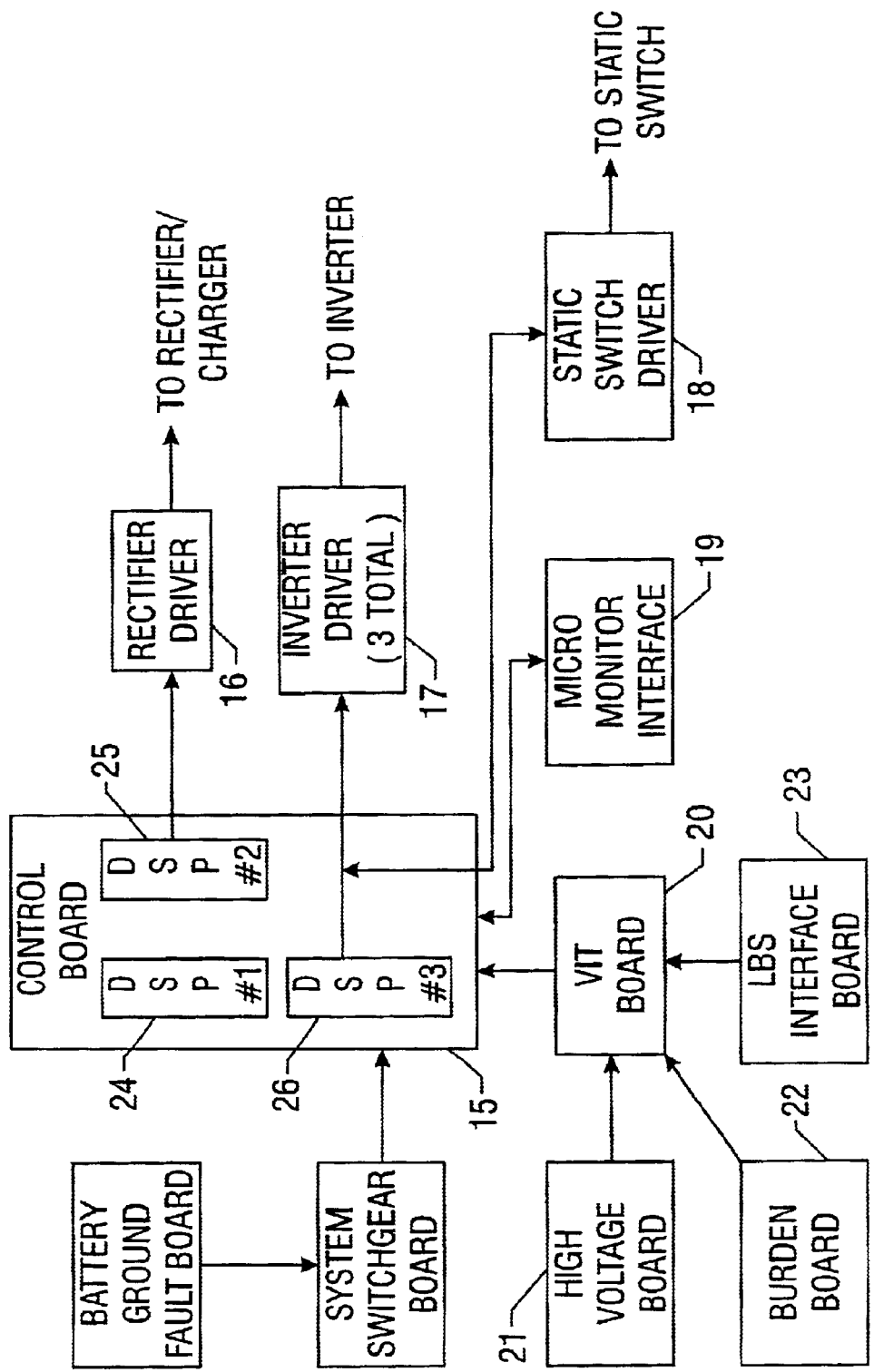
FIG. 3 is an expanded block diagram of an uninterruptible power supply and uninterruptible power supply control system in accordance with the present invention.

An expanded diagram of the UPS control system 7 is illustrated in FIG. 3. Control system 7 comprises: control board 15; rectifier driver board 16; inverter driver board 17; static switch driver board 18; Micro Monitor user interface 19; voltage current and temperature ("VIT") board 20; high voltage board 21; burden board 22; and general purpose board 23.

a) Control Board

Control board 15 interfaces with Micro Monitor interface 19 to provide a user interface to the UPS. Control board 15 also interfaces with static switch driver 18 to control bypass switch 5. Control board 15 receives measured values required for UPS control from VIT board 20. VIT board 20 receives signals representing the system voltages after they are attenuated by high voltage board 21. The current signals required by control board 15 are supplied to VIT board 20 by burden board 22, which interfaces with the current transformers ("CT") used for AC current measurement at various points in the system. VIT board 20 also receives inputs from general purpose board 23.

Control board 15 is central point control system 7 where all control is performed. Control board 15 includes three digital signal processors ("DSPs") that perform all control computations for the UPS. The first DSP is the Comms DSP 24. The Comms DSP controls high level system functions including monitoring and communications. The second DSP is Rectifier DSP 25. The Rectifier DSP controls rectifier/charger 2. is The third DSP is Inverter DSP 26. The Inverter DSP controls inverter 4 and bypass 5. The three processors pass data among themselves through a global random access memory ("RAM"). Details of the global memory management are discussed below.

The Comms DSP also controls high level system functions, including monitoring, and communications. The Comms DSP also performs all metering functions and controls status and alarm signals. The Comms DSP controls the battery circuit breaker and startup/shut down of the UPS. The Comms DSP handles the exchange of status, configuration and diagnostic information externally and internally to the control board. Externally, the Comms DSP exchanges information via a Controller Area Network ("CAN") bus, a service terminal interface and discrete I/O lines. Status and diagnostic information communicated through the UPS includes contactor position sensing, fan operational sensing, fuse status sensing, over temperature sensing, metering data (voltage, current, etc.), control data, and UPS operational status. Control information includes system commands (on, off, transfer, retransfer, etc.), contactor actuation signals, breaker actuation signals, and fan control.

Control system initialization is also performed by the Comms DSP. When the UPS is started, the Comms DSP clears global memory, retrieves system configuration settings from nonvolatile memory and coordinates system configuration with the Micro Monitor user interface. The configuration information is then relayed to the Rectifier and Inverter DSPs, and the Comms DSP will signal each DSP to start executing the control programs and begin operating the UPS.

The Comms DSP also coordinates systematic shutdown of the UPS. Manual shutdown requests come from the Micro Monitor user interface. In addition to manual actuation, various full or partial shutdown sequences may occur as a result of events or alarms in the UPS. Events that can cause a shutdown include: timing or sanity errors, over temperature, overload, complete battery discharge, and component failures. For a given shutdown sequence, the main objective is to attempt to continue supplying quality power to the load while maintaining a safe operating condition by isolating failed devices or out-of-tolerance system parameters. After shutdown, the Comms DSP tracks status and configuration information to determine whether the machine should be restarted manually by the user (cold start of the machine) or automatically (for example, once AC is power is restored after a complete battery discharge).

The Comms DSP also services system level hardware watchdog timer. If the Comms DSP fails to update this watchdog timer within a specified period, the hardware watchdog timer will reset the control board and signal the bypass static switch control board to transfer the load to bypass, thereby preventing critical load interruption.

The Comms DSP also controls a real time clock for the UPS. The real time clock can be set via the service terminal or the Micro Monitor user interface. Time and date information is used for event time-stamping. An event log is kept by the Comms DSP and is stored in nonvolatile memory. A copy of this log may be transferred to the Micro Monitor user interface for review and analysis.

Other logging includes the history log. The history log contains system status information recorded at specified intervals, such as RMS input voltage, output voltage, output current, machine status information, etc. The history log also includes parameters collected for development purposes. Its data represents conditions before, during, and after a fault condition occurs to be used for further analysis of the failure, if necessary. A fast transient analysis (FTA) log may also be stored in non-volatile RAM. The time interval for the FTA log is much shorter than the history log interval time.

The Comms DSP also interfaces to non-volatile RAM for storing configuration data. Configuration data is downloaded to the Comms DSP from the Micro Monitor user interface. This data includes operating set points and ramp rates, derating factors, and system configuration parameters.

b) SCR Driver Board

Figure 5:
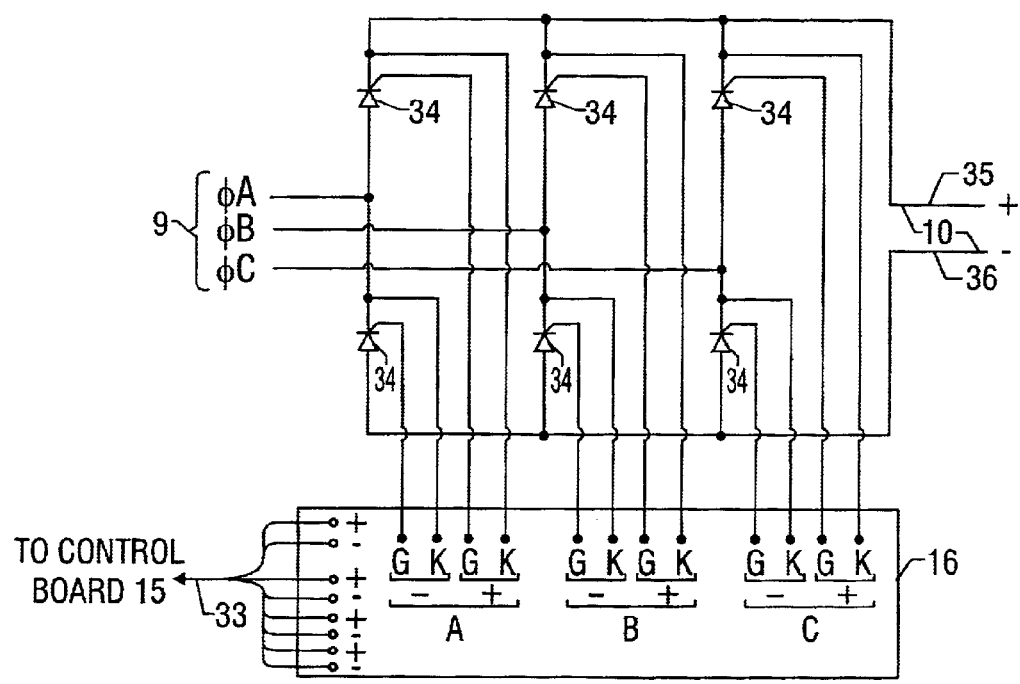
FIG. 5 is a schematic diagram of the rectifier/charger and controller therefor used in the uninterruptible power supply of the present invention.

Another component of the UPS control system is the rectifier SCR driver board 16. FIG. 5 illustrates SCR driver board 16 and its connections to rectifier/charger 2 and control board 15. As noted above, the rectifier is a six-pulse rectifier comprised of six SCRs 34. The input to rectifier/charger 2 comes from the first power path 9 connected to the AC input 1 (not shown). The output of the rectifier connects to DC bus 10, which includes positive DC bus leg 35 and negative DC bus leg 36.

SCR driver board 16 has twelve connections to the rectifier/charger 2. Each SCR has its gate and cathode (denoted in the figure) connected to the SCR driver board. SCR driver board 16 also interfaces with control board 15. The connection between the SCR driver board and the control board is by way of sixteen conductor cable 33. The ribbon connector is shrouded, polarized, and has long ejection latches. Gold plated posts are used for improved signal integrity. The connections from the rectifier SCR driver to the SCRs are made via fast-on type terminals. Two of the wires in cable 33 bring 24 VDC power from the control board to the SCR driver board. The remaining connections in cable 33 are the SCR bipolar drive signals. Each SCR has its own independent signal. The control board supplies the SCR controller with 24 VDC power. The SCR driver board includes linear regulating power supplies to derive the +15V and +5V supplies used for SCR control.

c) Inverter Driver Board

Turning again to FIG. 3, another UPS control system component is the inverter IGBT driver board 17. The inverter driver board, actually comprises three IGBT driver boards, each of which drives one pole of the three-phase inverter. As noted above, each inverter pole comprises a pair of IGBTs. Each IGBT driver board contains two independent driver circuits, each driving a single IGBT. Each IGBT drive circuit uses an optically isolated driver integrated circuit that meets the regulatory isolation requirements for a nominal 540 $V_{DC}$ system. The connections between the control board and the inverter driver board are made with 10-wire twisted pair ribbon cables.

The three IGBT driver boards interface directly with the control board. The control board provides the necessary control signals and a regulated power supply. The interface to the control board is made via a 10 wire twisted pair ribbon cable. The ribbon cable is terminated with a locking insulation displacement connector with integral strain relief. The mating half of the connector on the IGBT driver board is shrouded header with long locking ears. The connector provides the unregulated control power and driver signals to this board. The IGBT driver board interfaces to the individual IGBT devices via fast-on type terminals.

The inverter drive signals from the control board are bipolar drive signals. The drive signal provides 16 mA in both the on and off condition. In the event of a power supply failure, the driver circuit defaults to the off state. The IGBT drive pulse frequency is determined by the switching frequency of the inverter (between 2 kHz and 3 kHz).

The IGBT driver board receives its control power from the control board. The control power is a regulated +24 VDC source. The driver board includes an on board DC-DC converter that provides isolated power to the IGBT driver circuits. The on board DC-DC converter operates at approximately 100 kHz to generate +24 VDC that powers the IGBT drives. A control voltage for the logic devices is +5 VDC derived from the +24 VDC using a linear regulator. The power requirement for the IGBT board is approximately three watts.

d) Static Switch Driver Board

Figure 6:
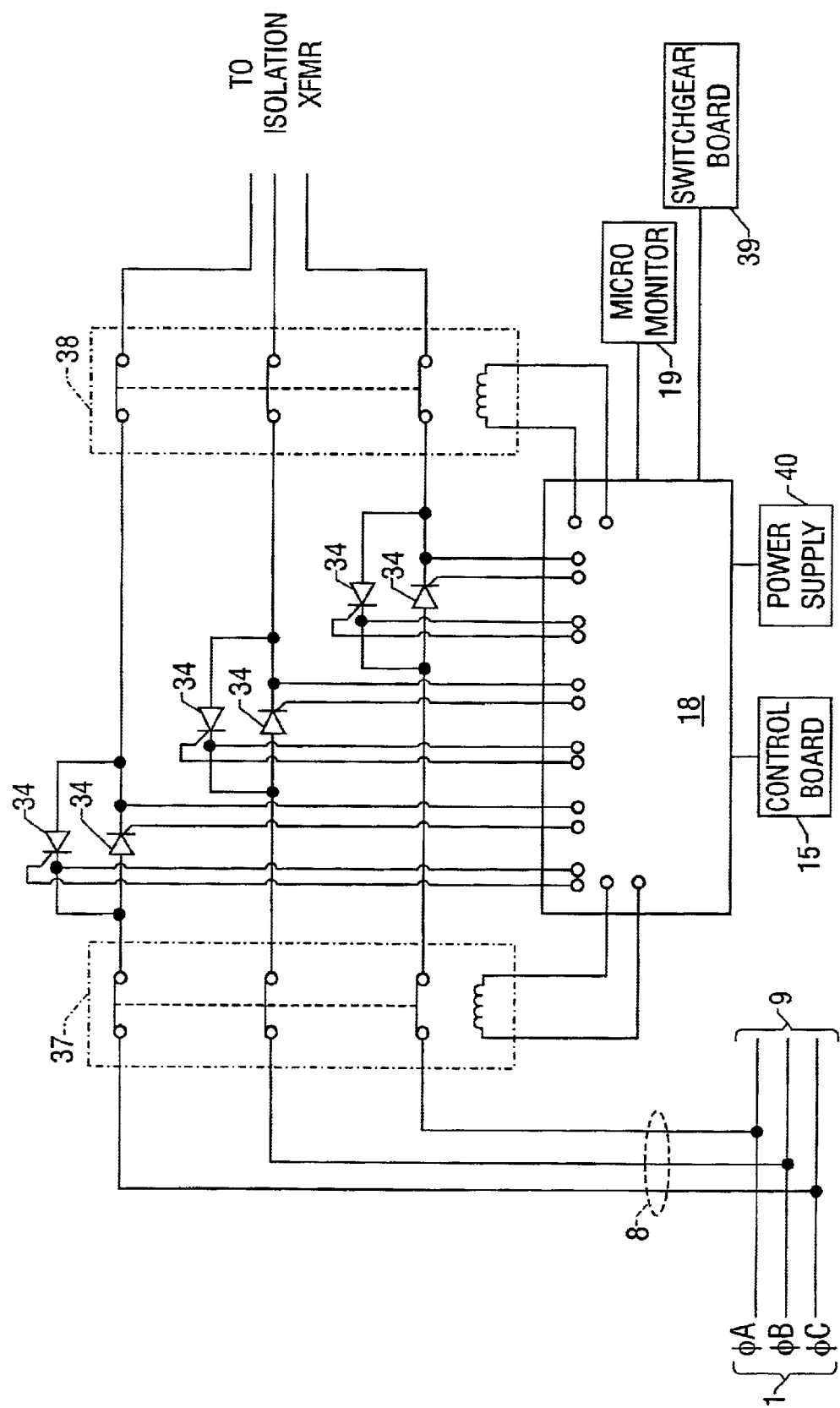
FIG. 6 is a schematic diagram of the static switch and controller therefor used in the uninterruptible power supply of the present invention.

Another control system component is the static switch driver board 18. The connection for static switch driver board 18 is illustrated in FIG. 6. Input power from AC input 1 branches into two power paths. First power path 9 provides power to rectifier/charger 2. Bypass power path 8 proceeds through "line" bypass contactor 37, to bypass static switch 5 through "load" bypass contactor 38 to isolation transformer 13. Bypass switch 5 is comprised of six SCRs 34. There are two SCRs per phase connected in an anti-parallel configuration. The static switch driver board connects to the gate and cathode of each bypass static switch SCR. Each SCR is simultaneously controlled to permit power flow along the bypass power 8 path if the UPS fails.

The static switch control board also controls "line" bypass contactor 37 and "load" bypass contactor 38, which are both closed when the bypass is activated to permit current flow through bypass switch 5.

The static switch driver board also interfaces to the micro-monitor interface 19, system switchgear board 39, control power supply 40, and control board 15. The static switch driver board is configured so it will independently transfer the UPS operation to bypass if the control board fails.

The static switch driver board is the interface between the control board and the power carrying devices (contactors and SCRs) in the UPS bypass path. Under normal operation the static switch driver board operates the static switch through commands issued by the control board. However, the static switch driver board is also designed to independently transfer the UPS to bypass if the control board malfunctions or fails to communicate with the static switch driver. Under this fault condition the static switch driver board initiates a latched transfer to bypass to prevent power interruption to the load. In the latched bypass mode, the UPS can return to normal operation only after user intervention. The static switch driver logic prevents transfer to bypass if the bypass AC input voltage is outside the acceptable range.

The static switch driver board controls three isolated back-to-back SCR modules (six SCRs) located in the internal AC bypass line of the UPS. The static switch driver board includes six isolated drive circuits, each of which controls a single SCR. The gate drive signals are generated from 25% duty factor, 13 kHz internal clock. Pulse transformers in the drive circuits isolate the low voltage logic from the high AC voltage present on the SCRs. Besides driving the SCRs, the static switch driver board also drives the coils of two contactors located on either side of the static switch. These contractors are defined as the "line" and "load" bypass contactors.

Besides the control board, the static switch driver board also interfaces with the power supply board, the Micro Monitor user interface and the system switchgear board. Interface to the static switch SCRs is provided via fast-on type terminals. There are twelve fast-on terminals on the static switch driver board to facilitate connection to the three back-to-back SCR modules (6 SCRs). Interface to the contactor coils is accomplished via a 4 pin friction lock header. This four pin connector controls the coil of two bypass contactors. Each contactor accepts two wires. Interface to the Micro Monitor user interface is made via a two pin spacing friction lock headers. These signals provide status information to the Micro Monitor user interface regarding the static switch driver board. These signals interface with the Micro Monitor user interface via an optical coupler located on the Micro Monitor user interface. Interface to the system switchgear board is made via a friction lock, four position header. Two wires (signal and return) on the connector carry status information from the static switch driver board to the system switchgear board. The remaining two wires on the connector carry the control power for the pulse transformers used on the SCR drive circuitry and the FETs that drive the bypass contactor coils. Though these signals are strictly used by the static switch driver board to provide power to the pulse transformers and the bypass contactor FETs, they are routed through a normally closed contact on the switchgear board. The contact and its associated logic at the switchgear board disable the control power to the SCR drives and the contactor coils when the emergency power off is initiated or when the static switch is disabled through the LBS option. The static switch driver board also interfaces to the power supply board via a 10 position friction lock header. Twenty-four volts DC is used exclusively to power the contactor coils. The static switch driver logic disables the contactors and inhibits the SCR drives if the bypass power supply voltage is not within the acceptable range. The power supply board also communicates the status of the 24 VDC power to the static switch driver board via a digital signal. The power supply board also provides control power supply for the static switch driver board, from which the +12 VDC and +5 VDC are derived for the static switch driver logic.

e) Micro Monitor User Interface

Figure 4:
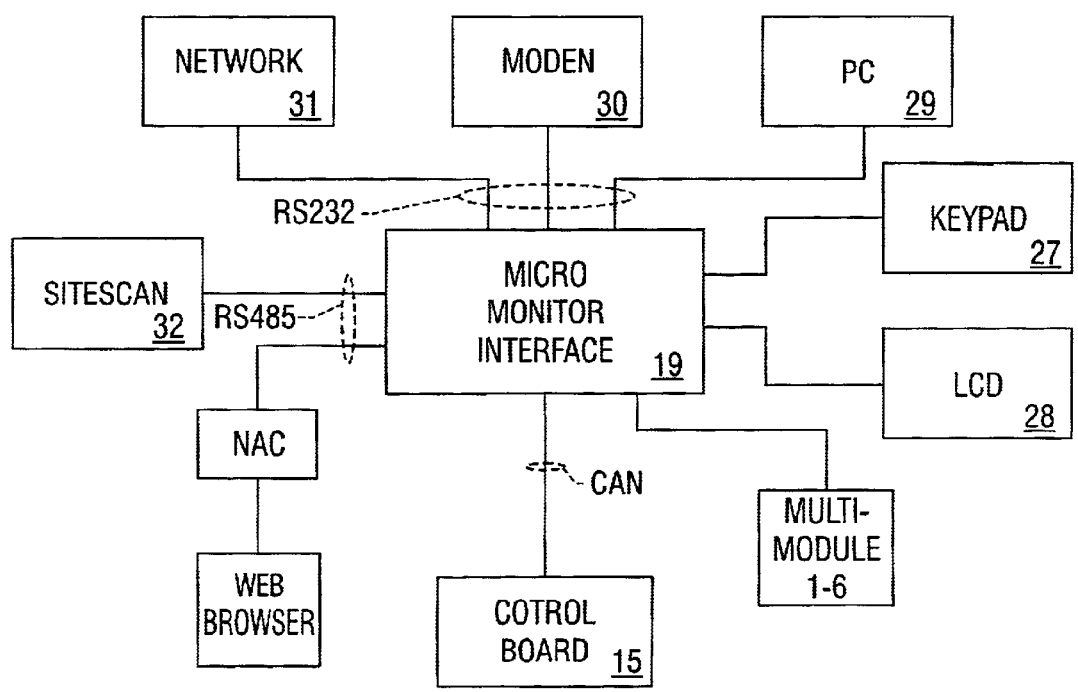
FIG. 4 is a block diagram of the Micro Monitor uninterruptible power supply interface system.

The Micro Monitor user interface provides the user interface for the UPS system. A diagram of the Micro Monitor interface system is shown in FIG. 4. Micro Monitor interface 19 communicates with the user by way of keypad 27 and LCD screen 28. The Micro Monitor interface may also communicate with other devices such as a personal computer 29, a modem 30, or a computer network 31 by means of RS232 communication ports. Micro Monitor interface board 19 also includes an RS485 connection for the SITES-CAN™ network system 32. The final connection to Micro Monitor interface board 19 is a controller area network ("CAN") connection to control board 15. This provides internal communications with the control board from the Micro-Monitor user interface 19.

The main function of the Micro Monitor is to provide a user interface. Detailed UPS parameters and alarm statuses are available to the user through a graphics LCD. Another function of the Micro Monitor is to communicate these parameters to external devices for local and remote monitoring. The Micro Monitor may be used in three configurations: (1) single module system, (2) system control cabinet, and (3) multi-module unit. All configurations use the same bare board. The Micro Monitor is designed with a 16 bit AMD processor that is an 80186 derived architecture. The processor has built in glue logic and built in dual asynchronous UART.

f) Voltage Current and Temperature Sensor Board

Figure 7:
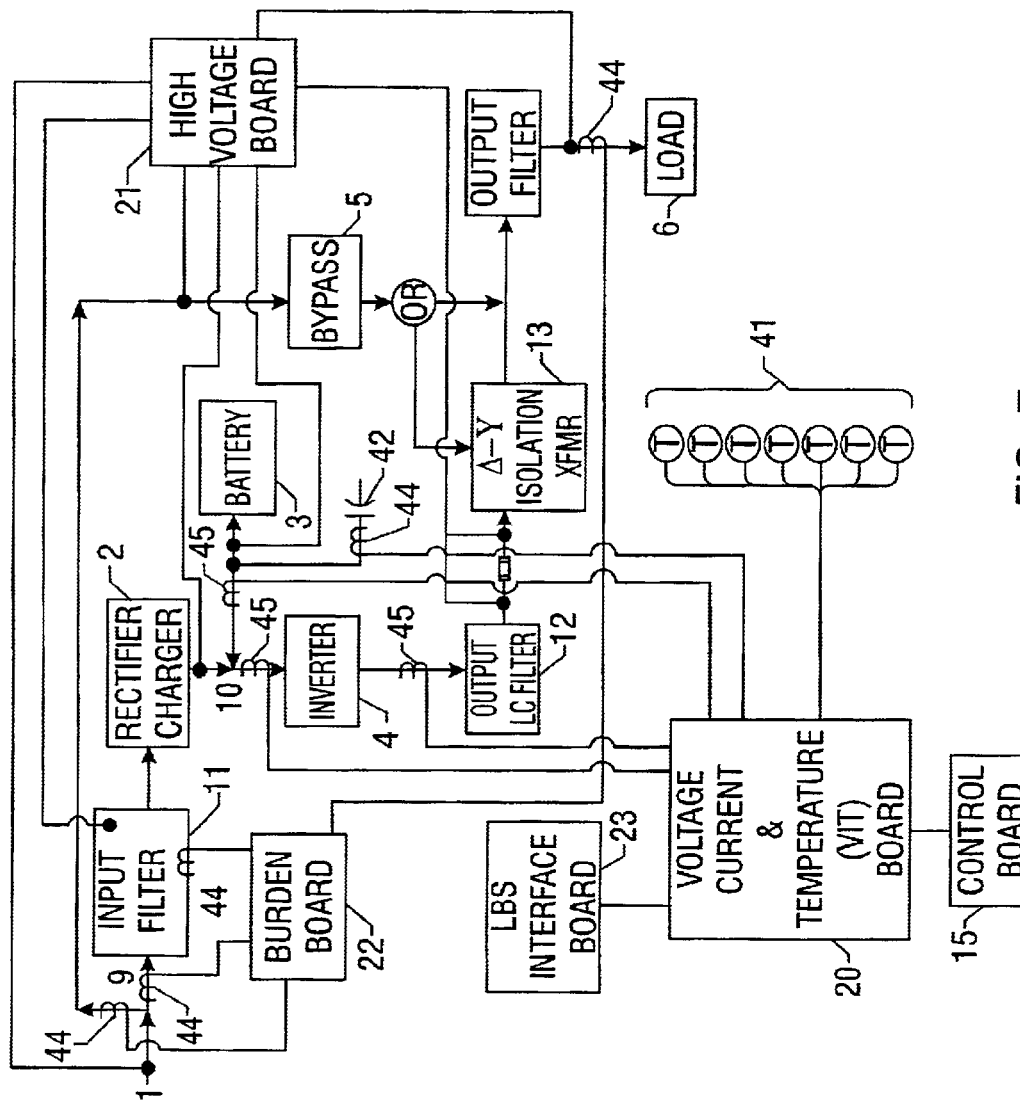
FIG. 7 is a block diagram of the uninterruptible power supply of the present invention showing sensor locations and connections.

Another UPS control system component is the voltage current and temperature ("VIT") sensor board 20. The purpose of the VIT board is to condition analog voltage, current and temperature signals to levels suitable for analysis by the UPS control board. The various VIT board connections are illustrated in FIG. 7.

The VIT board also includes seven temperature inputs 41. These temperature inputs measure three heat sink temperatures throughout the system, the inlet air temperature, the battery cabinet temperature, and the exhaust air temperature. A spare temperature sensor input is also provided. The VIT board processes the temperature signals to levels suitable for processing by control board 15.

The VIT board also includes Hall effect current sensors for measuring certain DC currents in the system. The DC currents measured are the rectifier output current (on dual rectifier UPSs only), the battery current (the same sensor is used for measuring charge and discharge current), and the inverter output current (all three phases). The VIT board also measures the current through DC capacitor 42.

The VIT board interfaces with a control power supply that provides 24 VDC power. The control power interface is made indirectly via the control board, which conditions the 24 VDC to provide +/−12VDC and 5VDC for the VIT board. VIT board 20 is also connected to LBS Interface board 23 for control of the optional load bus synchronizing system.

The signals from the VIT board are converted to a digital format on the control board via simultaneous sampling analog to digital (A/D) converters. The simultaneous sampling A/D converters allow the three phase voltages and currents used by the control to be measured at the same moment in time. This sampling technique simplifies and improves the accuracy of the control by eliminating measurement delay between the sampled signals.

g) High Voltage Board

The VIT board also interfaces with high voltage board 21. The high voltage board attenuates system voltages to levels suitable for processing by the VIT board and the control board. The high voltage board limits its outputs to no more than 40 volts peak. Voltages measured by the high voltage board include: (1) voltage at AC input 1, (2) voltage at input harmonic filter 11, (3) voltage on bypass current path 8, (4) DC output voltage of rectifier/charger 2, (5) battery voltage 3, (6) inverter input voltage 4, (7) output LC filter voltage 12, (8) output filter fuse voltage 13, and (9) UPS output voltage.

h) Burden Board

The burden board interfaces all the current transformers ("CTs"), used to measure AC currents' to the VIT board. Each burden board input is a CT 44. Burden board inputs include the current along the first power path 9 and the current at the output 6. Both the input and output currents are three-phase currents, although the input current may be measured using only two CTs. Connection between the VIT board and the burden board is made via a twenty-wire ribbon cable. The burden board provides terminating resistors for the CTs. The resulting voltage signals are routed to the VIT board via the 20 pin ribbon cable connector. After conditioning by the VIT board, the signals are routed to the control board for processing by the DSP controllers.

i) Miscellaneous Boards

Turning again to FIG. 3, another control system component is LBS Interface board 23, which provides load bus synchronization for parallel UPS operation. The UPS control system also includes the sharing board. The sharing board is provided as an interface and allows for load sharing between multiple UPS units. Connections between the control board and the sharing board are made by both discrete wire connections and controller area network ("CAN") connections. Another UPS control system component is the system switchgear board. The system switchgear board performs various control and monitoring functions for various UPS components.

2. Communications

The CAN bus is a peer to peer communications bus with message fragmentation. The (11 bit) CAN identifier is divided into sections. The first bit is reserved for future use. The second through fifth bits are used to identify the message class, and the final six bits are used to specify the Source MAC ID.

Messages are put into different classes. Besides helping to determine the message type, the message class determines the importance/priority of the messages. Each node in a system has a unique (6 bit) MAC ID. The MAC ID is used to identify the node for which a message originated or the destination of a message. The most important node or nodes that perform critical functions should be assigned the lowest MAC IDs, making these nodes higher in priority. By putting the source MAC ID into the CAN ID, message collisions can be avoided when another node transmits a message having the same message class. The message from the higher priority board will take control of the CAN bus.

The CAN protocol makes use of part of the data block for control information. The data block configuration is illustrated in the table below. Within that data block is the destination MAC ID, service code, any fragmentation information (if required) and any related data. The MAC ID and Service Code bytes comprise the CAN data block header.

| | | | | Contents | | | | |
|---|---|---|---|---|---|---|---|---|
| Byte | 7 | 6 | 5 | 4 | 3 | 2 | 1 | 0 |
| 0 | Frag | N/U | | Destination MAC ID | | | | |
| 1 | Rs/Rq | | | Service Codes | | | | |
| 2 | | | | Data (LB) | | | | |
| 3 | | | | Data (HB) | | | | |
| 4 | | | | Data (LB) | | | | |
| 5 | | | | Data (HB) | | | | |
| 6 | | | | Data (LB) | | | | |
| 7 | | | | Data (HB) | | | | |

Frag (Fragment) Bit: This bit is used to indicate whether this message is a piece of a larger fragmented message. If the bit value is zero, the message is not fragmented, meaning that the message is an entire CAN message. If the frag bit value is one, the message is part of a larger fragmented message.

Destination MAC ID: This ID is the intended destination of the message. By using the Destination MAC ID, a message transmission can be addressed to a specific node on the CAN bus. In other words nodes should only receive messages with a matching Destination ID. The only other message ID a node should receive is a Broadcast message. Broadcast messages are those messages that are received by all nodes on the CAN bus. To signify that a message is a Broadcast message and meant for global consumption, the Destination ID needs to be 0x3F.

Rs/Rq (Response/Request) Bit: This bit indicates whether this message is a response to a message or a request for information. If the bit value is zero, the message is a request. If the bit value is one the message is a response.

Service Codes: This field indicates the message function within the message Class. These codes will be defined below.

Data: For integer values the low byte of the integer will be transmitted first data byte followed by the high byte of the integer.

3. Control Sequencing

The Comms DSP plays a key role in UPS startup operations, accepting startup commands from the Micro Monitor user interface, supervising the necessary steps within the UPS, and confirming to the Monitor whether the startup step completed successfully. Initial startup is performed by the user, who has the option of issuing each startup command individually based on prompts from the Micro Monitor, known as "manual startup" mode. Alternately the user may select the "automatic startup" mode which self-sequences the startup steps without any further user intervention. After the initial startup, the Comms DSP may also initiate "auto restarts" after certain recoverable shutdowns. For example, if a power outage lasts long enough to completely discharge the batteries, the UPS will be shut down. But when source power is restored the UPS will automatically restart and begin powering the load and recharging the batteries again.

Figure 8:
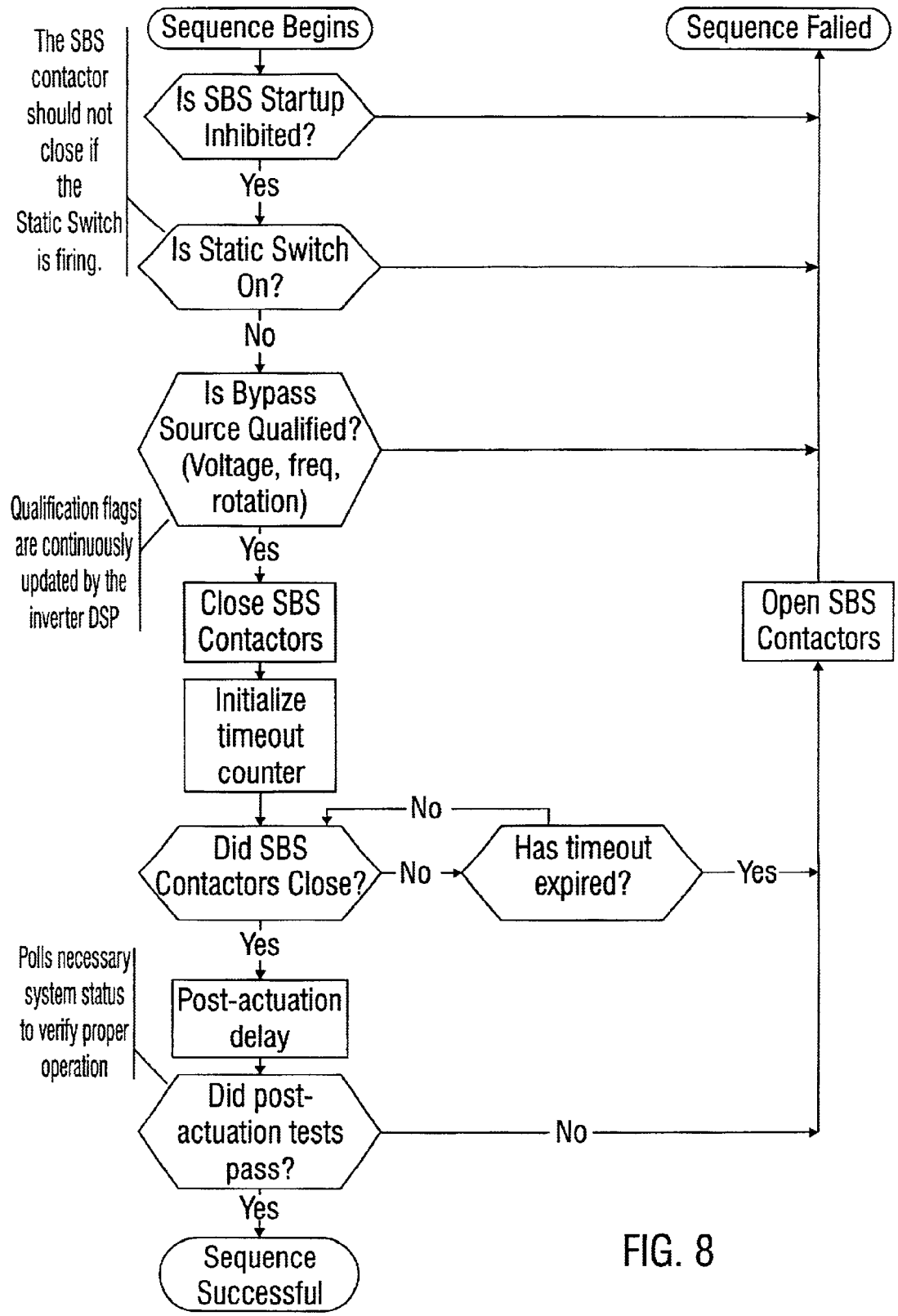
FIG. 8 is a flow chart illustrating the static switch contactor startup process used in the uninterruptible power supply of the present invention.
Figures 1, 8A:
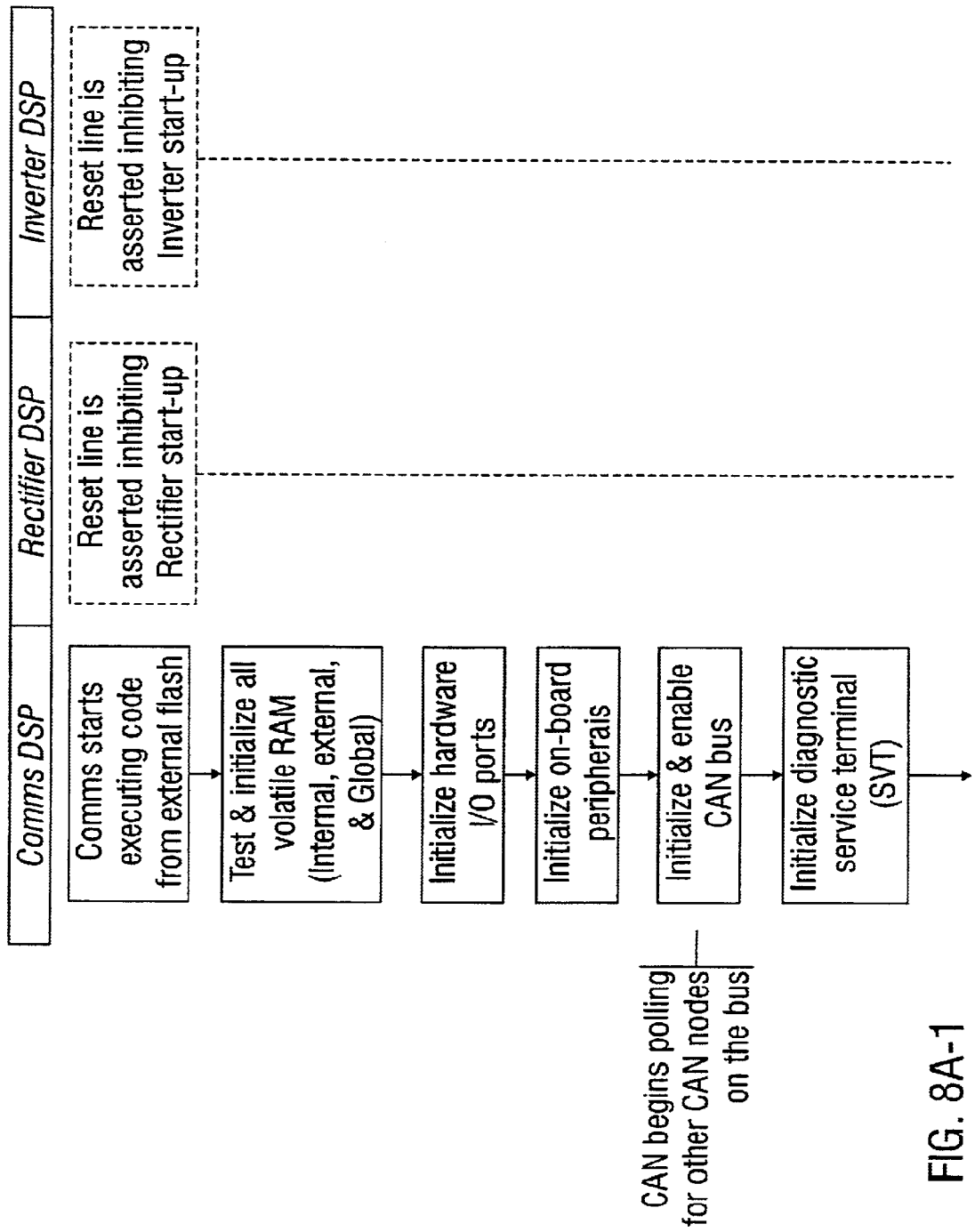
FIG. 8a is a flow chart illustrating the DSP startup sequence used in the uninterruptible power supply of the present invention.
Figures 2, 8A:
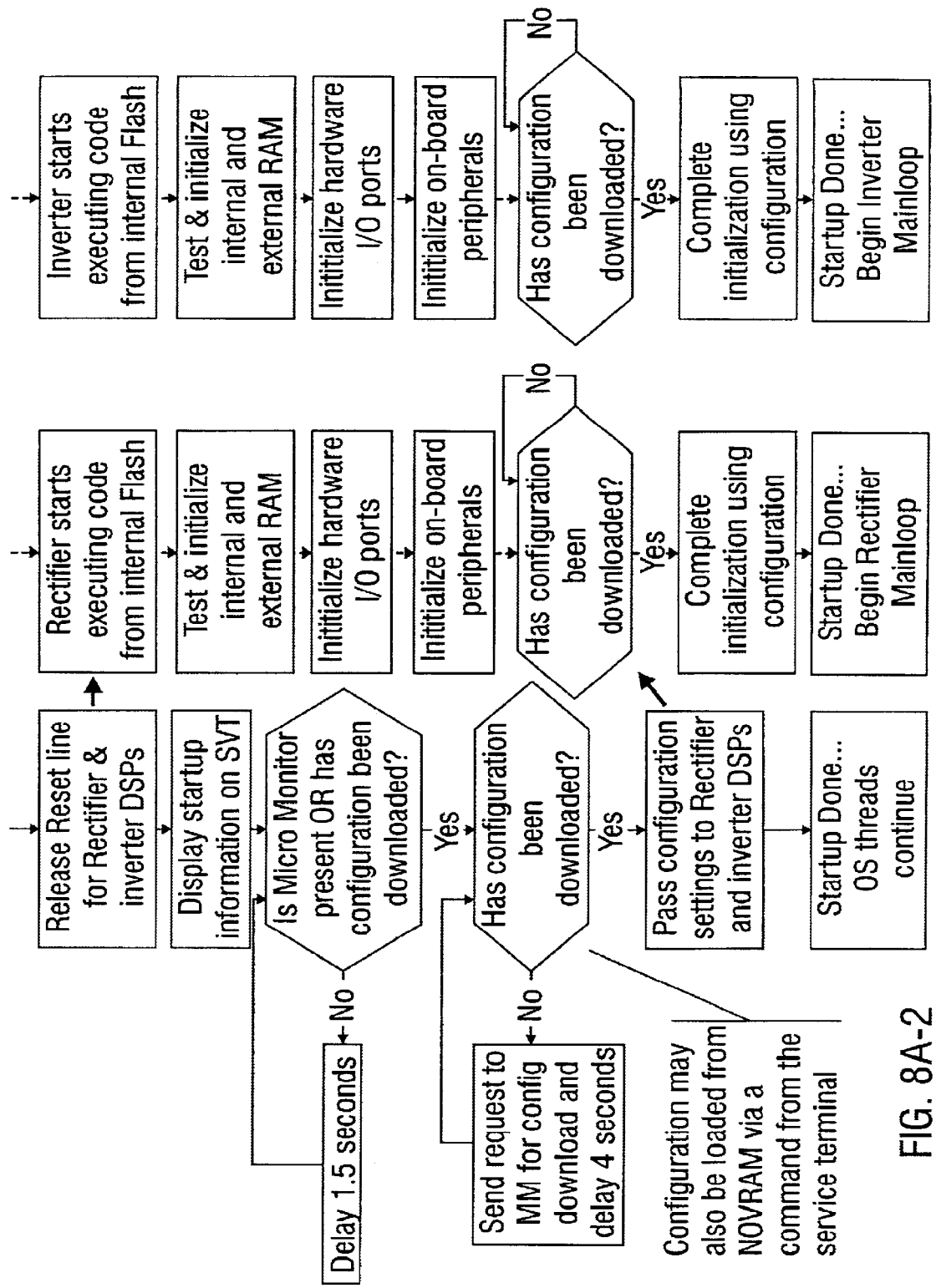

Control system initialization is performed by the Comms DSP as depicted in FIG. 8a. When the UPS control system is powered up, the Comms DSP initializes its local internal and external memory as well as the shared global memory. It then configures and initializes ites internal peripherals and input/output ports. The Comms DSP starts polling for other active nodes on the CAN communications bus, primarily looking for the presence of the Micro Monitor user interface. If the Micro Monitor is present, the Comms DSP asks it to download the system configuration settings. If the Micro Monitor is not present or does not send the requested settings, the user may instead load the most recent configuration settings stored in the unit's nonvolatile memory; this is accomplished via a command from the diagnostic service terminal. The configuration information is then relayed to the Rectifier and Inverter DSPs whereupon they each start executing their control programs and begin operating the UPS. Starting the UPS system requires the following steps: (1) closing the static bypass switch contactors; (2) turning on the static bypass switch; (3) closing the input contactors; (4) starting the rectifier; (5) activating the input filter; (6) starting the inverter; (7) starting the battery; and (8) transferring the load to the UPS.

A flow chart illustrating the process of closing the static bypass switch contactors is illustrated in FIG. 8. To begin, the Comms DSP verifies that startup of the static bypass switch is not inhibited by an existing fault condition (for example, the static switch driver power supply has failed. If startup is inhibited, the UPS startup process is terminated. If startup is allowed, the Comms DSP then checks whether the static switch SCRs are firing. Closing the bypass contactors while the SCRs are firing could cause undesirable current transients. If the SCRs are active, contactor closure is disallowed, a failure is indicated, and the UPS startup process is terminated. If the SCRs are not firing, the Comms DSP then verifies that the bypass power source is qualified (i.e., has acceptable voltage, frequency and phase rotation). If the bypass source is not qualified a failure is indicated and the UPS startup process is terminated. If the bypass source is qualified, the Comms DSP issues the command to close the bypass contactors. This command is sent to the static switch driver board, which then interfaces with the contactors.

After a short actuation delay, the Comms DSP checks the bypass contactor status signal returned by the system switchgear board. If the contactors did not close, a failure is indicated, a signal is sent to reopen the contactors, and the UPS startup process is terminated. If the contactors successfully closed, a short delay is initiated, allowing the Comms DSP to test for abnormal bypass operation. If an error is detected, the bypass contactors are reopened and the UPS startup process is terminated. If the qualification test passes, the startup procedure may continue.

Figure 9:
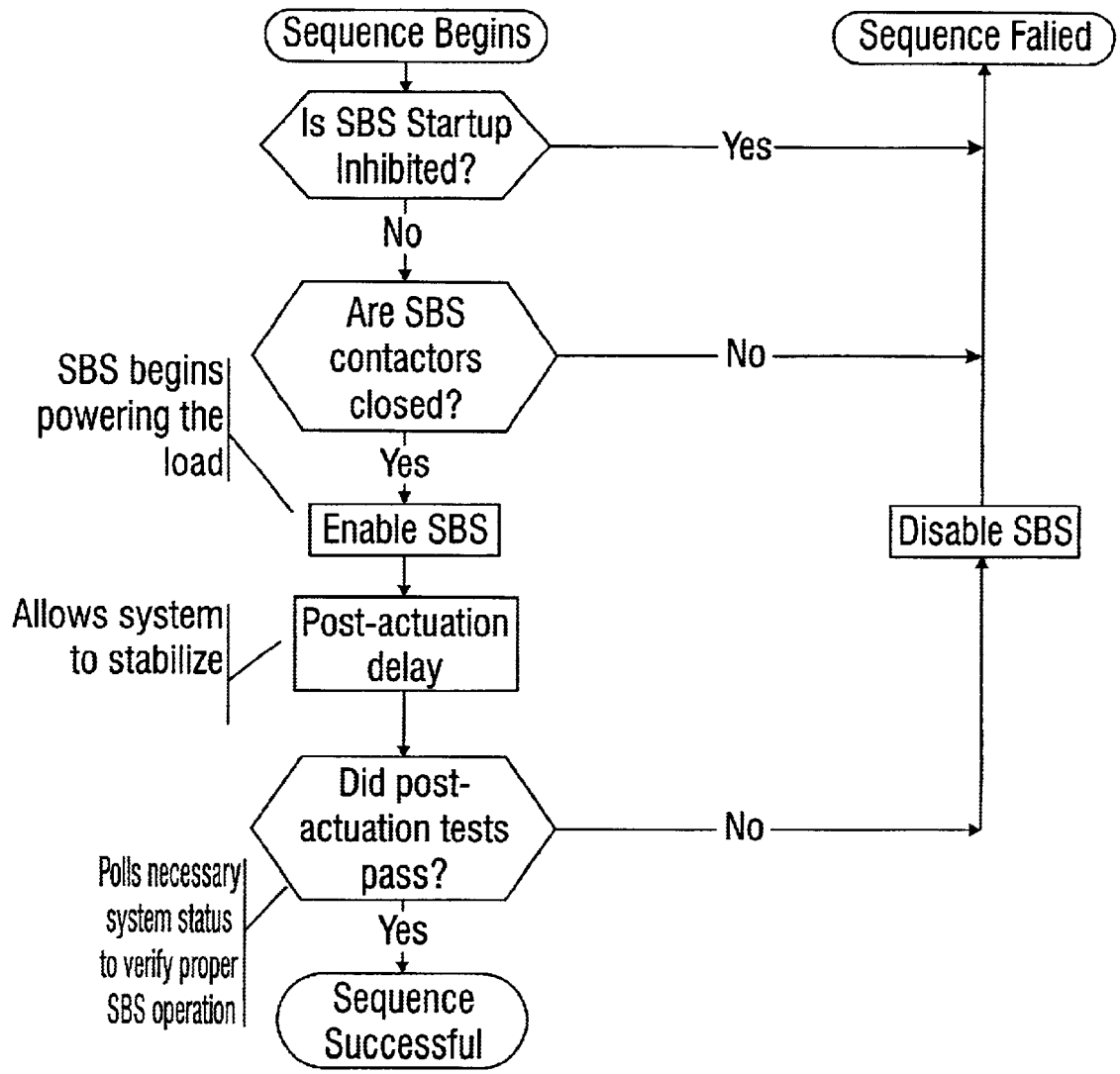
FIG. 9 is a flow chart illustrating the static switch startup process used in the uninterruptible power supply of the present invention.

The second step in the UPS restart sequence is starting the static bypass switch. A flow chart illustrating this process is provided in FIG. 9. To begin, the Comms DSP verifies that startup of the static bypass switch is not inhibited by an existing fault condition. If startup is inhibited, the UPS startup process is terminated. Otherwise, the Comms DSP then verifies that the bypass contactors are still closed. If the bypass contactors are open, a failure is indicated and the UPS startup process is terminated. If the bypass contactors are still closed, the Comms DSP issues a command to the Inverter DSP to begin firing the static switch SCRs. After a short delay, the Comms DSP checks the bypass status signals returned by the Inverter DSP to verify the bypass is operating properly. If a failure is indicated, the bypass SCRs are turned off, a failure is indicated, and the UPS startup sequence is terminated. If there is no bypass failure indicated, the restart sequence continues with closing the input contactor.

Figure 10:
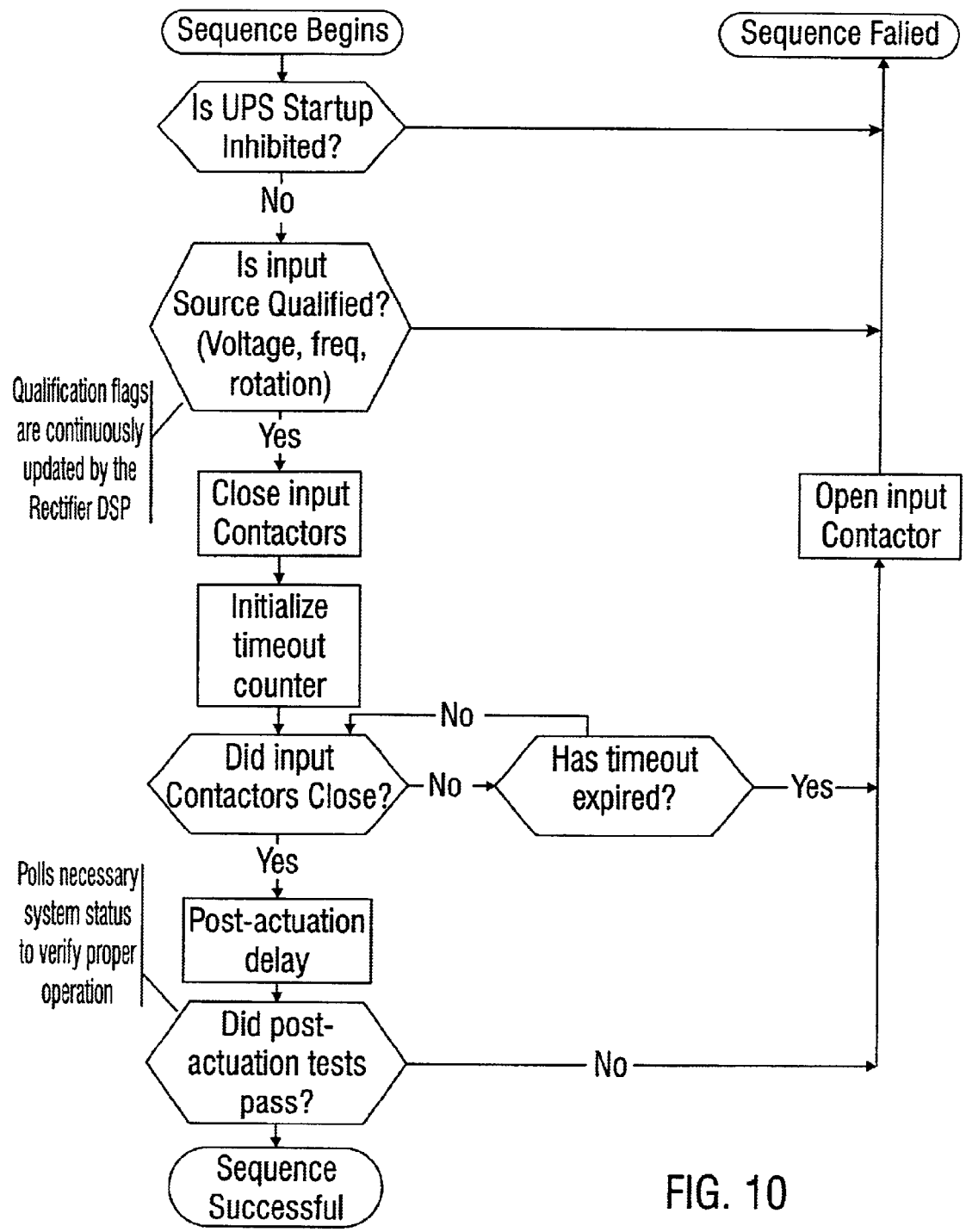
FIG. 10 is a flow chart illustrating the input contactor startup process used in the uninterruptible power supply of the present invention.

A flow chart illustrating the procedure for closing the input contactor is illustrated in FIG. 10. To begin, the Comms DSP verifies that startup of the UPS is not inhibited by an existing fault condition. If startup is inhibited the UPS startup process is terminated. If startup is not inhibited, the Comms DSP then verifies that the UPS input power source is qualified (i.e. has acceptable voltage, frequency and phase rotation.) If the input source is not qualified a failure is indicated and the UPS startup process is terminated. If the input source is qualified, the Comms DSP issues the command to close the input contactor. This command is sent to the static switch driver board, which then interfaces with the contactor.

After a short delay, the Comms DSP checks the input contactor status signals returned by the system switchgear board. If the contactor did not close, a failure is indicated, a signal to reopen the input contactor is issued, and the UPS startup process is terminated. If the input contactor did close, a short delay is initiated allowing the Comms DSP to test for abnormal system operation. If a failure is detected, the input contactor is reopened and the UPS startup process is terminated. If the post-actuation qualification test passes, the startup procedure may continue with rectifier startup.

Figure 11:
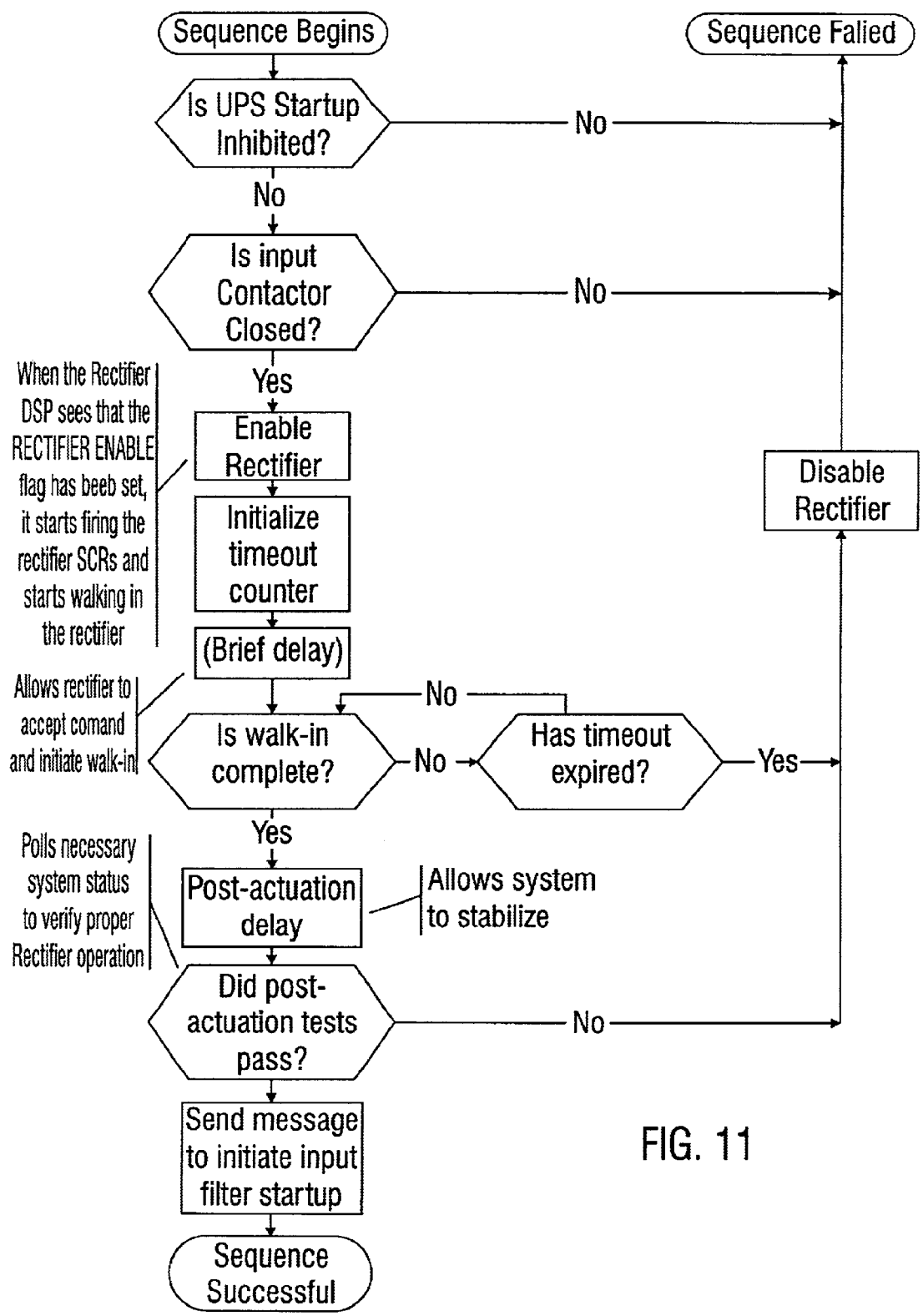
FIG. 11 is a flow chart showing the rectifier startup process used in the uninterruptible power supply of the present invention.

A flow chart illustrating the rectifier startup process is shown in FIG. 11. To begin, the Comms DSP verifies that startup of the UPS is not inhibited by an existing fault condition. If startup is inhibited the UPS startup process is terminated. Otherwise the Comms DSP then verifies that the input contactor is still closed. If the input contactor is open, a failure is indicated and the UPS startup process is terminated. If the input contactor is still closed, the Comms DSP sends a command to the Rectifier DSP to start the rectifier. The Rectifier DSP will then begin to fire the rectifier devices and "walk in" the rectifier.

Rectifier walk-in and firing angle control are explained in detail later in this document. The Comms DSP maintains a timeout counter while the rectifier walk-in occurs. The Comms DSP monitors the status of the rectifier status flags set by the Rectifier DSP, indicating whether walk-in is done and the DC bus voltage is within limits. If walk-in has not completed before the timeout period ends, the Comms DSP disables the rectifier and the UPS startup process is terminated. If walk-in completes within the timeout, a short delay is initiated allowing the Comms DSP to test for abnormal rectifier operation. If a rectifier failure exists, the Comms DSP disables the rectifier and the UPS startup process is terminated. If there is no rectifier failure the startup process may continue.

Figure 12:
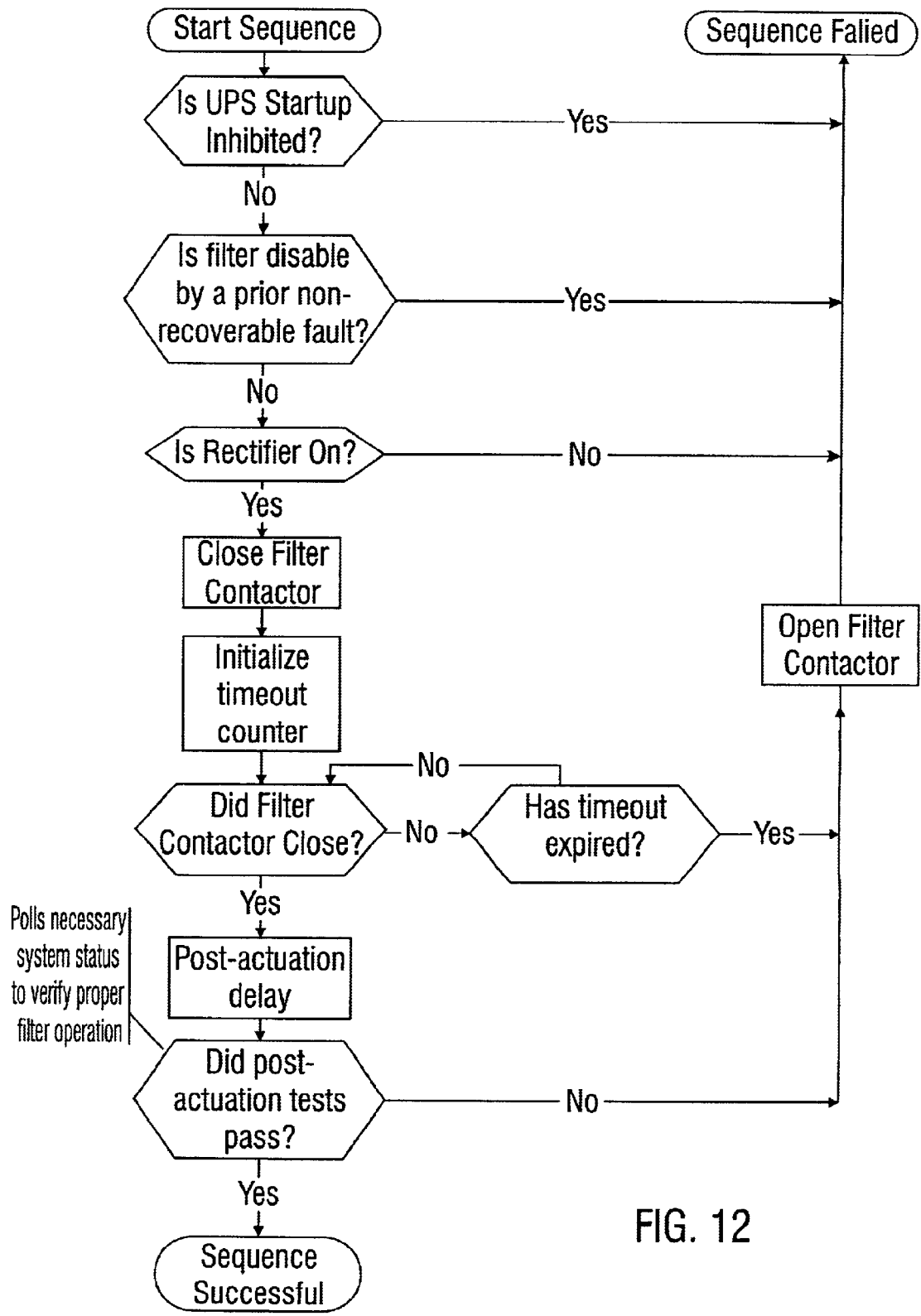
FIG. 12 is a flow chart showing the input filter startup process used in the uninterruptible power supply of the present invention.

A flow chart of steps required to start the input filter is illustrated in FIG. 12. As soon as the rectifier has successfully started, the Comms DSP sends a command to the switchgear board to close the input filter contactor. After a short actuation delay, the Comms DSP checks the input filter contactor status returned by the system switchgear board. If the contactor did not close, a failure is indicated and a signal to reopen the input filter contactor is sent. If the contactor did close, a short delay is initiated allowing the Comms DSP to test for abnormal filter operation (for example, testing for a blown filter fuse.) If a failure is detected, the input filter contactor is reopened. Regardless of whether the input filter activation completed successfully or not, the UPS startup process is allowed to continue.

Figure 15:
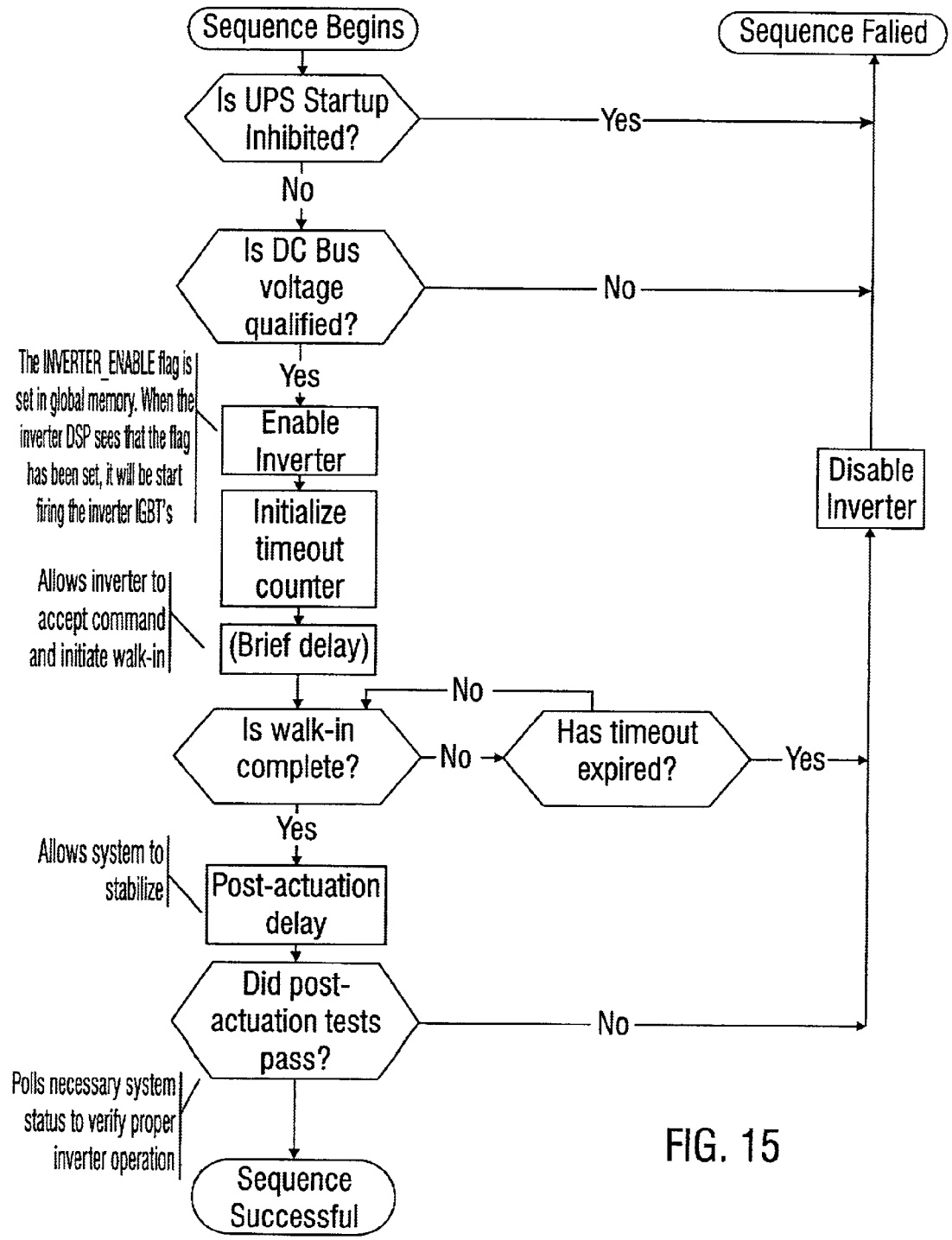
FIG. 15 is a flow chart illustrating the inverter startup process used in the uninterruptible power supply of the present invention.

A flow chart illustrating the inverter startup process is shown in FIG. 15. First the Comms DSP verifies that startup of the UPS is not inhibited by an existing fault condition. If startup is inhibited the UPS startup process is terminated. Otherwise the Comms DSP then verifies that the DC bus voltage is qualified, based on a status flag from the Rectifier DSP. If the DC bus is not qualified, a startup failure is indicated and the UPS startup process is terminated. If the DC bus is qualified, the Comms DSP issues an Inverter Enable command to the Inverter DSP. The Inverter DSP begins firing the inverter output devices. After a short delay, the Comms DSP checks the inverter status signals returned by the Inverter DSP to verify the inverter is operating properly. If a failure is indicated, the Comms DSP will disable the Inverter, indicate a startup failure, and terminate the UPS startup sequence. If no errors were encountered, then the inverter startup is complete and UPS startup continues with the battery system.

Figure 14A:
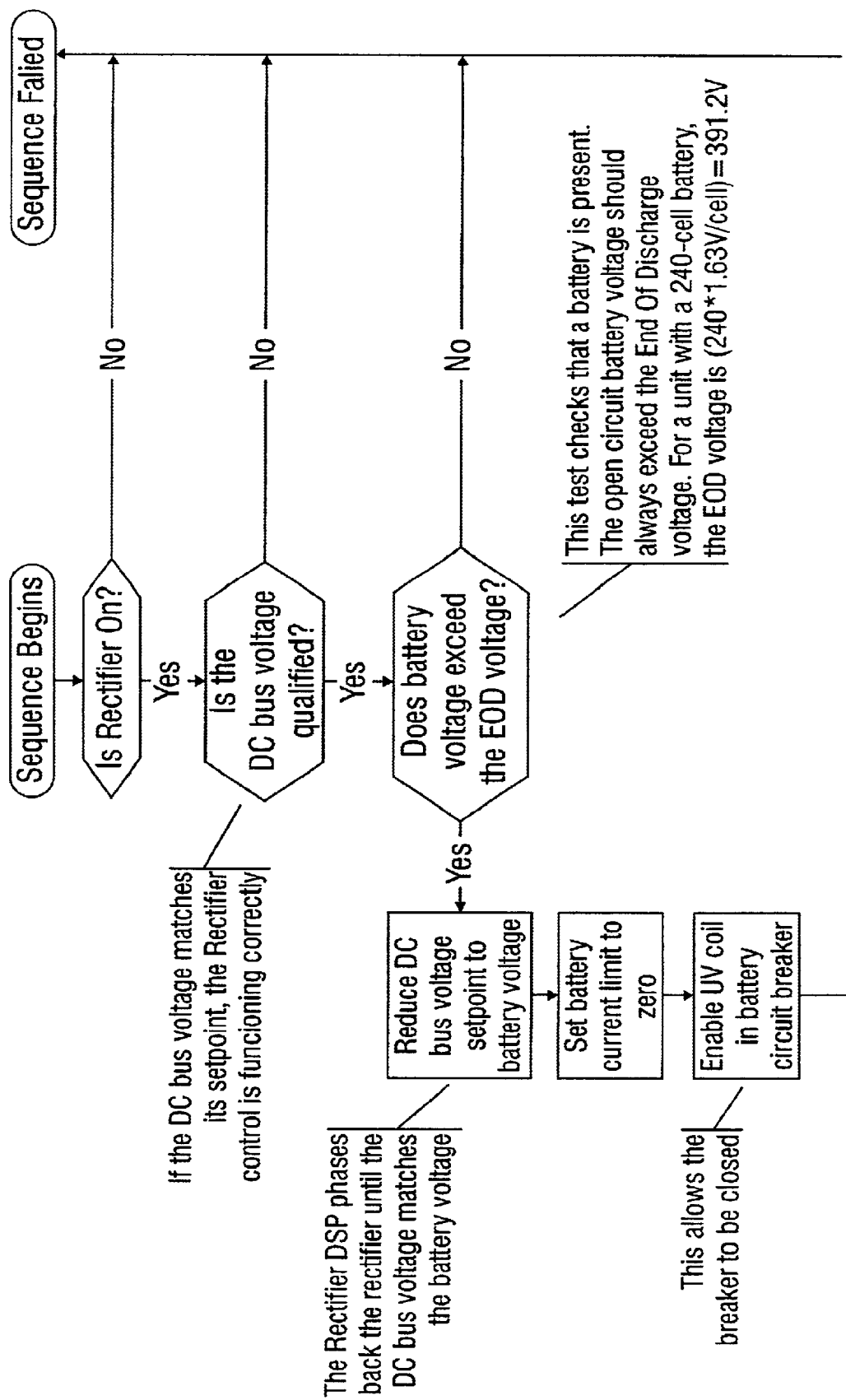
FIG. 14 is a flow chart showing the battery startup process used in the uninterruptible power supply of the present invention.
Figure 14B:
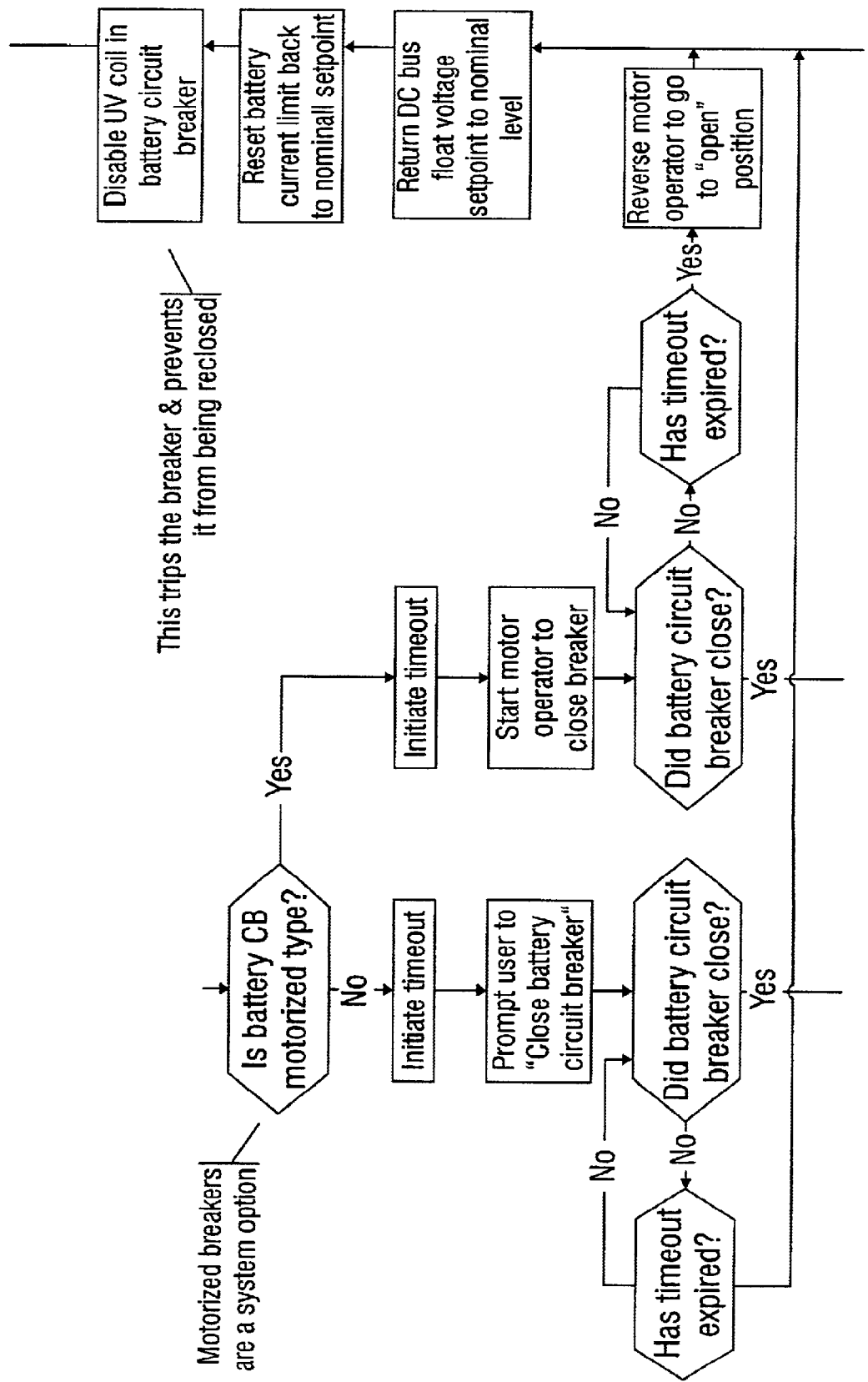
Figure 14C:
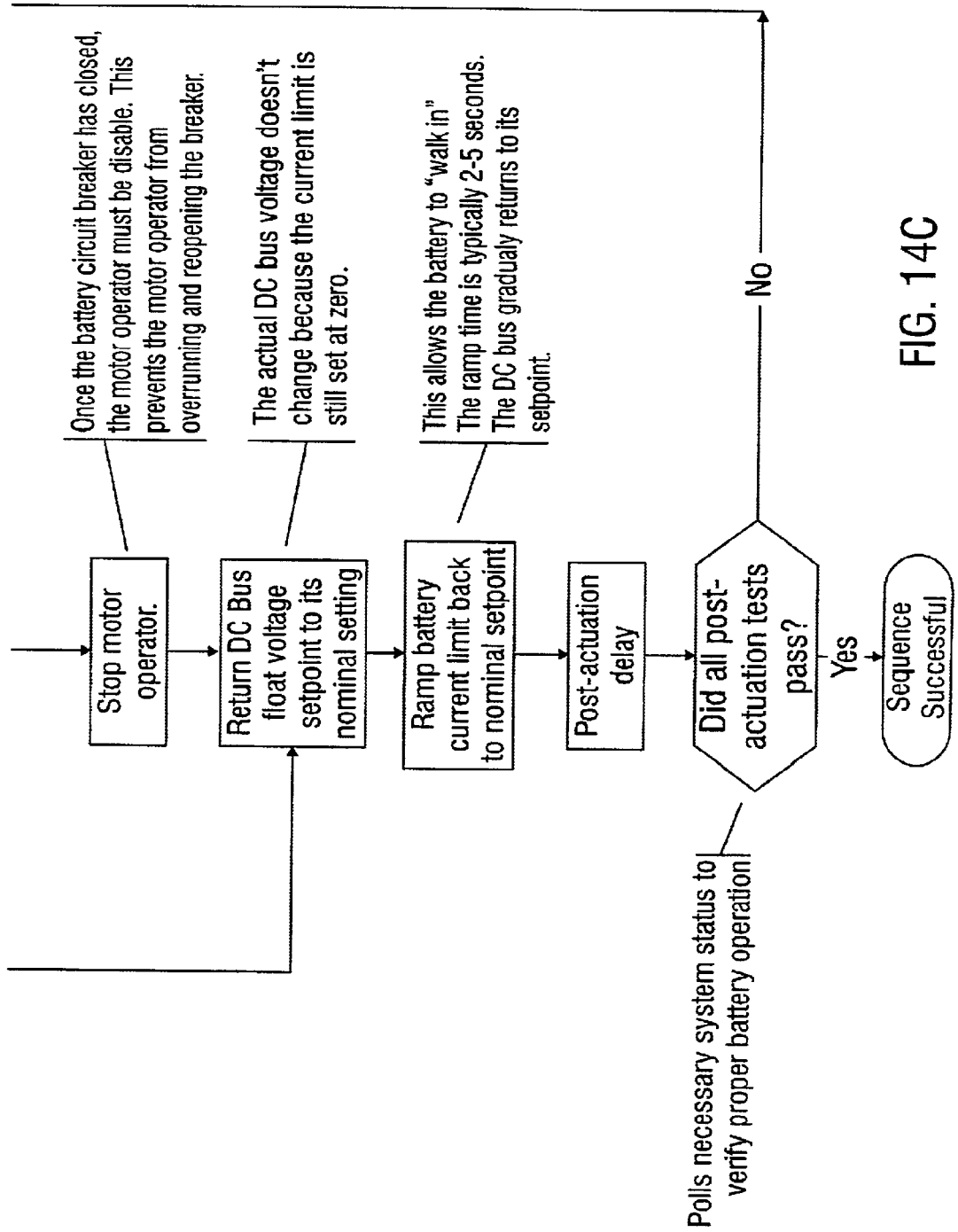

The sixth step in starting the UPS is to bring the battery online. A flow chart for the battery startup process is illustrated in FIG. 14. Again, the Comms DSP verifies that startup of the UPS is not inhibited by an existing fault condition. If startup is inhibited the UPS startup process is terminated. The Comms DSP then verifies that the rectifier is running. If the rectifier is not running, a failure is indicated and the UPS startup sequence is terminated. If the rectifier is still running, the Comms DSP verifies that the DC bus voltage is equal to the DC bus nominal setpoint, which indicates that the Rectifier DSP is operating correctly. If it is not, a failure is indicated and the UPS startup process is terminated. If the rectifier controller is functioning correctly, then the Comms DSP checks that the battery voltage is greater than the battery End-of-Discharge voltage, which verifies that the battery is present. The principle of this test is that the open circuit battery voltage is always greater than the loaded battery voltage at full discharge. If the battery is not present, the Comms DSP indicates a failure and the UPS startup process is terminated. If the battery is present then the battery startup process continues.

The Comms DSP then issues a "start battery" command to the Rectifier DSP. The Rectifier DSP reduces the DC bus voltage to match the battery voltage, which prevents a large inrush current when the battery circuit breaker is closed. Large inrush currents cause negative electrochemical reactions in the battery that shorten battery life. Such currents are advantageously avoided by the UPS of the present invention. The Rectifier DSP then sets the battery current limit to zero in preparation for battery "walk-in". The details of rectifier control for battery walk-in are described below. When this process is finished, the Comms DSP then enables the undervoltage coil in the battery circuit breaker.

The Comms DSP then checks whether the battery circuit breaker is manually operated or motorized. If the battery circuit breaker is manually operated, the user is prompted to close the circuit breaker, thereby connecting the battery to the DC bus. The Comms DSP maintains a timeout counter while the breaker closure occurs. The Comms DSP constantly monitors the battery circuit breaker status from the switchgear board to determine when the user closes the breaker. If the battery breaker does not close before the timeout period ends, the Comms DSP will trip the battery breaker, signal an error, and discontinue startup. The Rectifier DSP returns the battery voltage and current setpoints to their nominal values. If the battery breaker is closed before the timeout expires, the battery startup process continues.

If the battery circuit breaker is motor operated, the Comms DSP starts the battery circuit breaker motor operator. The Comms DSP then waits for the signal from the switchgear board that the battery circuit breaker has closed. If the battery circuit breaker does not close before the timeout period ends, the Comms DSP indicates a failure, disables the undervoltage coil on the battery circuit breaker (i.e. trips the battery breaker) and terminates the UPS startup sequence. The Rectifier DSP returns the battery voltage and current setpoints to their nominal values. If the battery circuit breaker closes within the timeout period, the battery circuit breaker motor operator is stopped to prevent overrun. If the breaker successfully closes, the battery startup sequence continues.

The next step in the battery startup sequence is battery walk-in. The Rectifier DSP will reset the DC bus voltage setpoint to its nominal level, but because the battery current limit is still at zero, the DC bus voltage will remain at the battery float voltage. The battery current limit setpoint is then gradually increased from zero to nominal over a span of several seconds, controlling the rate of change of the battery charging current. The resultant smooth charging current prolongs the service life of the battery. The exact duration of the battery walk-in is not critical, but longer times improve battery life. As the current is ramped up, the DC bus voltage gradually returns to its nominal value.

At the end of the battery current limit ramp, a short delay is initiated. This delay allows the Comms DSP to check for abnormal battery operation. If an error is discovered, the battery breaker is tripped, the setpoints are returned to their nominal values, and the UPS startup sequence is terminated. If there are no errors the UPS is ready for the load to be transferred from the bypass to the UPS. The transfer process is detailed in the Inverter DSP operation later in this document. If the transfer to UPS is successful, the UPS startup procedure is complete. If it is unsuccessful, an error is indicated and the UPS startup sequence is terminated.

If the UPS reports that any critical step in the startup sequence fails, the Micro Monitor issues a shutdown command to the Comms DSP, which then sequentially turns off the UPS devices in the reverse order of startup.

II. Overall Control

A. Global Memory Mapping/Arbitration

The function of global memory is to allow several processors to have secure read and write access to a single memory device. This function allows the processors to communicate critical data on a processor instruction cycle basis. The global memory function can generally be created in two different configurations. The first configuration uses address buffers with tri-state outputs, bi-directional data transceivers with tri-state inputs/outputs, a complex programmable logic device (CPLD) and a memory device. The second configuration uses a programmable crosspoint switch (which takes the place of the buffers and transceivers), a CPLD and a memory device.

In both configurations a CPLD is programmed to provide global memory arbitration. This arbitration is priority driven with the first processor in the scheme having the highest priority and the last processor having the lowest priority to access the global memory. The priority scheme is also non-preemptive in that once a processor is granted access to the global memory no other processor can gain access until the processor that is currently accessing the global memory is finished. Once the global memory is available to be accessed the processor with the highest access priority is granted access first. This scheme provides secure access to a memory location and thus prevents the data from being changed by more than one processor at a time.

In both configurations the memory device can be of any memory size, data width and speed grade. Also, the address buffers and data transceivers or the crosspoint switch serves as a means to share the memory device's address and data busses among several different processors without the possibility of having bus contention. The arbitration circuit is illustrated in FIG. 35.

The memory arbitrator has two input control lines from each DSP. One control line is used to indicate that an external bus cycle is commencing and is used for timing synchronization. The other control line is asserted to request access to the external global memory device. In this implementation, the two control signals are defined as strobe and bus request. When these signals are active from the DSPs with a higher priority than the lowest priority DSP, a lock signal is generated. The DSP with the highest lock priority is granted access to the global memory by the arbitration logic generating the necessary global memory chip select, DSP ready signal, crosspoint switch multiplexer and enable signals and the memory read or write signals. In the event that the lowest priority DSP has access to the global memory, the chip select signal serves as the lock signal to prevent higher priority DSPs from accessing the global memory.

B. Message Fragmentation

The fragmentation method implemented in the UPS of the present invention is similar to DeviceNet's Fragmentation for Explicit messages, but it differs being that this protocol is a Peer to Peer implementation as opposed to DeviceNet's connection based system (ref. 1). What makes fragmented messaging possible in this peer to peer implementation is the presence of a busy acknowledgement and handling of conditions when a node's fragmentation service is busy processing another fragmented message.

Message Fragmentation allows for the transmission of messages that cannot fit into the eight byte data block of the CAN message. Message Fragmentation segments a larger message into smaller fragments to be sent over the CAN bus. When the fragments are received they are reassembled into the larger message.

The fragmented Data block is similar to the normal data block with the exception that another byte is allocated for message fragmentation control as shown in the table below.

| Byte | Contents |||||||| 
|---|---|---|---|---|---|---|---|---|
|  | 7 | 6 | 5 | 4 | 3 | 2 | 1 | 0 |
| 0 | Frag | N/U | Destination MAC ID |||||| 
| 1 | Rs/Rq | | Service Codes ||||||
| 2 | Frag Type | | Fragment Count ||||||
| 3 | Data ||||||||
| 4 | Data ||||||||
| 5 | Data ||||||||
| 6 | Data ||||||||
| 7 | Data ||||||||

Frag. (Fragment) Type: The fragment type indicates whether this message is the first, one of the middle or the last fragment transmissions of the larger message.

A fragment type value of zero indicates that the fragment is the first fragment of the message. The fragment count is zero for the first fragment or 0x3F if the fragment is the first and last fragment. A fragment type value of 1 indicates that the fragment is one of the middle fragments. A fragment type value of 2 indicates that the fragment is the last fragment. A fragment type value of 3 is used to acknowledge the reception of a fragmented message.

Fragment Count: This indicates which fragment block this message is out of the entire message. The receiver can monitor this field to determine if a fragment has been lost or skipped. The fragment count is incremented for each fragment in a series. Counts higher than 63 will cause the counter to roll over to 0 and continue to count. This does not mean fragmented messages have to be limited to 64 fragmented CAN messages.

When a message fragment is acknowledged another byte is used to indicate the success of the transmission.

CAN Message Format For Fragmented Messages:

| Byte | Contents | | | | | | | |
|---|---|---|---|---|---|---|---|---|
| | 7 | 6 | 5 | 4 | 3 | 2 | 1 | 0 |
| 0 | Frag | N/U | Destination MAC ID | | | | | |

Acknowledge Status: The Fragment Acknowledge Status indicates the reception success of an individual fragment message. A fragment acknowledge status value of 0 is used to indicate a pass or successful reception. A value of zero indicates a fail (too much data), and a value of 2 indicates the receiver is busy.

The transmission of a Fragmented message is a hand shaking process. As each fragment is transmitted, it is acknowledged by a return message from the receiving node as to whether it was processed successfully or not (Pass/Fail/Busy). To start the process the transmitting node sends the first fragment over the CAN bus. If the receiving node is able to receive the message (it has a fragmentation service available) it will acknowledge the transmission with a Pass condition. This process will continue until the entire Fragmented Message is received.

If the receiving node is busy processing another node "A" Fragmented Message, the receiving node cannot support the reception of the first fragment from node "B". As a result the receiving node will acknowledge node "B" with a Busy. After a predetermined delay time, the sending node will try again to send the First Fragment and again wait for an acknowledge.

Similar to the transmit timeout waiting for a transmit acknowledge, the receiving node will run a timeout on the reception of the next fragment. Once the receiving node has received a valid fragment and acknowledged it, the receiving node will start a timer. If the timer should expire before the reception of the next fragment, the Receive Fragment service will be set to the initial state (de-allocating the service), and the fragments received to this point will be abandoned.

Transmit Fragment Service Operations:

Check to see if the Transmit Fragmented Message Service is available. If the service is Busy it will be indicated as such to the calling routine, or the message will be stored in a queue for later processing. The Transmit Fragmented Message Service is Busy because it is being used by another task for Fragmented Message transmissions.

If available, the service will be allocated so that no other task may interrupt this message fragmentation. The service will then build the first message fragment.

The message fragment will then be transmitted, and "a wait for acknowledge timer" is started. The wait time is application specific and may even be message specific. For an acknowledgement to be received it must be from the intended destination (MAC ID) and have the same message class and service code.

If an acknowledge is not received within the wait time, the Message Fragment will be transmitted again. If for a second time a Message Fragment is not received within the timeout period, then the calling application is informed that an error has been detected and that the Fragmented messaging cannot take place at this time.

If an acknowledgement is received as a Busy, a delay will be imposed on transmit fragment operations then the service will retransmit the Message Fragment and wait for an acknowledgement again. This will continue for a set number of attempts after which the Transmit Fragmentation Service de-allocated and made available for other transmissions. The delay should be a time small enough to continue message throughput but not be an annoyance to the target node. The Number of attempts times the delay time should be greater than the estimated throughput of the largest fragmented message in the system.

If an acknowledgment is received, the Transmit Fragment Service will determine whether or not the Fragment count in the acknowledge message is equal to that of the last Fragment Message transmitted. If they are equal, the Fragment was successfully delivered, and the next Fragment (if any) can be delivered. If the count is not the same, the Transmit Fragment Service will continue to wait for an acknowledge with the proper Fragment count.

Receive Fragment Service Operations:

If the Receive Fragmentation Service is not currently busy receiving another message, the Receive Fragment Service will check to see if a received message is the first Fragment of a Fragmented message. Once the first fragment has been received, the Receive Fragment Service stores the message source MAC ID, Class and service code. This data is used to screen out other fragmented messages that may be on the bus.

If the Receive Fragment Service is busy processing another fragmented message or just not available, an acknowledge will be sent with a Busy signal to the sender.

If the fragment service is available, then the fragment Service looks to see if the fragment type is the First Fragment and that the Fragment count is zero. If correct, the message is stored and an acknowledge, indicating success, is returned.

If the Fragment count is one greater than the previous received count and the fragment type does not indicate that this is the first fragment, then the fragment is received and is appended to the previously received fragment. With the additional fragment received, an acknowledge with a Pass signal is returned. The fragment count from this fragment is stored.

If the fragment count is equal to the previous received fragment, the same acknowledged is issued in response. No data is stored. This is due to the CAN EOF error condition that can result in a message being duplicated.

If the Fragment count is neither one greater than or equal to the previously stored fragment, then the no data is stored and no acknowledgment is issued. The Receive fragment Service is reset to the Initial State.

If after the successful reception of a message fragment, the next message fragment is not received within a specific period, the Receive Fragmentation Service will be reset to the Initial State.

When the final fragment is received and the acknowledgment is transmitted, the Receive Fragment Service resets to the initial state, making it available for other fragmented messages.

Initial state is the condition in which the Receive Fragmentation Service is idle and ready to start receiving a fragmented message. The Service has not been allocated and the Fragment count is zero.

C. Dual Discharge Circuits

The UPS of the present invention also provides a mechanism whereby the battery current is sensed using a single Hall effect current sensor while producing separate current signals for the discharge current and charge current. In a typical UPS, the battery discharge current is significantly larger than the battery charging current. Historically, the differing magnitudes between the discharge current and the charging current have required multiple current sensors. Specifically, the larger discharge current necessitates a larger dynamic range on the sensor signal, while the smaller charging current requires a finer resolution for accurate charging control. The present invention overcomes this limitation of the prior art by providing a single current sensor with two amplifier circuits, one providing the dynamic range required for discharge current measurement and the other providing the sensitivity required for charging current measurement.

Figure 25:
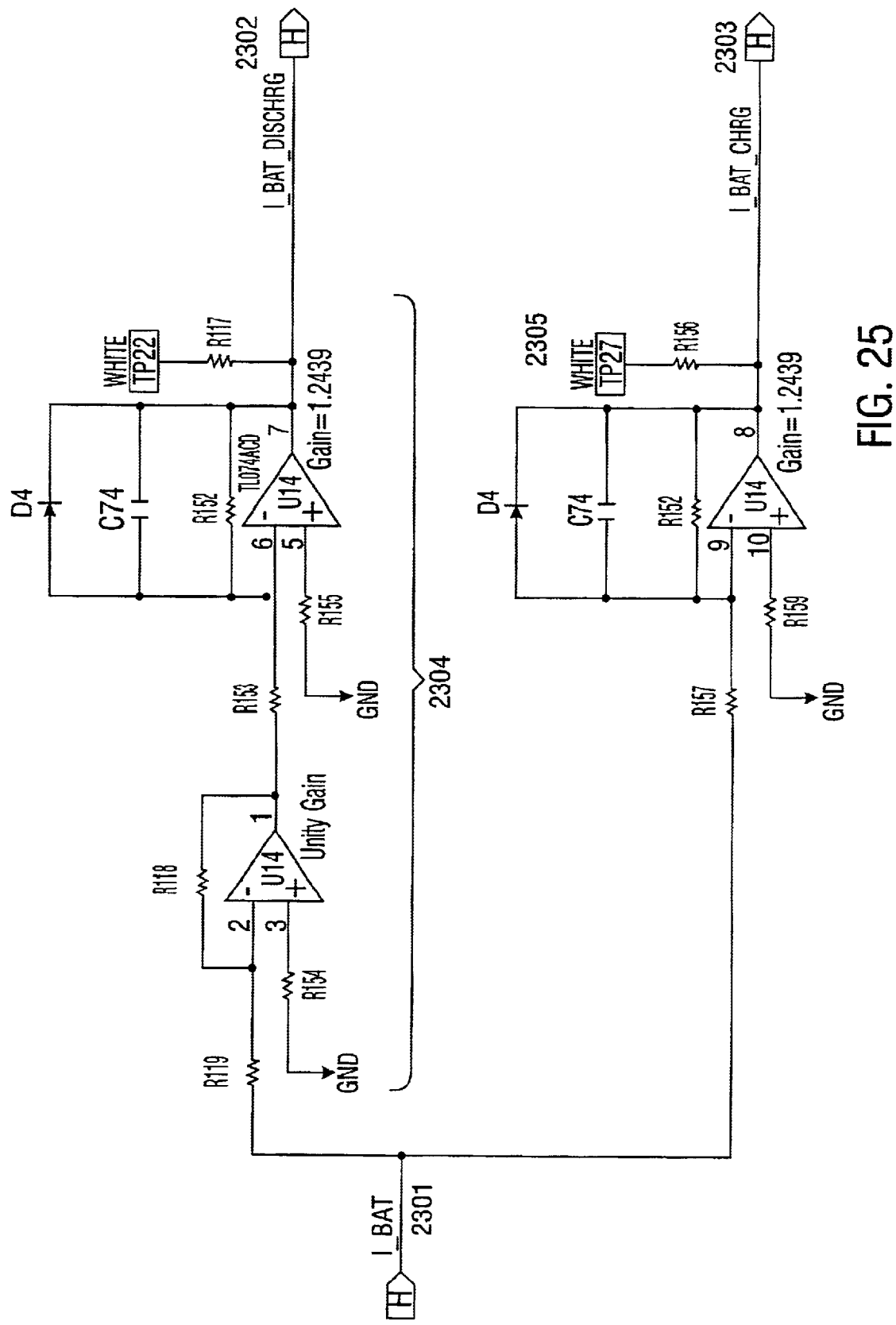
FIG. 25 is a schematic diagram of a battery current measurement circuit used in the disclosed UPS.

The battery current measurement circuit is illustrated in FIG. 25. The voltage signal from the Hall effect current sensor, which represents the battery current, is applied to the circuit at input 2301. The circuit includes two amplifier circuits, a discharge amplifier circuit 2304, and charging amplifier circuit 2305. As noted above, the discharge current is significantly larger than the charging current, and thus it is required that the signal supplied to the controller DSPs have a broader dynamic range. Therefore, the discharge amplifier has a lower overall gain. Conversely, because the charging current is significantly less than the discharge current, it is necessary to have a higher degree of resolution for the signal supplied to the controller DSPs. In the illustrated circuit, the discharge amplifier 2304 has an overall gain of 1.2439, while the charging current amplifier 2305 has a gain of 12.439. Although particular topologies and gains have been disclosed for the amplifier circuits illustrated in FIG. 25, other amplifier topologies having other circuit parameters, including other gains, may be used as well.

III. Input Control

Control board 15 includes a second processor, the Rectifier DSP 25, also known as the Input DSP. The Rectifier DSP controls rectifier/charger 2. Control tasks implemented by the Rectifier DSP include: (1) implementation of the zero cross detector or phase locked loop ("PLL") for rectifier timing and synchronization, (2) rectifier firing angle control, (3) load step detection, (4) adaptive switching control to compensate for the phase rotation of the supplied AC voltage, and (5) input qualification. The Rectifier DSP also performs control functions related to source sharing where AC input 1 is connected to more than one source of AC Power. Finally the Rectifier DSP controls various analog setup and digital inputs to the control board. These control functions include: multiplexer control, reading the analog to digital converters, applying calibration constants to the analog inputs, saving the instantaneous analog input values, and populating the analog RMS value arrays, reading the digital input ports, updating the status variables in memory, and writing to the digital output ports.

A. Rectifier Timing and Synchronization

The Rectifier DSP generates and outputs the firing signals for the rectifier. The Rectifier DSP outputs the firing signals to the SCR driver board 16, which fires the SCRs in the desired sequence. The Rectifier Driver, item 16 in FIG. 3, receives the individual SCR firing signals and converts them to a "picket fence" gate drive by combining an on board free running oscillator signal with the SCR firing signal. The oscillator is a thirty percent duty, 15 kilohertz rectangular pulse. A simple logical AND of these two signals would result in varying delay in the gate signal of up to two thirds of a cycle of the 15 kilohertz oscillator. This varying delay causes unacceptable performance and can be eliminated by adding a one-shot timer triggered by the rising edge of the SCR firing signal which is then logically ORed with the free running oscillator. The rectifier drive pulse generation circuitry is illustrated in FIG. 38.

The phase angle of the supplied utility voltage is required by the UPS system to accomplish synchronization of the rectifier SCR firing. A digitally-implemented, software zero cross detector or PLL is used to extract the phase angle from the incoming utility voltage. Because of the critical control tasks that require accurate phase angle information, it is desirable that the output of the zero cross detector or PLL be insensitive to distortions on the input AC line.

1. Zero-Cross Detection

The zero cross detector provides the phase synchronization information for the firing angle controller of the silicon controlled rectifiers ("SCRs") that make up the rectifier/charger. Each phase is independently controlled relative to its own zero cross detection. The zero cross detector is online at all times, including times that the input line is unqualified and the rectifier is offline. Input line qualification is performed by the control system and includes measurements of the voltage, frequency and phase rotation of the incoming line and verifying that they are within the specified operating ranges. The zero cross detector will operate properly with either clockwise or counter-clockwise rotation of the incoming three-phase line, which allows the rectifier to operate regardless of the connected phase rotation.

In the case of the zero cross detector, each phase voltage is filtered via a low pass hardware filter that provides a phase shift of 60 degrees. Since each phase of the rectifier is controlled independently relative to its own zero cross detection, it is desirable that each of the filters have identical phase shift values to prevent unbalanced currents flowing from the input source. To accomplish this, any error in the measurements as a result of filter circuit component tolerances is automatically accounted for by the controller. This is done at system startup; the controller detects the zero cross of both the input and output signals of each filter using this information to derive the actual phase shift of each filter. Subsequently, the controller makes adjustments to each filter zero cross detection such that the effective phase shifts of each filter are identical.

2. Digital PLL

In the case of the PLL, prior art PLLs suffer various performance disadvantages caused by input distortion. For example, notching in the input waveform causes harmonic distortion in the PLL output. Similarly, loss of input voltage on one or more phases results in a loss of PLL gain and a corresponding reduction or loss of output, causing the PLL to stop tracking the input. Finally, another shortcoming of prior art PPLs is that input phase deviation would increase the PLL error signal and distort the sinusoidal output angle signal.

Figure 16:
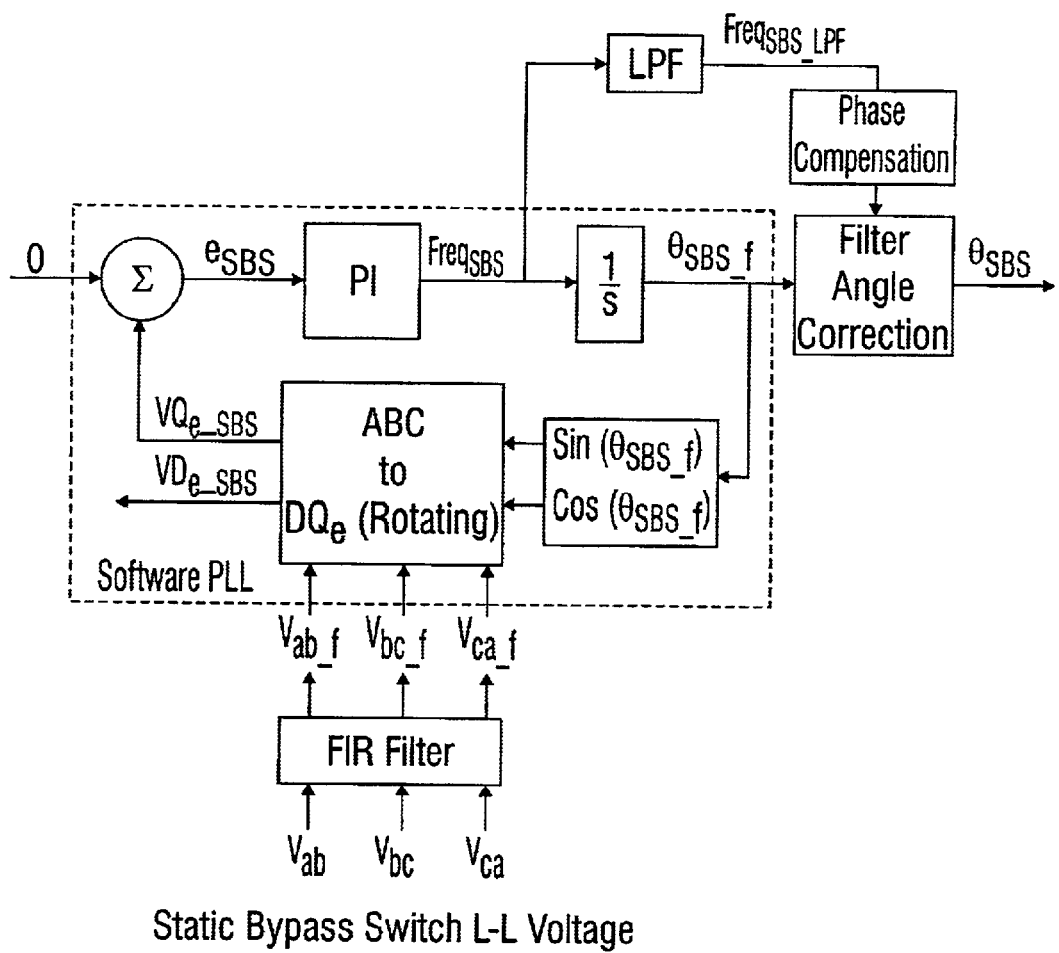
FIG. 16 is a diagram illustrating operation of the software-implemented, digital phase locked loop used in the uninterruptible power supply of the present invention.

A control diagram of the digitally implemented PLL used in the present invention is illustrated in FIG. 16. The line to line input voltages ($V_{ab}$, $V_{bc}$, and $V_{ca}$) are sampled, and the sampled voltages are passed through a finite impulse response ("FIR") filter. The FIR filter produces the filtered voltages $V_{ab\_f}$, $V_{bc\_f}$, and $V_{ca\_f}$. The FIR filter eliminates relatively low frequency distortion ("harmonics") from the sampled voltages. Harmonic frequencies up to one-half the sampling frequency are trapped by the filter The FIR filter is digitally implemented by the Rectifier DSP. Implementation of such filters is well known in the prior art.

The filtered voltages are then transformed into the DQ rotating reference frame. The DQ rotating reference frame is synchronized to the utility frequency. Synchronization is maintained by PLL output angle feedback. Rectifier PLL control is performed in the DQ rotating reference frame to minimize the processor power required for rectifier control. The transformation into the DQ rotating reference frame is well known in the prior art and is mathematically expressed by the following equations:

$$V_{QS}=V_{ab}$$

$$V_{DS} = \frac{(V_{ca} - V_{bc})}{\sqrt{3}}$$

$$V_{QE}=V_{QS}\cdot\cos(\theta)-V_{DS}\cdot\sin(\theta)$$

$$V_{DE}=V_{QS}\cdot\sin(\theta)-V_{DS}\cdot\cos(\theta)$$

where $V_{ab}$, $V_{bc}$, and $V_{ca}$ are the three phase line-to-line voltages, $V_{QS}$ and $V_{DS}$ are the stationary DQ reference frame voltages, $V_{QE}$ and $V_{DE}$ are the rotating DQ reference frame voltages, and $\theta$ is the output angle of the phase locked loop.

After the DQ transformation, the Q-axis voltage is selected as the control variable. By manipulation of the equations above, it can be shown that the angle error between the reference voltage and the output voltage determines the magnitude of the D-axis and the Q-axis voltages. If the angle error is set to zero, the D-axis voltage is equal to the magnitude of the line voltage and the output angle may be locked to the input by regulating the Q-axis voltage to zero.

The error between the Q-axis voltage and the zero setpoint is passed through a proportional-integral ("PI") controller to produce the rotational frequency of the DQ reference frame. By generating this frequency it is possible to lock to the utility frequency at any arbitrary phase. By integrating the derived utility frequency, the phase angle of the utility voltage may be obtained. However, the FIR filter applied to the input voltage causes a delay that skews this phase angle. Thus the phase angle must be corrected to compensate for the delay introduced by the FIR input voltage filter. Using the known properties of the filter, which are parameters selected by the filter designer, it is possible to determine the filter delay and adjust the derived phase angle by a corresponding amount. The filter delay is given by:

$$D_f = \frac{N-1}{2}$$

where $D_f$ is the filter delay in samples and N is the filter length. Given the filter delay, the corresponding phase delay is given by:

$$D_\theta = \frac{F_{LPF}\cdot 360°\cdot D_f}{F_{sample}}$$

where $D_\theta$ is the phase delay, $F_{LPF}$ is the frequency of the incoming line after low pass filtering, $D_f$ is the filter delay in samples, and $F_{sample}$ is the sampling frequency. Thus the corrected filter angle is:

$$\theta=\theta_f+D_\theta$$

where $\theta$ is the corrected angle of the source voltages, $\theta f$ is the uncorrected angle of the filtered source voltages, and $D\theta$ is the phase angle delay.

The goal of the software PLL algorithm is to provide angle and frequency information about the input source to the rectifier firing angle controller. Unlike the inverter PLL discussed below, the rectifier PLL is not restricted to a low slew rate. In fact, a high rectifier PLL slew rate in that it allows quick response to load changes without DC bus voltage and battery current disruptions. The basic control algorithm operates by determining the difference between the input phase angle and the PLL output. If this difference is positive then the PLL output frequency is increased to catch up to the input phase angle. If the difference is negative, the PLL output frequency is decreased so that the input phase angle will catch up with the PLL output phase angle.

B. Rectifier Firing Angle Control

Figure 17A:
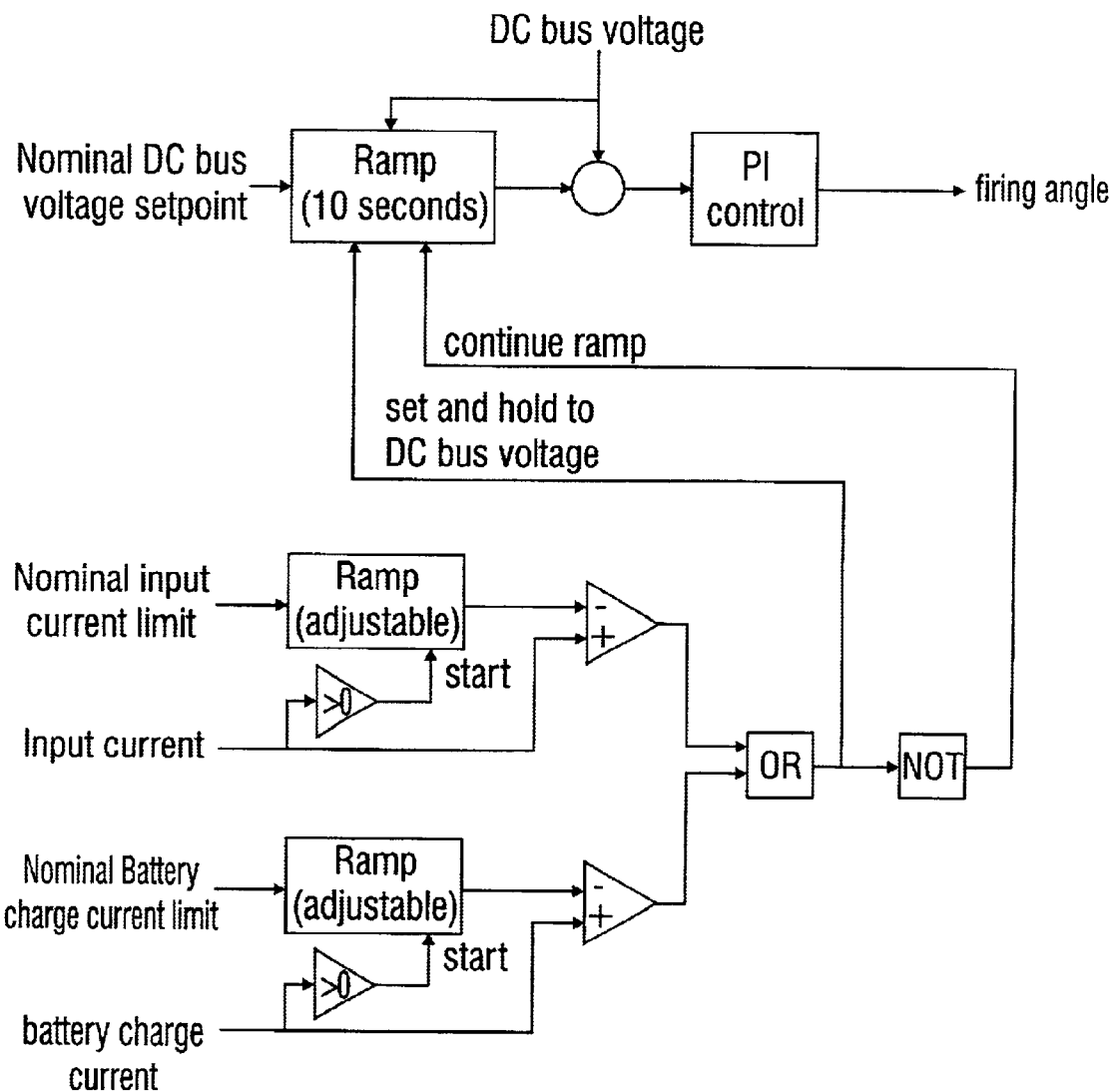
FIGS. 17A–B is a block diagram of the rectifier control system used in the uninterruptible power supply of the present invention.
Figure 17B:
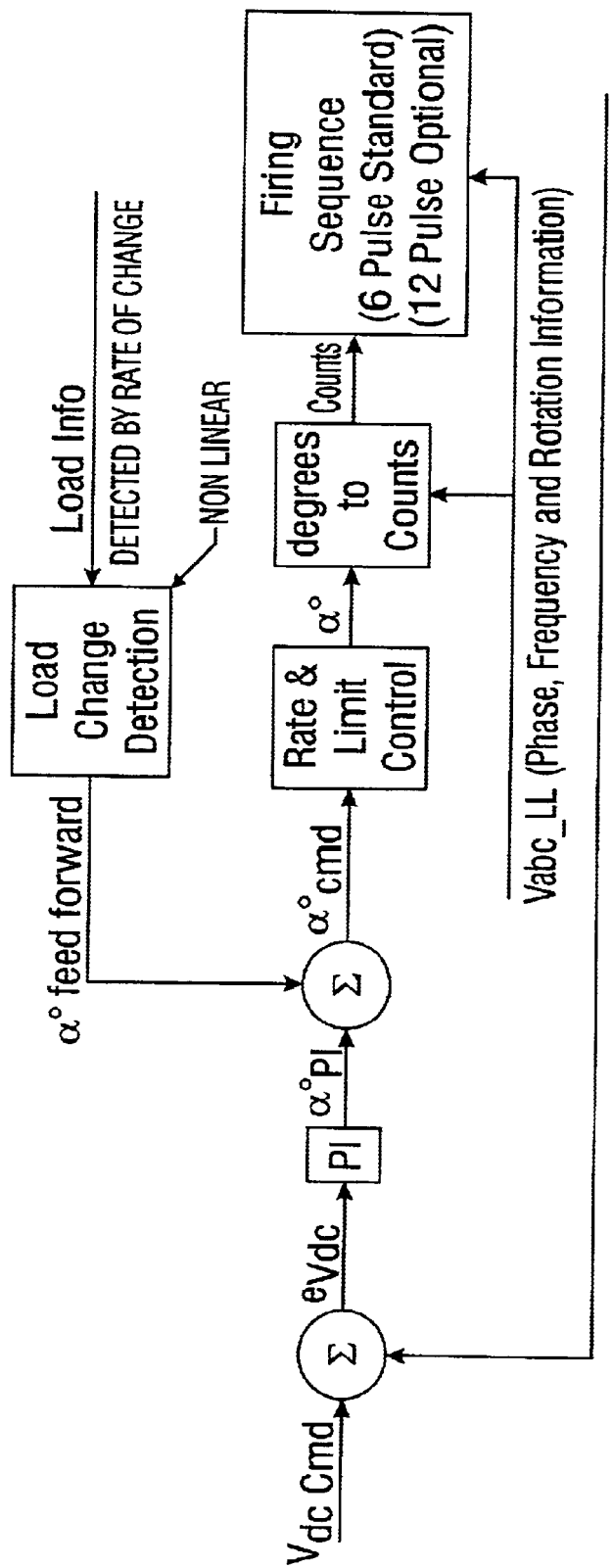

Regardless of how the phase angle information is derived, rectifier firing angle control is necessary to supply the proper amount of power to the DC bus 10. A diagram of the rectifier control system is provided in FIG. 17. The rectifier controller is a classical PI feedback control loop that is tuned to regulate the DC bus voltage to some nominal voltage setpoint. The difference between the actual bus voltage and the setpoint is the error signal into the PI control. The output of the PI control loop represents the desired rectifier firing angle.

Normally, if both input current and battery charge current are below their respective limits, then the control operates as described in the preceding paragraph. If the input current or battery charge current are at the respective limit the controller will switch its mode of operation temporarily until the out of tolerance current is back within the corresponding limit. The rectifier control mode switching scheme implemented by the UPS of the present invention reduces transients on the DC bus.

If the rectifier load increases such that the input current reaches the current limit setpoint, the rectifier controller switches to control SCR firing based on the input current. The input current is regulated to remain at the current limit setpoint, and the difference between the current limit and actual input current will be the error signal to the PI control. To prevent controller output discontinuity when switching between the DC bus voltage control mode and the input current control mode, the PI control integrator element is preset to a value equal to the total PI control output at the instant before switching. The PI controller gains are then set to values tuned to control and maintain the input current at the current limit setpoint. While the rectifier is in current limit control, the DC bus voltage falls below the prior DC bus voltage setpoint used as the control parameter before the switch to current control mode. This DC bus voltage decrease is unavoidable because the required load power exceeds the available input power.

The rectifier controller remains in current limit control mode until the load power decreases so that the required rectifier input current is below the current limit setpoint. As the load decreases, the DC bus voltage returns to the voltage setpoint used as the control parameter before the transfer to current limit control mode. The controller then switches back to the normal voltage control mode. The voltage error signal is the input to PI loop and the controller gains are reset to the original values used for voltage control. To again provide a seamless control mode transfer, the integrator is preloaded to the control loop output value immediately before the control mode transition.

If the battery charging current exceeds the limit setpoint, the rectifier controller continues to operate in voltage control mode; however, the DC bus voltage setpoint is lowered from its nominal value to a value that will maintain the battery charging current at the limit setpoint. The controller continues to operate in this mode, maintaining charge current at the limit. As the battery charges, the battery voltage increases. The DC bus voltage setpoint increases correspondingly, which maintains the battery charging current at the limit setpoint. As the battery charge increases further, the battery voltage continues to increase until it reaches a point that the nominal DC bus voltage setpoint does not cause the charging current to exceed the charging current limit setpoint. At this point, the rectifier controller has returned to its normal voltage control mode using the nominal voltage setpoint determined by the control system for the present operating conditions.

C. Load Step Detection

The Rectifier DSP must control the rectifier such that sufficient power for the critical load is delivered to the DC bus. It is therefore critical that the rectifier controller, i.e., the Rectifier DSP, detect a change in the load on the UPS and adjust the rectifier accordingly. If the load suddenly increases, the firing angle must be increased to supply more power to the DC bus. Conversely, if the UPS load decreases, the rectifier firing angle must be decreased to reduce the power supplied to the DC bus. Without rapid firing angle control, if the load is drastically increased the extra power required must be supplied by the battery. Conversely, if the load decreases drastically, the excess energy will be absorbed by the battery. In either case, a large change in the battery current occurs, which is detrimental to battery life.

Prior art rectifier controllers typically include a derivative term added to the PI controller (making it a PID controller) for controlling the rectifier under transient load conditions. This term is added to prevent excessive DC bus voltage excursions when the UPS load changes, i.e., to prevent overvoltage on a major load decrease or under voltage on a major load increase. This classical prior art solution creates problems in controlling the DC bus voltage in the presence of steady state unbalanced or crest load conditions. The derivative term of the controller responds to the variations caused by the unbalance or crest load and causes constant rectifier firing angle changes. This constant firing angle "hunting" is undesirable because it causes unnecessary input current variations. A better solution to this problem, which is implemented by the UPS of the present invention, is to remove the derivative term in the controller and add some non-linear element to respond to DC bus voltage transients caused by significant load changes. Another possible solution is implementation of a fuzzy logic algorithm.

The solution implemented for the rectifier controller of the present invention is as follows: if the DC bus voltage deviates from the setpoint value by more than some predefined limit, and the DC bus voltage rate of change exceeds some predefined limit, then the rectifier firing angle is modified to compensate for the load change. Rectifier firing angle compensation is accomplished by adding some predefined value to the integrator term. The value is determined by the DC bus voltage value and rate of change. This control technique prevents excessive DC bus voltage excursions caused by UPS load changes. This technique also prevents the rectifier from responding to small DC bus voltage variations caused by an unbalanced or crest load.

The Rectifier DSP implements rectifier walk-in control on startup. The input walk-in rate is adjustable. At startup, the Rectifier DSP limits the DC bus voltage rate of increase by ramping the DC bus setpoint from zero to the nominal DC bus setpoint over a 10 second period. The DC bus voltage rate of increase to approximately 54 volts per second for a nominal setpoint of 540 volts. During voltage walk-in, the Rectifier DSP also controls the input current rate of increase and the battery charging current rate of increase. The rate at which these limits rise toward their nominal values may be configured by the user.

D. Phase Compensation

The Rectifier DSP also modifies the rectifier switching sequence to compensate for the phase rotation of the input voltage. A three phase electrical system has two possible phase rotations or phase sequences, clockwise and counter clockwise. Prior art UPS systems implemented a fixed SCR firing sequence, which required that the incoming AC line be connected in the correct sequence. If any two of the incoming leads were reversed, the system would not operate properly because of the incorrect phase rotation. In the present invention, the Rectifier DSP can detect the input phase rotation and alter the SCR firing sequence to adapt to the connected phase rotation.

When either the battery charging current or the input current begins to rise above zero, the corresponding current limit setpoint begins to ramp from zero to the nominal value for that current limit. During the walk-in, if the input current and battery charge current are below their respective limits, the DC bus setpoint is increased toward the nominal setpoint. However, if either input current or battery charging current is above its corresponding limit, the DC bus voltage setpoint is held at the present DC bus voltage. Holding the DC bus voltage setpoint prevents the Rectifier DSP from advancing the rectifier firing angle, thereby limiting the current to the desired value. Once both currents fall below their respective limits, the DC bus setpoint again begins to increase.

E. Battery Charging

1. Battery Charging Modes

The Rectifier DSP also controls battery charging process. Control of the battery charging process includes implementing "battery saver" and "turbo" charging modes discussed above. The different charging speeds are implemented by setting a battery charging current limit setpoint that corresponds to either the slower or faster charging rate. These limits are then used for charging control as discussed throughout the description of the Rectifier DSP.

2. Temperature Compensation

The Rectifier DSP is also programmed to implement temperature compensated battery charging. The compensation circuitry includes a thermistor input into the Rectifier DSP. The thermistor measures the temperature inside the battery cabinet. The Rectifier DSP processes this temperature and adjusts the battery current limit setpoint accordingly. The battery current limit setpoint affects the DC bus voltage as described in the battery walk-in description.

F. Input Qualification

Various other rectifier control functions are implemented by the Rectifier DSP. For example, the Rectifier DSP must verify the input line qualification. Input line qualification includes verifying that the supplied voltage, frequency and phase rotation are acceptable to operate the UPS in its present configuration. To determine whether the incoming line is within an acceptable tolerance, the Rectifier DSP monitors voltage, frequency and phase rotation. The fact that the UPS of the present invention is designed to be applied on a three phase power system means that the UPS can determine whether these parameters are within an acceptable range by monitoring only one parameter one each phase. This also enables the DSP to detect a single phase fault on any of the three phases. For example, by monitoring the voltage on phase A, the frequency of phase B, and the phase sequence between phase C and either phase A or B the Rectifier DSP will detect any voltage, frequency, or rotation failure due to interactions among the phases. This detection method also permits the detection of any single phase failure because the corresponding three phase parameter will also be missing.

Even when the input line is not qualified, the Rectifier DSP is programmed to draw as much power as the line is capable of delivering up to the rectifier current limit. The UPS system will make up any power deficit between the power required by the critical load and the power available from the line by drawing power from the battery. This minimizes the amount of battery power drain, thereby prolonging battery life.

IV. Output Control

Control board 15 includes a third processor, the Inverter DSP 26, which is also known as the Output DSP. The Inverter DSP controls inverter 4 and bypass static switch 5. Inverter DSP control functions may be categorized in one of the following six categories: (1) inverter PWM control, (2) advanced output control, (3) bypass static switch control, (4) transfer control, (5) parallel/multiple unit control, and (6) processor input and output control.

A. Inverter PWM Control

The first group of inverter control functions relates to PWM control, such as generating the reference sine wave. The Inverter DSP causes the inverter to track the bypass input voltage if the bypass is qualified. Otherwise, the inverter runs independently. Using the reference sine wave the Inverter DSP also generates the PWM signals and the inverter IGBT firing signals.

Figure 21A:
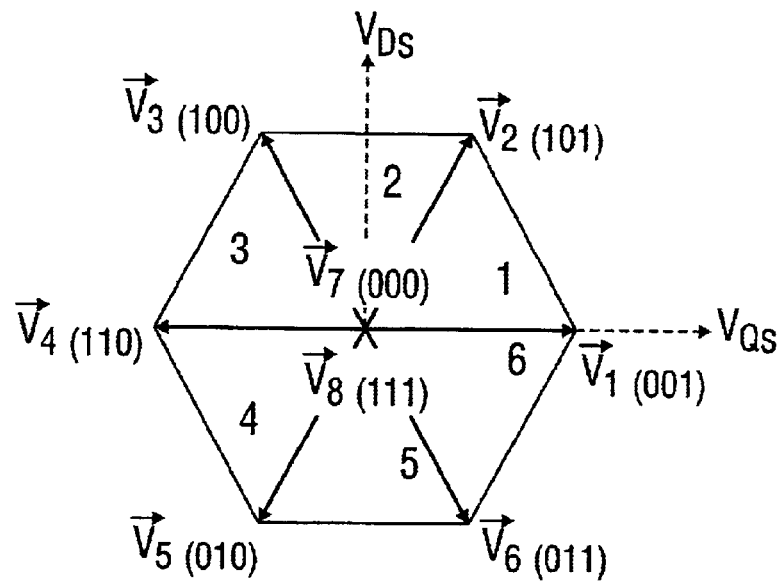
FIG. 21 is a voltage vector diagram showing the possible output voltage vectors of the inverter shown in FIG. 19.
Figure 21B:
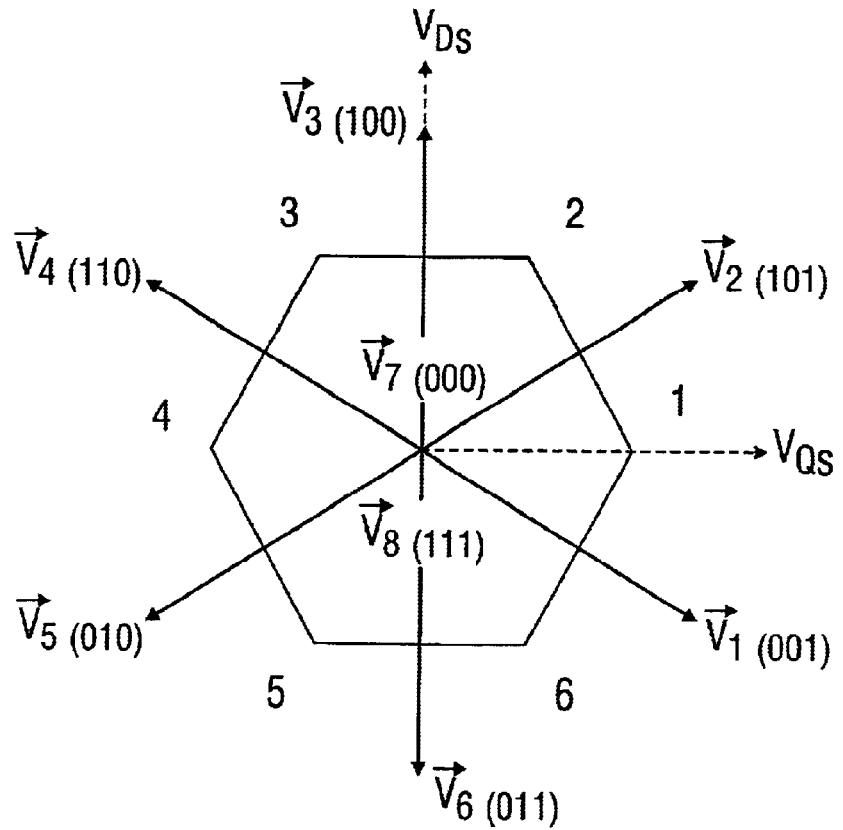
Figure 22A:
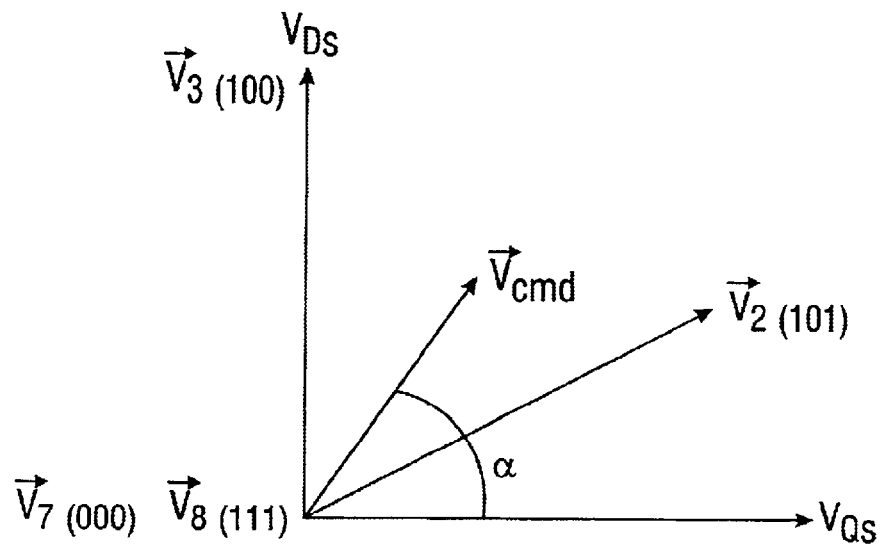
FIGS. 22–22A illustrates the generation of inverter voltages using the space vector PWM technique.
Figure 22B:
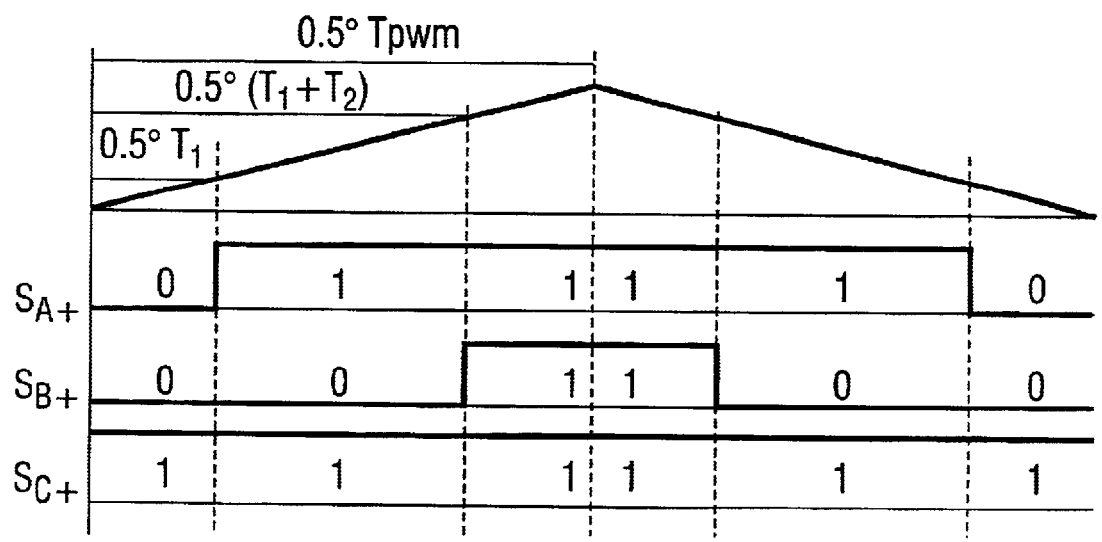
Figure 22C:
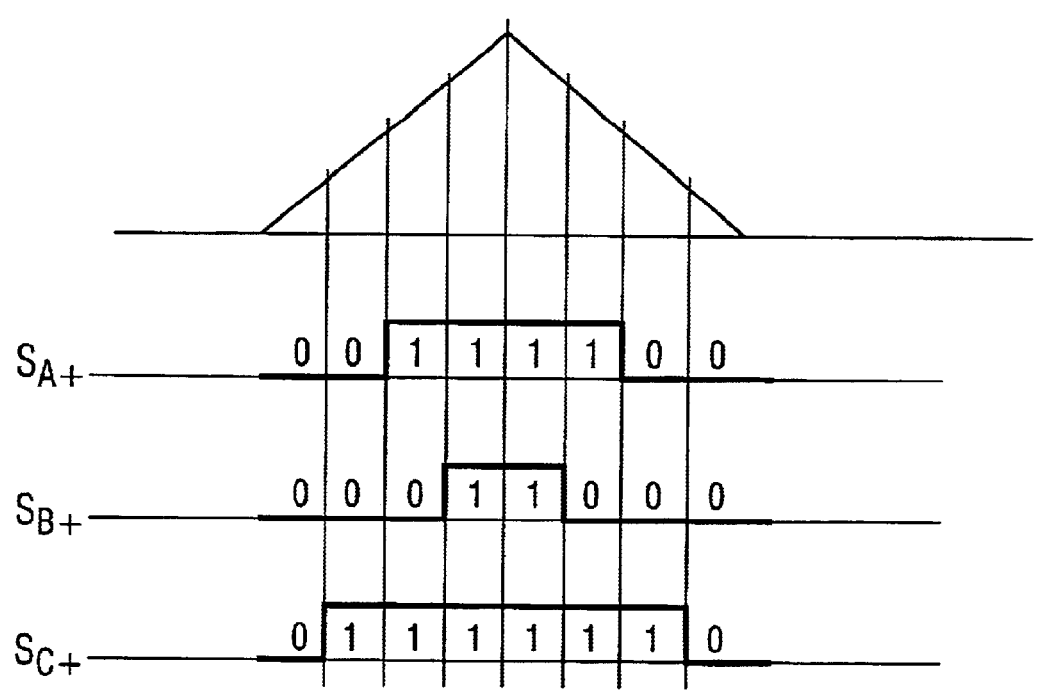

Space vector PWM is a technique for determining the switching sequence of the transistors making up the inverter. Space vector PWM results in less harmonic distortion in the inverter output and also provides more efficient use of the DC supply voltage than other PWM techniques. For the description following, it is useful to map all of the voltages into the DQ reference frame, which is performed by a standard transformation well known to those of skill in the art. The transformation is implemented using the following equation:

$$\begin{bmatrix} V_{Ds} \\ V_{Qs} \\ V_{0s} \end{bmatrix} = \begin{bmatrix} 0 & -\frac{\sqrt{3}}{3} & \frac{\sqrt{3}}{3} \\ \frac{2}{3} & -\frac{1}{3} & -\frac{1}{3} \\ \frac{1}{3} & \frac{1}{3} & \frac{1}{3} \end{bmatrix} \cdot \begin{bmatrix} V_A \\ V_B \\ V_C \end{bmatrix}$$

where $V_{Ds}$, $V_{Qs}$ and $V_{0s}$ are the DQ axis voltages (note that $V_{0s}=0$ if the voltages are balanced) and $V_A$, $V_B$, and $V_C$ are the three phase voltages. This mapping results in the eight possible output vectors illustrated in FIG. 21. (Two of the vectors are actually zero vectors in DQ coordinate space, and thus only the six non-zero vectors are shown.) The desired output voltage required by the control system may also be mapped into DQ space, resulting in a DQ command voltage vector. The objective of the space vector PWM technique is to use the eight possible switching states of the inverter switching devices to approximate the command voltage vector. This is accomplished by time averaging of the available output voltage vectors. An example is illustrated in FIG. 22. Assuming a command voltage vector $|V_{cmd}| \angle \alpha_{cmd}$, which lies between the output vectors $V_3$ and $V_2$, the output voltage to match the command vector may be approximated by time applying vector $V_3$ for a time $T_1$, vector $V_2$ for time $T_2$ and either vector $V_7$ or vector $V_8$ for time $T_0$. The times for application of the various voltage vectors are given by the following equations:

$$T_1 = T_{PWM} \cdot \frac{|Vcmd|}{V_{DC}} \cdot \left[\cos(k-1) \cdot \frac{\pi}{3} - \frac{\pi}{6}\right) \cdot \sin(\alpha) -$$

$$\sin\left((k-1) \cdot \frac{\pi}{3} - \frac{\pi}{6}\right) \cdot \cos(\alpha)\right]$$

$$T_2 = T_{PWM} \cdot \frac{|Vcmd|}{V_{DC}} \cdot \left[\sin\left(k \cdot \frac{\pi}{3} - \frac{\pi}{6}\right) \cdot \cos(\alpha) - \cos\left(k \cdot \frac{\pi}{3} - \frac{\pi}{6}\right) \cdot \sin(\alpha)\right]$$

$$T_0 = T_{PWM} - T_1 - T_2$$

where $T_{PWM}$ is the PWM period, and k is the sector number of the command voltage.

In the example shown, the switching sequence is as follows: vector $V_3$ is on for $T_1$ seconds, which means that transistor 102 is closed while transistors 104 and 106 remain open. Because transistors 103, 105 and 107 are complimentary to transistors 102, 104 and 106, transistor 103 is open during this period and transistors 105 and 107 are open. Then vector $V_2$ is applied for $T_2$ seconds, which corresponds to a state wherein transistor 102 and 106 are closed and transistor 104 is open. Finally zero voltage vector $V_8$ is applied for $T_0$ seconds. Voltage vector $V_8$ corresponds to a state wherein transistors 102, 104 and 106 are all closed. The same result could be achieved by applying voltage vector $V_7$, which corresponds to a state wherein transistors 102, 104 and 106 are all open, however vector $V_8$ is chosen to minimize the number of transistors that must change states.

This is one way to implement Space vector PWM. This scheme has the advantage that there are only 4 transitions per PWM cycle and so the switching losses are reduced. However, the disadvantage is that it results in higher current ripple, which results in audible noise. An alternative space vector PWM pattern is shown in FIG. 22a for the same command voltage vector $|V_{cmd}| \angle \alpha_{cmd}$. In this implementation, there are 6 switch transitions per PWM cycle thus the current ripple is lower and so there is less noise. This way of implementing space vector PWM splits the time spent on the "zero" voltage vector in half. That is, half of $T_0$ is spent on vector $V_7$ and half on vector $V_8$.

B. Advanced Output Control

Figure 26:
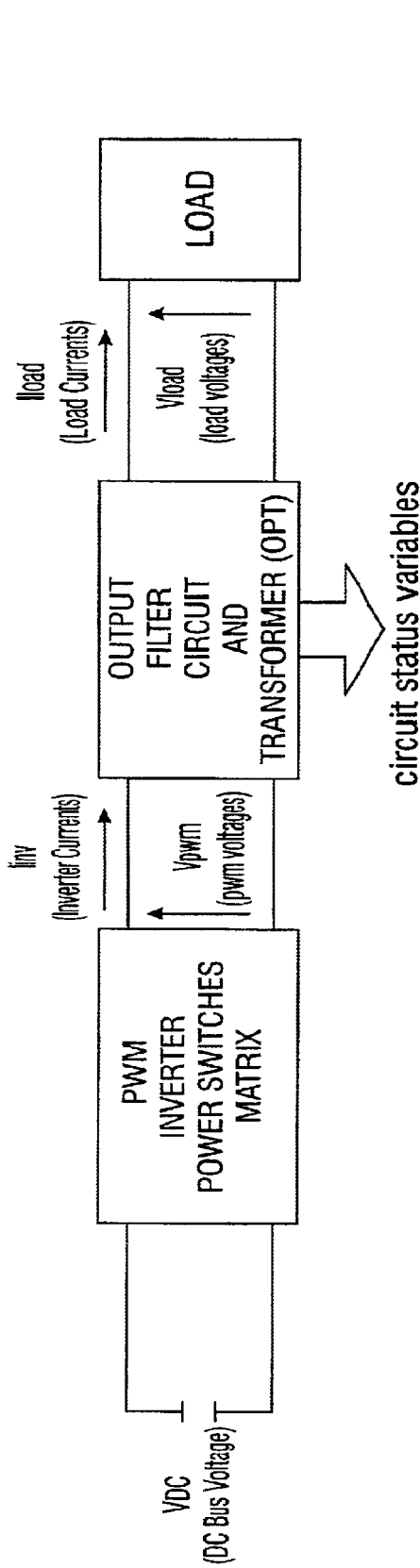
FIG. 26 is a block simplified block diagram of the UPS illustrating the control parameters used to design the control system.

The second group of Inverter DSP control functions relates to advanced UPS output control. The advanced output control functions include controls optimized for load transients and nonlinear loads that produce high crest factor currents. FIG. 26 shows a general inverter structure where the advanced output control method of the present invention may be applied. The goal of the advanced output control is to control the generated PWM voltage ($V_{pwm}$) in order to regulate the load voltage(s) ($V_{load}$) under any disturbance caused by the variation of load current(s) ($I_{load}$), while limiting the inverter current ($I_{inv}$) to its safest defined level. The control method requires some means of measuring all or part of the voltages and currents that qualify as state variables in a chosen state space model of the output filter and transformer circuit (circuit state variables). Construction of such state space model and selection of the state variables are known to those skilled in the art of control analysis and design. The output control of the present invention may be applied to a single phase, three-phase, or split phase inverter system.

Figure 27:
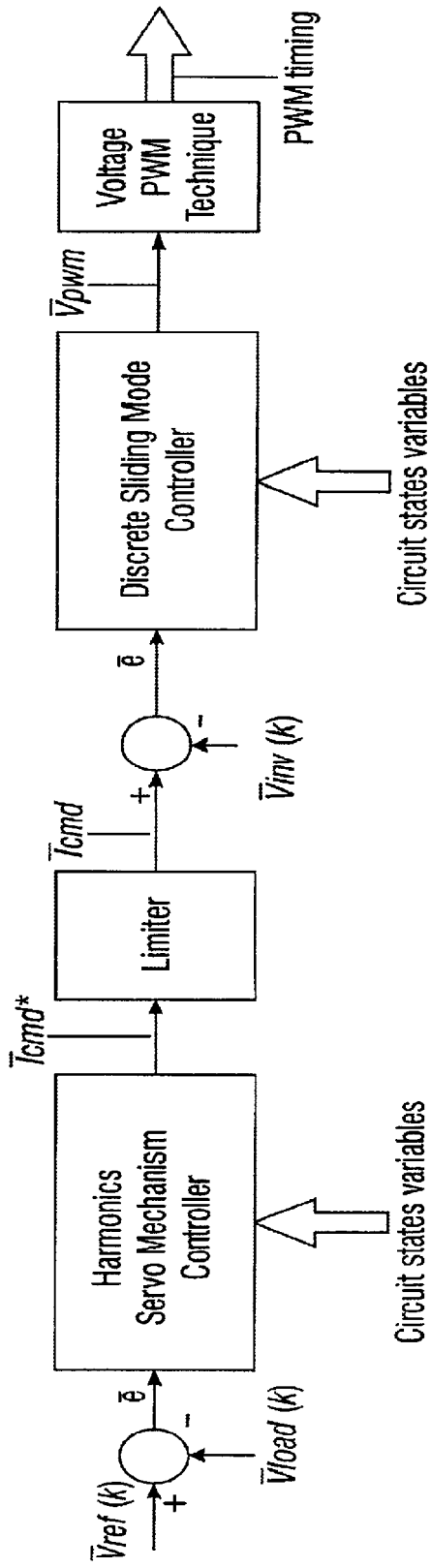
FIG. 27 is a simplified block diagram of the UPS control system.

The output control method of the present invention uses a two-loop control as shown in FIG. 27. The inner loop regulates the inverter current using a discrete sliding mode controller. This inner current loop provides fast transient response and current limiting for system protection. The outer loop regulates the inverter voltage using a harmonic servomechanism controller. The circuit states variables are used for the construction of both the voltages and current controllers.

The inner discrete sliding mode current control loop provides fast transient response, which is useful to limit current and prevent inverter damage by an overload condition. The discrete sliding mode controller also has zero overshoot, which improves response to load transients.

The harmonic servomechanism control improves the critical bus voltage THD by eliminating selected harmonics from the output voltage and provides good output voltage transient performance during load changes. Another advantage of the harmonic servomechanism controller in the present invention is that it is easier to stabilize than similar approaches that use the internal define model principle. One disadvantage of the harmonic servomechanism control is that it can eliminate only a finite number of disturbances in the control model. However, this limitation is not unduly burdensome in practical applications because excellent THD results may be obtained by eliminating only a few critical harmonics.

Figure 28:
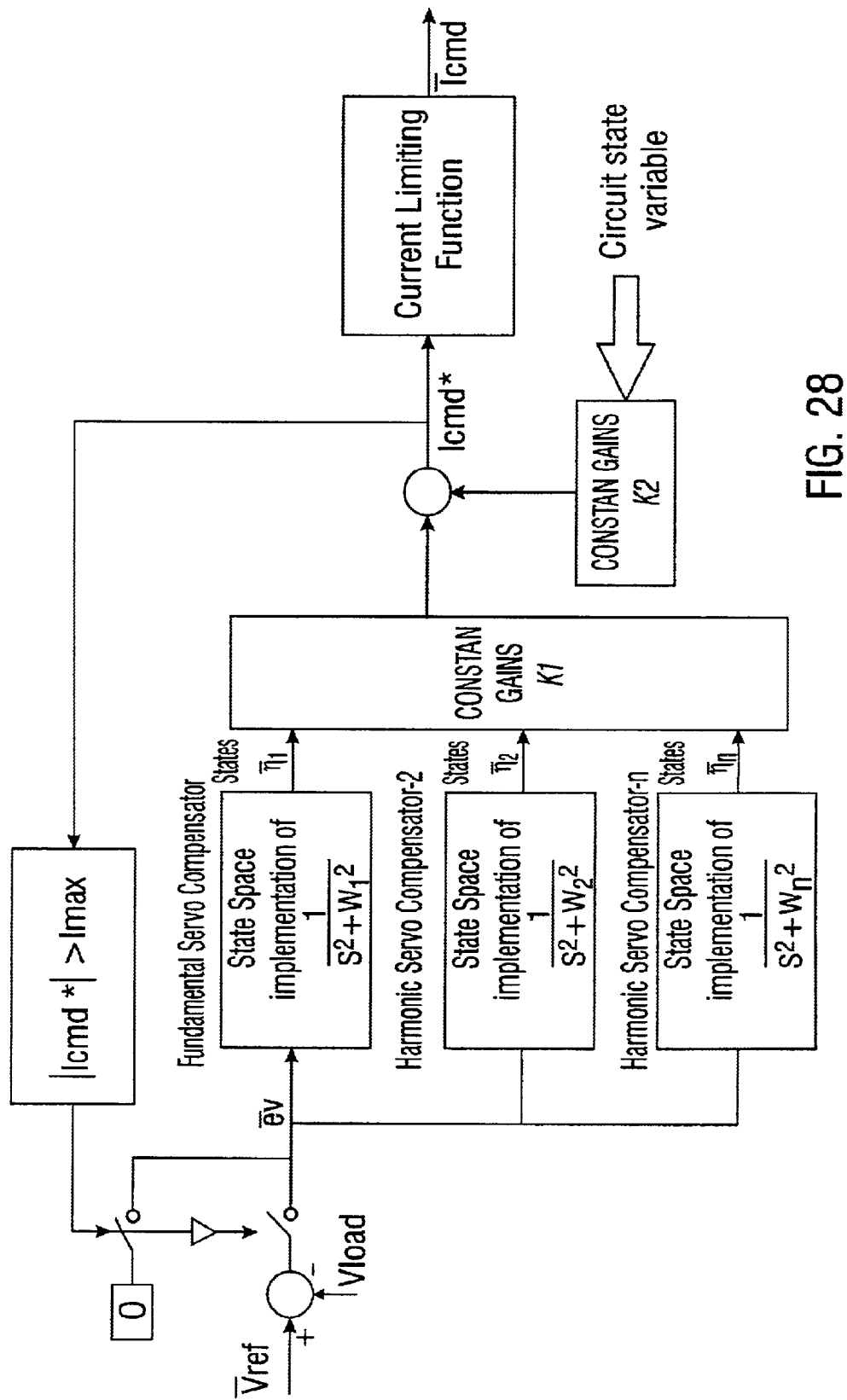
FIG. 28 is an expanded block diagram of the UPS control system.

FIG. 28 shows the harmonic servomechanism controller used for the output voltage control. The controller includes servo compensator blocks for the fundamental frequency (Fundamental Servo-Compensator) and the harmonic frequencies to be eliminated (Harmonic Servo-Compensator 2 through n). Each harmonic servo compensator block is driven by the error signal, which is the difference between the reference voltage ($V_{ref}$) and the actual load voltage ($V_{load}$). Each compensator block is a state space implementation of the analog transfer function:

$$T(s) = \frac{1}{s^2 + \omega_i^2}$$

where $\omega_i = 2\pi \cdot i \cdot f$, f is the fundamental frequency and $i \cdot f$ is the harmonic frequency chosen to be eliminated. Specifically, the following continuous state space implementation of T(s) may be used for each harmonic servo compensator block:

$$\dot{\eta}_i = \begin{pmatrix} 0 & 1 \\ -\omega_i^2 & 0 \end{pmatrix} \eta_i + \begin{pmatrix} 0 \\ 1 \end{pmatrix} e$$

This state space form may be further discretized to obtain a discrete state space implementation of the transfer function suitable for digital control implementation. Any standard discretization method known to those skilled in the art may be used for this purpose.

The fundamental servo compensator ensures that the actual voltage tracks the reference voltage at the fundamental frequency of 50/60 Hz, while each harmonic servo compensator block ensures the elimination of the corresponding harmonic contents caused by the load disturbances. These conditions are guaranteed by the internal model principle, which states that if frequency modes (poles) of the references and the disturbances to be eliminated are included in the control loop, then the steady state error will not contain these frequency contents. Each of these harmonic compensators can be viewed as a controlled sine wave signal generators running at the specified harmonic frequency. Each controlled signal generator reacts only to the existence of the corresponding harmonic in the error signals and adjusts the inverter current commands to force the corresponding harmonic content of the error to zero.

The inverter current command signal generated by the harmonic servomechanism voltage controller is constructed from linear combinations of the states of the servo compensators and the circuit state variables feedback. This is shown in FIG. 28 as the constant gains block K1, which multiply the servo compensator states and gains K2 which multiply the circuit state variables. The gains K1 and K2 are chosen to ensure stability of the overall closed loop system and to provide good transient performance.

Figure 29:
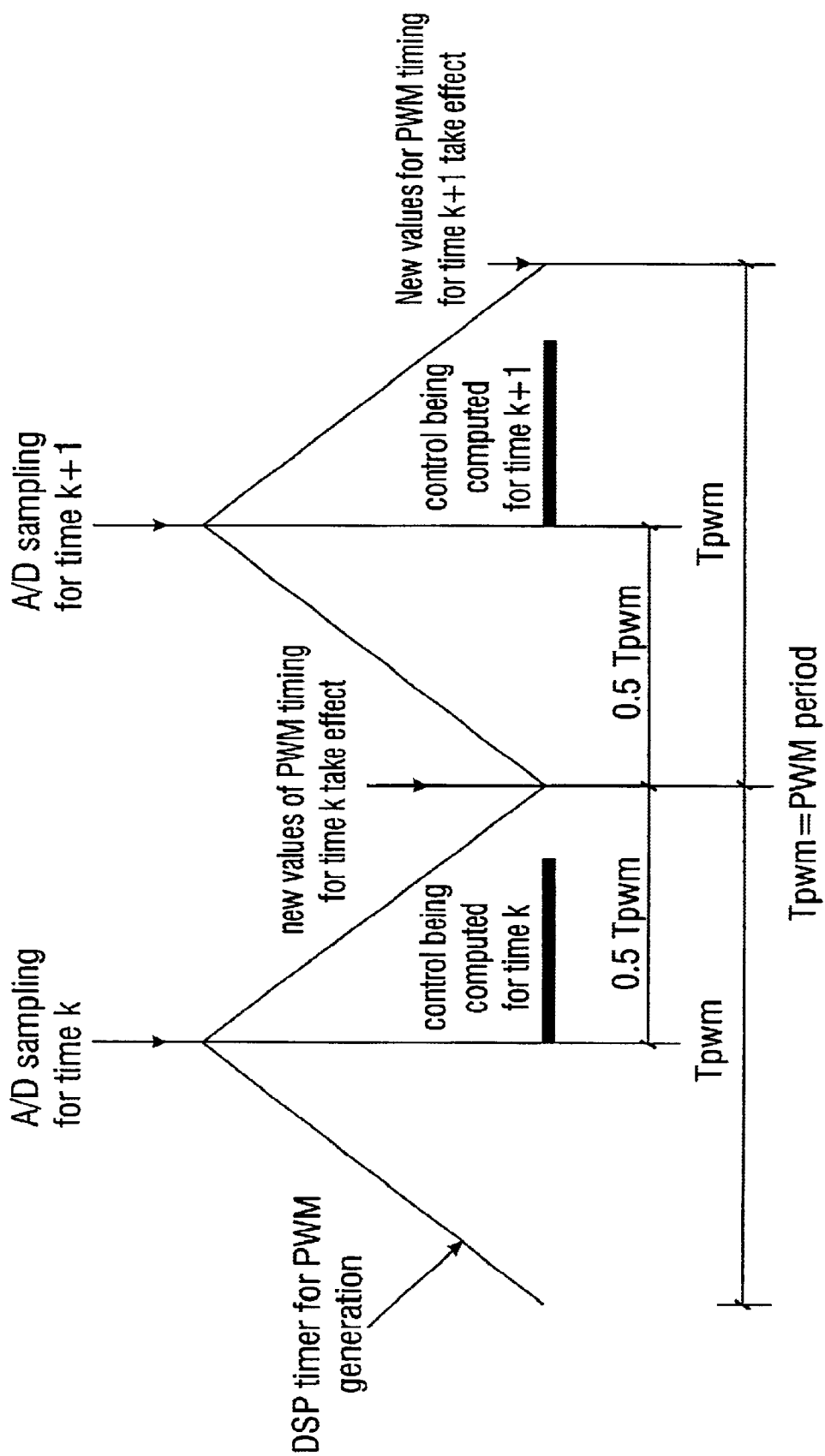
FIG. 29 is a timing diagram illustrating the look-ahead prediction employed by the controller.

The method of the invention may also include the steps for calculating the gains K1 and K2 using an optimal state feedback, which may improve the stability and transient response of the control system. The basic theory of using an optimal state feedback for calculating gains K1 and K2 is known to those skilled in the art as the perfect robust servomechanism control problem as described in Davison, E. J. and Scherzinger, B., "Perfect Control of the robust servomechanism problem", *IEEE Trans. On Automatic Control*, 32 (8), 689–702, 1987. Application of this basic theory to the present invention, however, requires certain extensions and modifications, due to the inclusion of the discrete time sliding mode controller in the inner current loop and the inherent delay introduced by digital implementation of the controller. FIG. 29 shows the timing diagram of the PWM gating signals generation in relation with the A/D sampling time of the DSP. It can be seen that there is a one-half PWM period delay between the time the signals are sampled by the A/D and the time the PWM control action is applied. To best explain the method of the present invention for calculating the control gains, a specific example of a three-phase PWM inverter as in FIG. 30 will be used. The following paragraphs detail the method as applied to the inverter system in FIG. 30.

Figure 30:
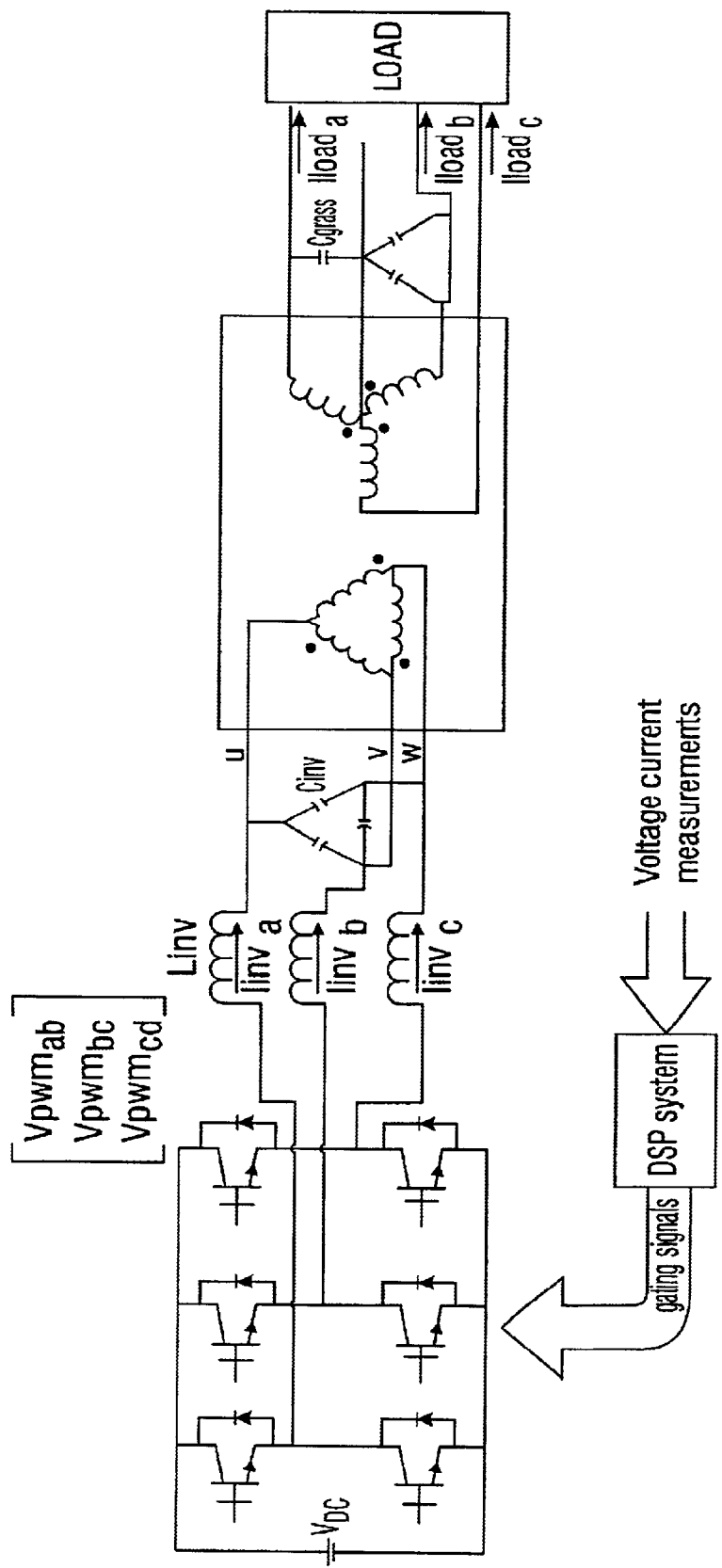
FIG. 30 is a simplified schematic of the UPS illustrating the control variables used in controlling the UPS.

The inverter system in FIG. 30 consists of a three-phase PWM voltage IGBT inverter with LC output filter ($L_{inv}$ and $C_{inv}$) and a delta-wye transformer that act both as a potential transformer and electrical isolation to the load. Small capacitors (denoted as $C_{grass}$ in FIG. 30) are added at the load side of the transformer to provide further harmonic filtering and stabilization of the load voltages. A DSP (Digital Signal Processor) system controls the operation of the power converter, providing required PWM gating signals to the power devices. Voltages and currents measured by the DSP system for control purposes are shown labeled in FIG. 30. The line-to-neutral load voltages (at points xyz-n in FIG. 30) are denoted as: $V_{load-an}$, $V_{load-bn}$, and $V_{load-cn}$, the load phase currents as: $I_{load-a}$, $I_{load-b}$, and $I_{load-c}$, the line-to-line inverter filter capacitor voltages (at points uvw in FIG. 30) as: $V_{inv-ab}$, $V_{inv-bc}$ and $V_{inv-ca}$, the inverter phase currents as: $I_{inv-a}$, $I_{inv-b}$, and $I_{inv-c}$.

Figure 31:
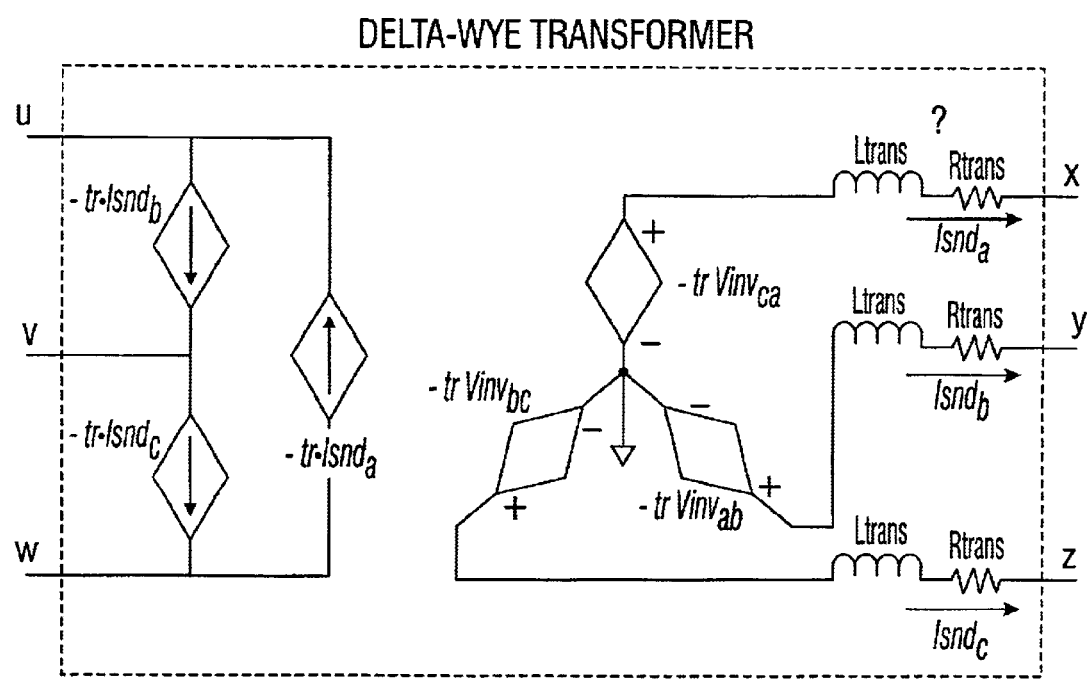
FIG. 31 is a schematic of the equivalent circuit of the output transformer illustrating the control variables.

For development of the control algorithm, a state space model of the system is needed. Each phase of the delta-wye transformer has been modeled as an ideal transformer with leakage inductance $L_{trans}$ and series resistance $R_{trans}$ on the secondary winding as shown in FIG. 31. The secondary transformer currents are denoted as $I_{snd-a}$, $I_{snd-b}$, and $I_{snd-c}$. Using the transformer model in FIG. 31, a state space equation of the output filter circuit in FIG. 1 can be written as in equations (1.a)–(1.d):

$$\frac{d\vec{V}inv_{abc}}{dt} = \frac{1}{3 \cdot C_{inv}} \vec{I}inv_{abc} - \frac{1}{3 \cdot C_{inv}} Tr_i \cdot \vec{I}snd_{abc} \quad (1.a)$$

$$\frac{d\vec{I}inv_{abc}}{dt} = \frac{1}{L_{inv}} \vec{V}pwm_{abc} - \frac{1}{L_{inv}} \vec{V}inv_{abc} \quad (1.b)$$

$$\frac{d\vec{V}load_{abc}}{dt} = \frac{1}{C_{load}} \vec{I}snd_{abc} - \frac{1}{C_{load}} \vec{I}load_{abc} \quad (1.c)$$

$$\frac{d\vec{I}snd_{abc}}{dt} = -\frac{R_{trans}}{L_{tran}} \vec{I}snd + \frac{1}{L_{tran}} Tr_v \cdot \vec{V}inv_{abc} - \frac{1}{L_{tran}} \vec{V}load_{abc} \quad (1.d)$$

where the voltages and currents vectors are defined as in (2).

$$\vec{V}inv_{abc} = ([Vinv_{ab} \ Vinv_{bc} \ Vinv_{ca}])^T \quad (2)$$

$$\vec{V}load_{abc} = [Vload_a \ Vload_b \ Vload_c]^T,$$

$$\vec{I}load_{abc} = [Iload_a \ Iload_b \ Iload_c]^T$$

$$\vec{I}snd_{abc} = [Isnd_a \ Isnd_b \ Isnd_c]^T,$$

$$\vec{I}inv_{abc} = [Iinv_{ab} \ Iinv_{bc} \ Iinv_{ca}]^T$$

$$= [Iinv_a - Iinv_b \ Iinv_b - Iinv_c \ Iinv_c - Iinv_a]^T$$

Matrices $Tr_i$ and $Tr_v$ in the equations above denote the currents and voltages transformations of the delta-wye transformer. Denoting the transformer's turn ratio as tr, these matrices are given by (3):

$$Tr_i = tr \cdot \begin{bmatrix} 1 & -2 & 1 \\ 1 & 1 & -2 \\ -2 & 1 & 1 \end{bmatrix}, \quad Tr_v = tr \cdot \begin{bmatrix} 0 & 0 & -1 \\ -1 & 0 & 0 \\ 0 & -1 & 0 \end{bmatrix} \quad (3)$$

To obtain a state space model of the system, the dynamic equations in (1) are transformed to the DQ0 stationary reference frame using the transformation:

$$\vec{f}_{qd0} = K_S \cdot \vec{f}_{abc}, \quad (4)$$

with $$K_S = \frac{2}{3} \begin{bmatrix} 1 & -0.5 & -0.5 \\ 0 & -\sqrt{3}/2 & \sqrt{3}/2 \\ 0.5 & 0.5 & 0.5 \end{bmatrix},$$

$$f_{qd0} = [f_q, f_d, f_0]^T, \ f_{abc} = [f_a, f_b, f_c]^T$$

where $\vec{f}_{abc}$ denotes the abc voltages and currents defined in (2), and $\vec{f}_{qd0}$ the corresponding DQ0 stationary reference frame variables. The circuit dynamics can then be written as in (5.a–5.d):

$$\frac{d\vec{V}inv_{qd}}{dt} = \frac{1}{3 \cdot C_{inv}} \vec{I}inv_{qd} - \frac{1}{3 \cdot C_{inv}} Tri_{qd0} \cdot \vec{I}snd_{qd0} \quad (5.a)$$

$$\frac{d\vec{I}inv_{qd}}{dt} = \frac{1}{L_{inv}} \vec{V}pwm_{qd} - \frac{1}{L_{inv}} \vec{V}inv_{qd} \quad (5.b)$$

$$\frac{d\vec{V}load_{qd0}}{dt} = \frac{1}{C_{load}} \vec{I}snd_{qd0} - \frac{1}{C_{load}} \vec{I}load_{qd0} \quad (5.c)$$

$$\frac{d\vec{I}snd_{qd0}}{dt} = -\frac{R_{tran}}{L_{tran}} \vec{I}snd_{qd0} + \frac{1}{L_{tran}} Trv_{qd} \cdot \vec{V}inv_{qd} - \frac{1}{L_{tran}} \vec{V}load_{qd0} \quad (5.d)$$

where the matrices $Tri_{qd0}$ and $Trv_{qd}$ are defined as:

$$Tri_{qd0} = [K_s \cdot Tr_i \cdot K_S^{-1}]_{row1,2} = tr \cdot \frac{3}{2} \begin{bmatrix} 1 & \sqrt{3} & 0 \\ -\sqrt{3} & 1 & 0 \end{bmatrix} \quad (6.a)$$

$$Trv_{qd} = [K_s \cdot Tr_v \cdot K_S^{-1}]_{col1,2} = tr \cdot \frac{1}{2} \begin{bmatrix} 1 & -\sqrt{3} \\ \sqrt{3} & 1 \\ 0 & 0 \end{bmatrix} \quad (6.b)$$

Notice that, due to the three-wire system of the inverter and filter, the zero components of the inverter voltages ($\vec{V}inv_{qd}$), the inverter currents ($\vec{I}inv_{qd}$) and the input PWM voltages $\vec{V}pwm_{qd}$ are trivial and they do not appear in the equations above.

The next two subsections summarize the development of the two control loops, the inner current loop using the discrete sliding mode controller and the voltage control loop using the robust servomechanism principles. For designing the discrete time sliding mode current controller, consider the inverter and filter subsystem with no transformer and load dynamics:

$$\frac{d\vec{V}inv_{qd}}{dt} = \frac{1}{3 \cdot C_{inv}} \vec{I}inv_{qd} - \frac{1}{3 \cdot C_{inv}} Tri_{qd0} \cdot \vec{I}snd_{qd0} \quad (24.a)$$

$$\frac{d\vec{I}inv_{qd}}{dt} = \frac{1}{L_{inv}} \vec{V}pwm_{qd} - \frac{1}{L_{inv}} \vec{V}inv_{qd} \quad (24.b)$$

Assuming the secondary transformer currents $\vec{I}snd_{qd0}$ as disturbances, this subsystem can be written in state space form as:

$$\dot{\vec{x}}_1 = A_1 \vec{x}_1 + B_1 \vec{u} + E_1 \vec{d}_1 \quad (25)$$

$$\vec{A}_1 = \begin{bmatrix} \vec{0}_{2 \times 2} & (3 \cdot C_{inv})^{-1} \cdot \vec{I}_{2 \times 2} \\ -(L_{inv})^{-1} \cdot \vec{I}_{2 \times 2} & \vec{0}_{2 \times 2} \end{bmatrix},$$

$$\vec{B}_1 = \begin{bmatrix} \vec{0}_{2 \times 2} \\ (L_{inv})^{-1} \cdot \vec{I}_{2 \times 2} \end{bmatrix}, \vec{E}_1 = \begin{bmatrix} -(3 \cdot C_{inv})^{-1} \cdot Tri_{qd0} \\ \vec{0}_{2 \times 3} \end{bmatrix},$$

where the states are $\vec{x}_1 = [\vec{V}inv_{qd}, \vec{I}inv_{qd}]$, the inputs $\vec{u} = \vec{V}pwm_{qd}$ and disturbances $\vec{d}_1 = \vec{I}snd_{qd}$.

The discrete form of (25) can be calculated as:

$$\vec{x}_1(k+1) = A_1^* \vec{x}_1(k) + B_1^* \vec{u}(k) + E_1^* \vec{d}_1(k)$$

where $$A_1^* = \exp(A \cdot T_S) \ B_1^* = \int_0^{T_S} e^{A_1 \cdot T_S} B_1 \, d\tau$$

-continued $$E_1^* = \int_0^{T_S} e^{A_1 \cdot T_S} E_1 \, d\tau$$

and $T_S$ is the A/D sampling time, which in this case is equal to the PWM period $T_{pwm}$.

To force the inverter currents to follow their commands, the sliding mode surface is chosen as: $\vec{s}(k) = C_1 \cdot \vec{x}_1(k) - \vec{I}\,cmd(k)$ where $c_1 \cdot \vec{x}_1(k) = \vec{I}\,inv_{qd}(k)$, so that when discrete sliding mode occurs, we have $\vec{s}(k)=0$ or $\vec{I}\,inv(k) = \vec{I}\,cmd(k)$. The existence of the discrete sliding mode can be guaranteed if the control is given:

$$u(k) = \begin{cases} \vec{u}_{eq}(k) & \text{for } \|\vec{u}_{eq}(k)\| \le u_0 \\ u_0 \dfrac{\vec{u}_{eq}(k)}{\|\vec{u}_{eq}(k)\|} & \text{for } \|\vec{u}_{eq}(k)\| > u_0 \end{cases} \quad (26)$$

where the equivalent control input $\vec{u}_{eq}(k)$ is calculated from:

$$\vec{u}_{eq}(k) = (C_1 B_1^*)^{-1}(\vec{I}\,cmd_{qd} - C_1 A_1^* \vec{x}_1(k) - C_1 E_1^* \vec{d}_1(k)) \quad (27)$$

and $u_0$ denotes the maximum value of the PWM voltage command realizable by the space vector algorithm.

Note that the secondary transformer currents are needed for the control, but these currents are not measured in the system (see FIG. 31). A linear Luenberger observer can be easily designed to estimate these currents for control purposes. However, in most practical cases we can approximate these currents with the load currents (i.e. $\vec{I}\,snd_{qd} \approx \vec{I}\,load_{qd}$), because the currents through the output capacitor filters are small. According to the inventors' experience, the effect of using this approximation is unnoticeable in the control performance.

Due to the computation delay of the DSP, the control action given by above will result in undesirable overshoots during transients. This effect can be minimized, however, if the states $\vec{x}_1(k)$ and disturbances $\vec{d}_1(k)$ are replaced with their first order one-half step ahead predicted values given by:

$$\vec{x}_1^P(k) = 1.5 \cdot \vec{x}_1(k) - 0.5 \cdot \vec{x}_1(k-1)$$

$$\vec{d}_1^P(k) = 1.5 \cdot \vec{d}_1(k) - 0.5 \cdot \vec{d}_1(k-1) \quad (28)$$

The equivalent control input $\vec{u}_{eq}(k)$ then becomes:

$$\vec{u}_{eq}(k) = (C_1 B_1^*)^{-1}(\vec{I}\,cmd_{qd} - C_1 A_1^* \vec{x}_1(k) - C_1 E_1^* \vec{d}_1^P(k)) \quad (29)$$

The voltage control loop designed in this invention is based on the discrete form of the technique developed in Davison, cited above. To design the load voltages controller, first consider the entire plant system with the-0 components of the voltages and currents omitted as given above. As explained earlier, these 0-components are completely decoupled and uncontrollable from the inputs, and therefore are not useful to be included in the design. In the system, an input delay of one-half the PWM period ($0.5T_{pwm}$) has been explicitly included to account for the computation delay of the DSP.

$$\dot{x}_p(t) = A_p \vec{x}_p(t) + B_p \vec{u}(t - 0.5T_{pwm}), \quad (30)$$

$$\vec{A}_p = \begin{bmatrix} \vec{0}_{2\times 2} & (3 \cdot C_{inv})^{-1} \cdot \vec{I}_{2\times 2} & \vec{0}_{2\times 2} & -(3 \cdot C_{inv})^{-1} \cdot \hat{T}ri_{qd} \\ -(L_{inv})^{-1} \cdot \vec{I}_{2\times 2} & \vec{0}_{2\times 2} & \vec{0}_{2\times 2} & \vec{0}_{2\times 2} \\ \vec{0}_{2\times 2} & \vec{0}_{2\times 2} & \vec{0}_{2\times 2} & (C_{load})^{-1} \cdot \vec{I}_{2\times 2} \\ (L_{inv})^{-1} \cdot \hat{T}rv_{qd} & \vec{0}_{2\times 2} & -(L_{inv})^{-1} \cdot \vec{I}_{2\times 2} & -R_{trans}(L_{trans})^{-1} \cdot \vec{I}_{2\times 2} \end{bmatrix},$$

$$\vec{B}_p = \begin{bmatrix} \vec{0}_{2\times 2} \\ (L_{inv})^{-1} \cdot \vec{I}_{2\times 2} \\ \vec{0}_{2\times 2} \\ \vec{0}_{2\times 2} \end{bmatrix}, \quad \hat{T}ri_{qd} = tr \cdot \frac{3}{2}\begin{bmatrix} 1 & \sqrt{3} \\ -\sqrt{3} & 1 \end{bmatrix} \quad \hat{T}rv_{qd} = tr \cdot \frac{1}{2}\begin{bmatrix} 1 & -\sqrt{3} \\ \sqrt{3} & 1 \end{bmatrix}$$

The states variables for the system (30) are chosen as $\vec{x}_p = [\vec{v}\,inv_{qd}, \vec{I}\,inv_{qd}, \vec{V}\,load_{qd}, \vec{I}\,snd_{qd}]$, with the inputs as $u = \vec{V}\,pwm_{qd}$. System (30) can be transformed to a discrete-time system with sampling time $T_s = T_{pwm}$ to yield:

$$\vec{x}_p(k+1) = \Phi \cdot \vec{x}_p(k) + \Gamma_1 \cdot \vec{u}(k-1) + \Gamma_2 \cdot \vec{u}(k) \quad (31)$$

where $$\Phi = e^{A_p T_s}, \; \Gamma_1 = \int_{0.5T_s}^{T_s} e^{A_p \tau} B_p \, d\tau, \; \Gamma_2 = \int_0^{0.5T_s} e^{A_p \tau} B_p \, d\tau$$

Discrete time system (31) can be written in a standard discrete time state space equations by adding the extra states: $\vec{x}_a(k) = \vec{u}(k-1) = \vec{V}\,pwm_{qd}(k-1)$ to yield:

$$\begin{bmatrix} \vec{x}_p(k+1) \\ \vec{x}_a(k+1) \end{bmatrix} = \begin{bmatrix} \Phi & \Gamma_1 \\ \vec{0}_{2\times 2} & \vec{0}_{2\times 2} \end{bmatrix} \cdot \begin{bmatrix} \vec{x}_p(k) \\ \vec{x}_a(k) \end{bmatrix} + \begin{bmatrix} \Gamma_2 \\ \vec{I}_{2\times 2} \end{bmatrix} \cdot \vec{u}(k) \quad (32)$$

so that the system can be written as:

$$\vec{x}_p^*(k+1) = A_p^* \vec{x}_p^*(k) + B_p^* \vec{u}(k) \quad (33)$$

where:

$$\vec{x}_p^*(k) = \begin{bmatrix} \vec{x}_p(k) \\ \vec{x}_a(k) \end{bmatrix}, A_p^* = \begin{bmatrix} \Phi & \Gamma_1 \\ \vec{0}_{2\times 2} & \vec{0}_{2\times 2} \end{bmatrix}, B_p^* = \begin{bmatrix} \Gamma_2 \\ \vec{I}_{2\times 2} \end{bmatrix}$$

To design the voltage controller, we need to consider the true plant (33) and the discrete time sliding mode current controller as the equivalent 'plant' as seen by the outer voltage loop. Using equation (27) and (33) the augmented true plant and discrete sliding mode current controller can be found as in (34).

$$\vec{x}_p^*(k+1) = A_d \vec{x}_p^*(k) + B_d \vec{u}_1(k) \tag{34}$$

with $\vec{u}(k) = \vec{I}\,cmd_{qd}^*(k)$, and $$A_d = A_p^* - B_p^*(C_1 B_1^*)^{-1}(B_1^* C_{11} + E_1^* C_{12})$$

$$B_d = B_p^*(C_1 B_1^*)^{-1}$$

$$C_{11} = \begin{bmatrix} \vec{I}_{2\times 2} & \vec{0}_{2\times 2} & \vec{0}_{2\times 2} & \vec{0}_{2\times 2} & \vec{0}_{2\times 2} \\ \vec{0}_{2\times 2} & \vec{I}_{2\times 2} & \vec{0}_{2\times 2} & \vec{0}_{2\times 2} & \vec{0}_{2\times 2} \end{bmatrix}$$

$$C_{12} = \begin{bmatrix} \vec{0}_{2\times 2} & \vec{0}_{2\times 2} & \vec{0}_{2\times 2} & \vec{I}_{2\times 2} & \vec{0}_{2\times 2} \end{bmatrix}$$

Note that the augmented system given in (34) was found assuming the approximation $\vec{I}\,snd_{qd} \approx \vec{I}\,load_{qd}$ has been used.

Now, assume $\omega_i = 2\pi f_i$ $i=1,2,\ldots n$ are frequencies of the reference voltages and harmonics to be eliminated. For a 60-Hz UPS system with desire to eliminate 5th and 7th harmonics, for example, we use $\omega_1 = 2\pi\cdot 60$, $\omega_2 = 2\pi\cdot 5\cdot 60$, and $\omega_3 = 2\pi\cdot 7\cdot 60$. We can then choose the servo-compensator to be of the form (35):

$$\vec{\eta} = A_c \vec{\eta} + B_c e_{Vqd}$$

$$\vec{e}_{Vqd} = \vec{V}\,ref_{qd} - \vec{V}\,load_{qd} \tag{35}$$

where $$\vec{\eta} = [\vec{\eta}_1, \vec{\eta}_2, \ldots \vec{\eta}_n]^T \quad \vec{\eta}_i \in R^4, \, i=1,2,\ldots n$$

$A_c$=block diag $[Ac_1, Ac_2, \ldots, Ac_n]$ $B_c = [Bc_1, BC_2, \ldots, Bc_n]^T$ with $$Ac_i = \begin{pmatrix} \vec{0}_{2\times 2} & \vec{I}_{2\times 2} \\ -\omega_i^2 \vec{I}_{2\times 2} & \vec{0}_{2\times 2} \end{pmatrix}, i=1,2,\ldots n$$

$Bc_i = (\vec{0}_{2\times 2}\,\vec{I}_{2\times 2})^T$ $i=1,2,\ldots n$

Note that each of the blocks $\vec{\eta}_i = Ac_1 \vec{\eta}_i + Bc_i \vec{e}_{Vqd}$ represents a state space implementation of the continuous transfer function: $1/(s^2 + \omega_i^2)$ for each of the qd-axis voltages errors.

The servo compensator (35) can be transformed to a discrete time system to yield:

$$\vec{\eta}(k+1) = A_c^* \vec{\eta}(k) + B_c^* \vec{e}_{vqd}(k), \; \vec{e}_{vqd}(k) = \vec{V}\,ref_{qd}(k) - \vec{V}\,load_{qd}(k) \tag{36}$$

where:

$$A_c^* = \exp(A_c \cdot T_S) \; B_c^* = \int_0^{T_S} e^{A_1 \cdot (T_S - \tau)} B_c \, d\tau$$

Now that we have determined the 'plant' and the servo compensator, the control input for the perfect robust servo-mechanism controller is given by:

$$\vec{u}_1(k) = \vec{I}\,cmd_{qd}^*(k) = K_0 x_p^*(k) + K_1 \eta(k) \tag{37}$$

where the gains $K = [K_0 \; K_1]$ are found by minimizing the discrete performance index:

$$J_\varepsilon = \sum_{k=0}^{\infty} (z(k)' z(k) + \varepsilon \cdot u(k)' u(k)), \tag{38}$$

$$z = \begin{bmatrix} x_p^* \\ \eta \end{bmatrix}$$

for the augmented 'equivalent plant' (34) and the servo compensator (36):

$$\begin{bmatrix} \vec{x}_p^*(k+1) \\ \eta(k+1) \end{bmatrix} = \begin{bmatrix} A_d & 0 \\ -B_c^* C & A_c^* \end{bmatrix} \begin{bmatrix} \vec{x}_p^*(k) \\ \eta(k) \end{bmatrix} + \begin{bmatrix} B_d \\ -B_c^* D \end{bmatrix} u_1(k) \tag{39}$$

where $\epsilon > 0$ is an arbitrarily small scalar.

The current command $\vec{I}\,cmd_{qd}^*(k)$ generated by the robust servomechanism voltage controller above is limited in magnitude as in (40) to yield the current command $\vec{I}\,cmd_{qd}(k)$, which will be implemented by the inner loop current controller:

$$\vec{I}\,cmd_{qd}(k) = \begin{cases} \vec{I}\,cmd_{qd}^*(k) & \text{if } |\vec{I}\,cmd_{qd}^*(k)| \leq I_{\max} \\ \dfrac{\vec{I}\,cmd_{qd}^*(k)}{|\vec{I}\,cmd_{qd}^*(k)|} I_{\max} & \text{if } |\vec{I}\,cmd_{qd}^*(k)| > I_{\max} \end{cases} \tag{40}$$

$I_{max}$ represents the maximum allowable magnitude of the inverter currents. Equation (40) limits the magnitude of the current commands but maintains their vector directions in the qd-space.

The states $\vec{\eta}_i$ of the servo-compensator can be seen as sine wave signal generators that get excited by the harmonic contents of the error signals at frequency $\omega_i$. When the control inputs of the robust servomechanism voltage controller saturate i.e., $|\vec{I}\,cmd_{qd}^*(k)| > I_{max}$ the servo-compensator states will grow in magnitude due to the break in the control loop. This problem is similar to the integrator windup problem that occurs in an integral type controller. To prevent this, the servo-compensator in (36) can be modified as follows:

$$\vec{\eta}(k+1) = A_c^* \vec{\eta}(k) + B_c^* \vec{e}_1(k),$$

$$\vec{e}_1(k) = \begin{cases} \vec{e}_{Vqd}(k) & \text{if } |\vec{I}\,cmd_{qd}^*| \leq I_{\max} \\ 0 & \text{if } |\vec{I}\,cmd_{qd}^*| > I_{\max} \end{cases} \tag{41}$$

Figure 32:
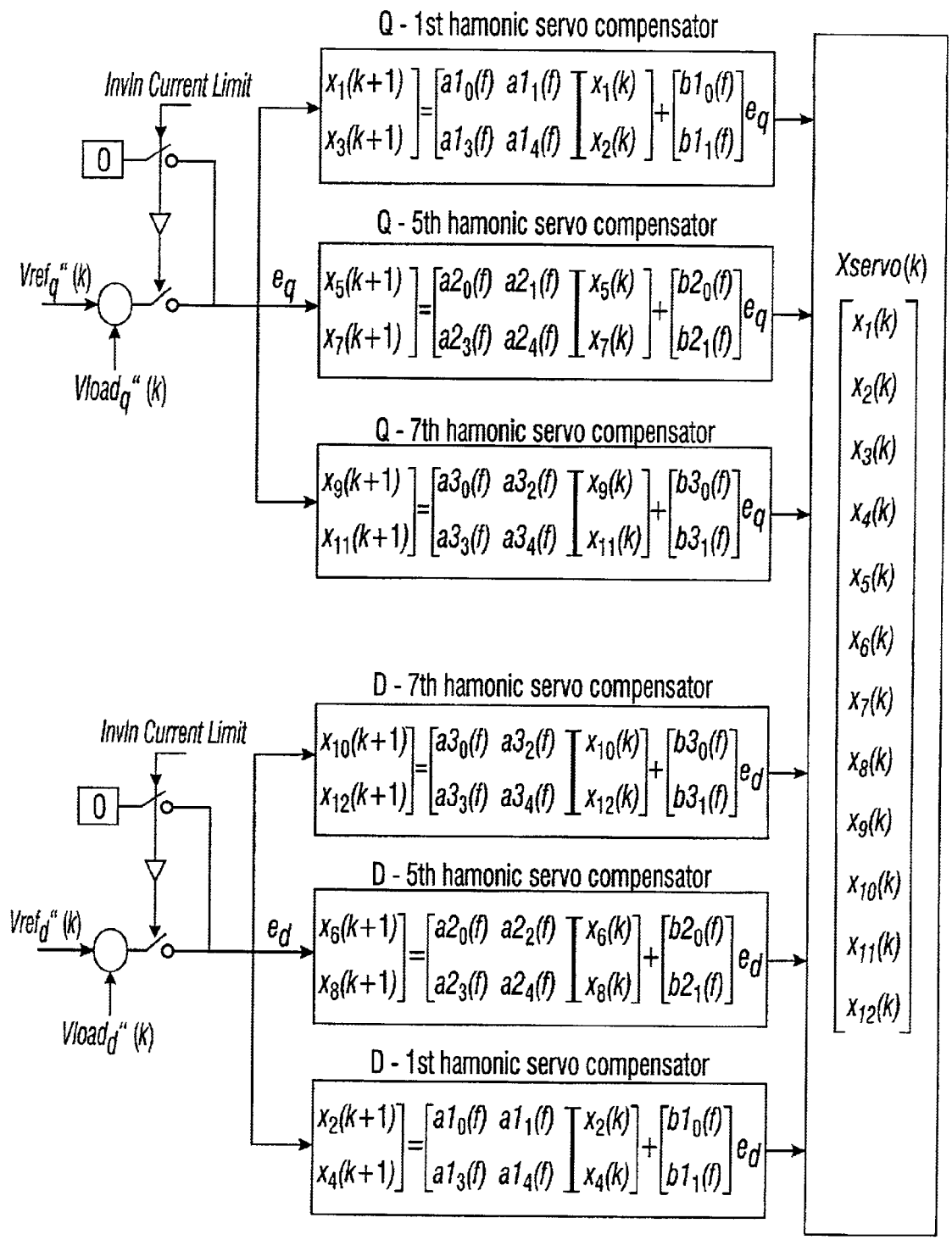
FIG. 32 is a first portion of an expanded block diagram illustrating the harmonic servo compensator used in the UPS of the present invention.
Figure 33:
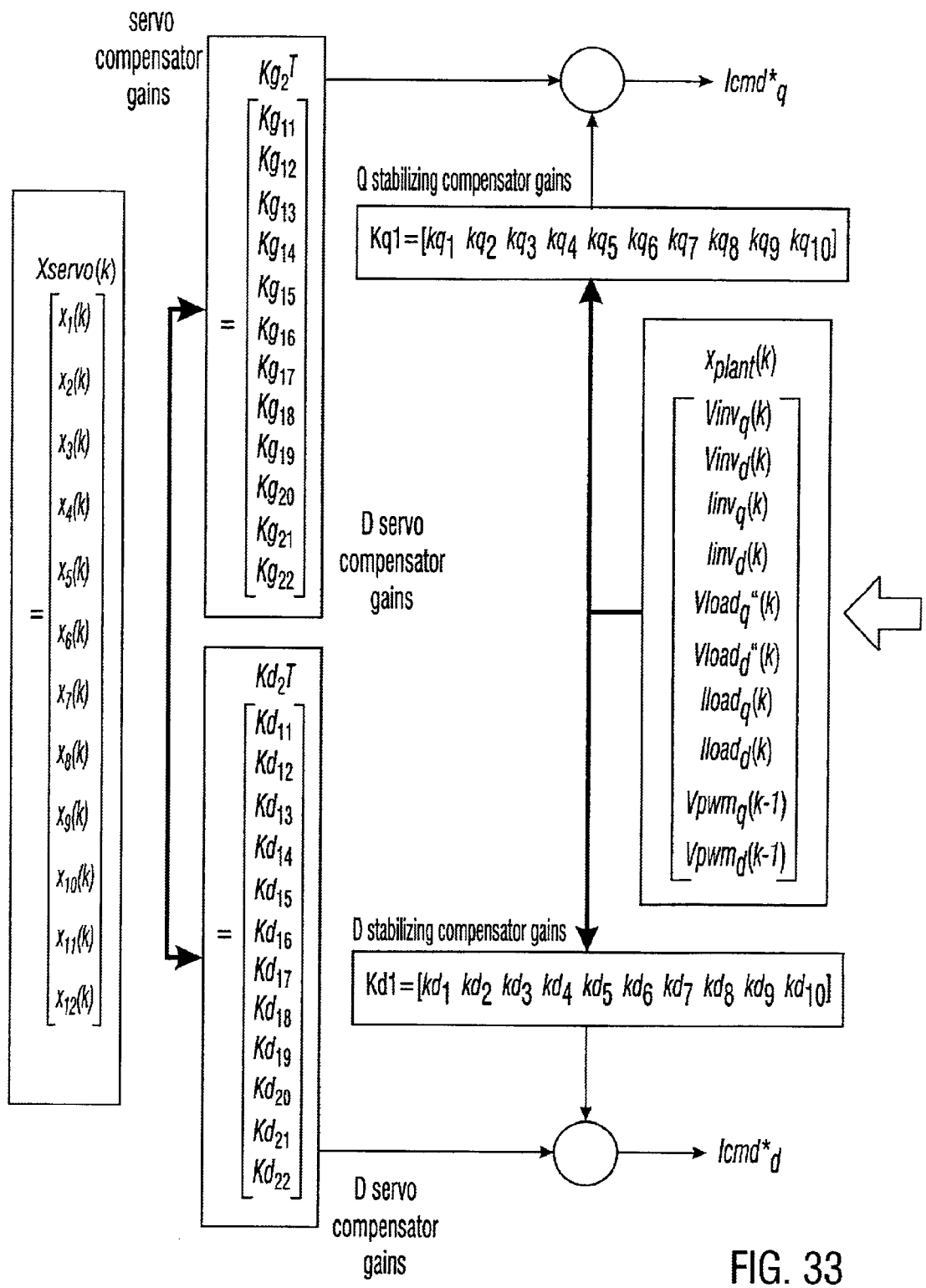
FIG. 33 is a second portion of an expanded block diagram illustrating the harmonic servo compensator used in the UPS of the present invention.
Figure 35A:
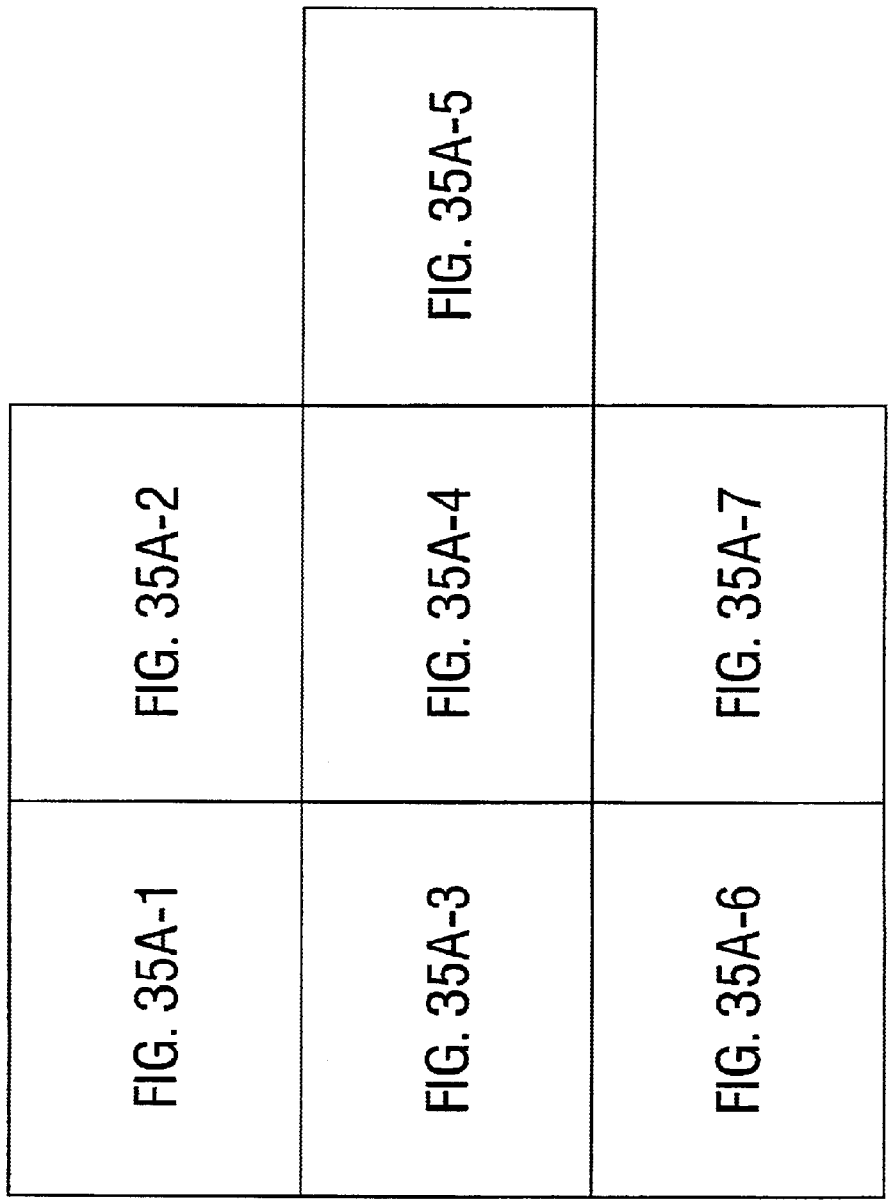
FIG. 35 is a schematic diagram of the memory arbitrator circuit employed in the UPS of the present invention.
Figures 1, 35A:
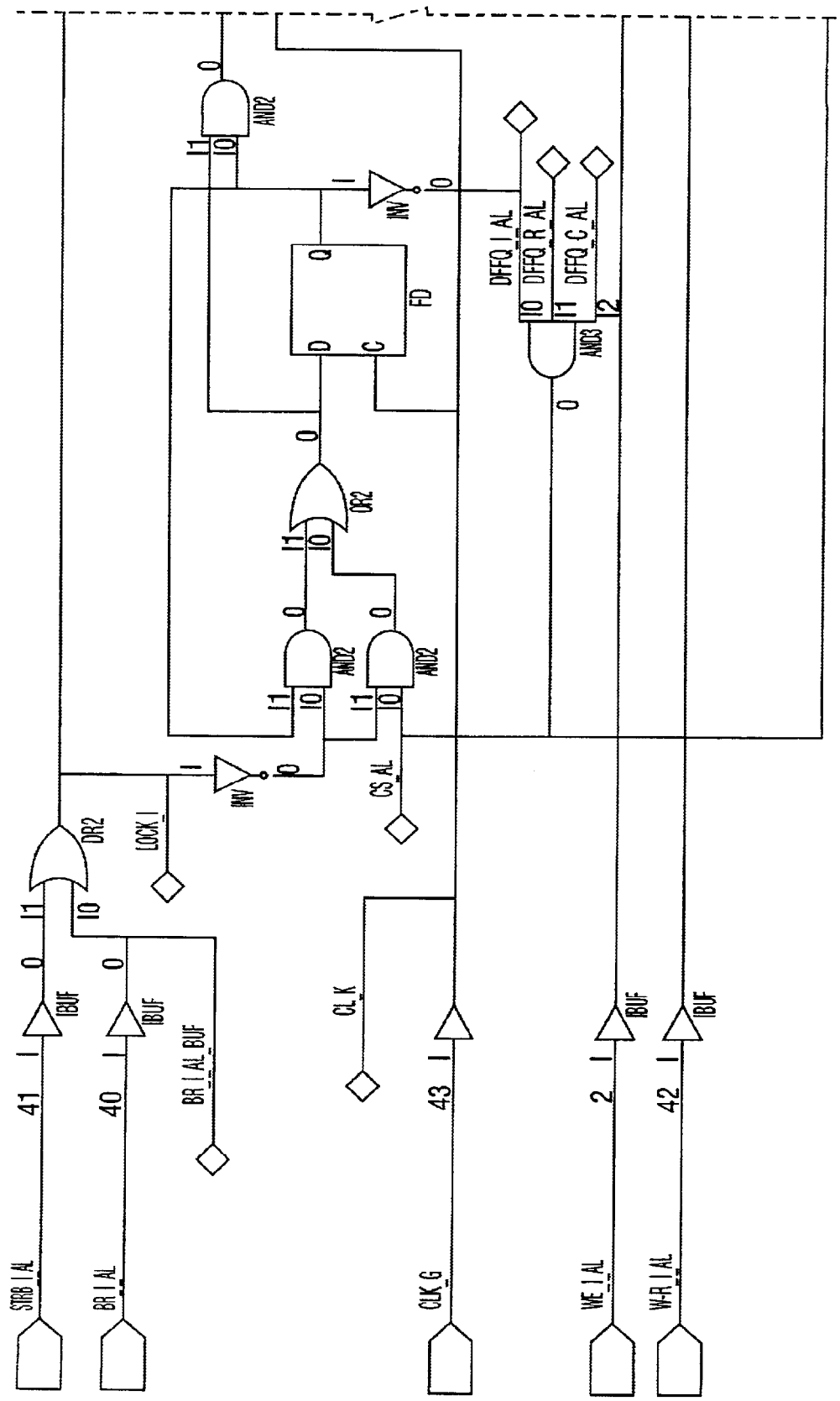
Figures 2, 35A:
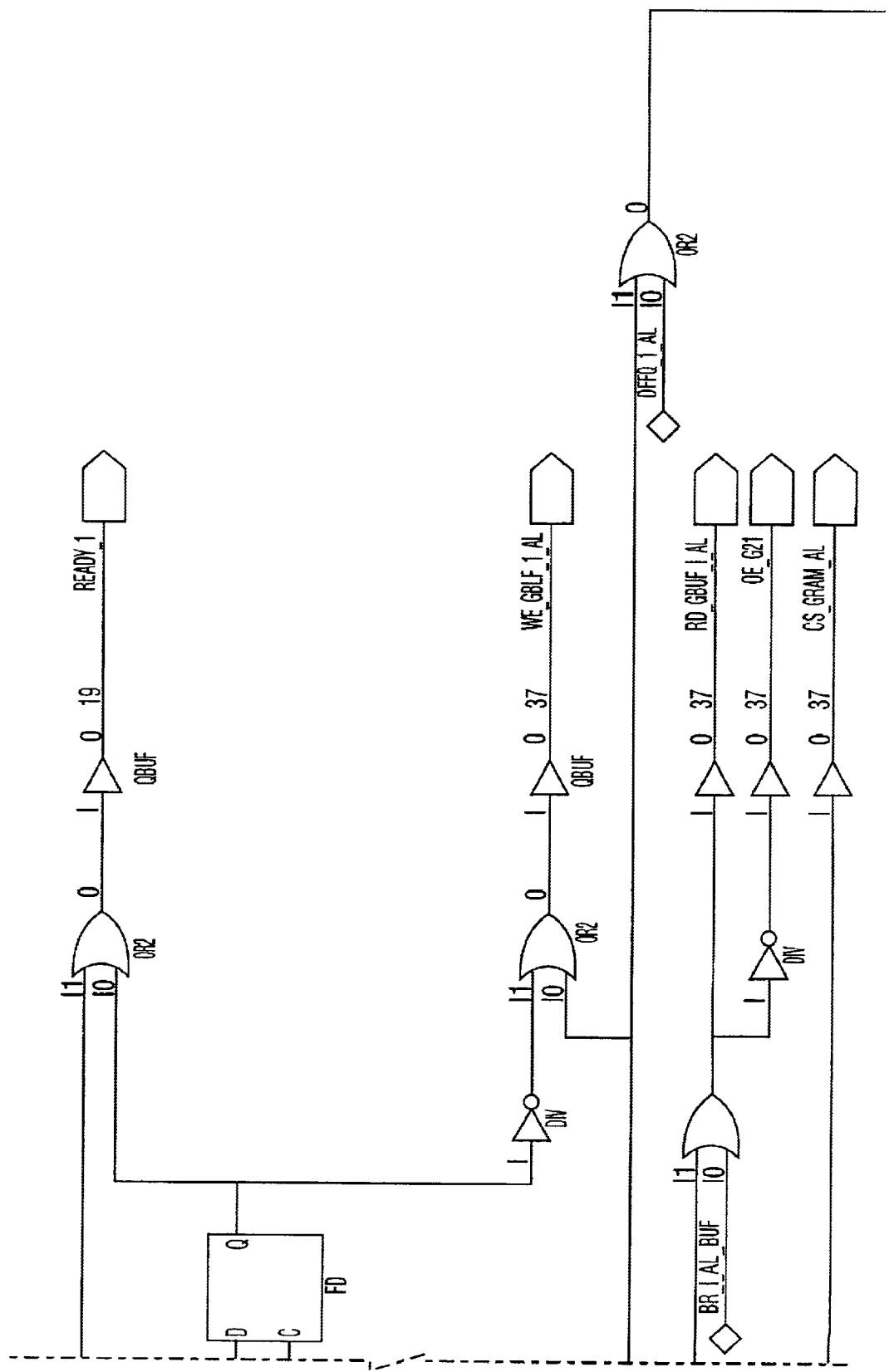
Figures 3, 35A:
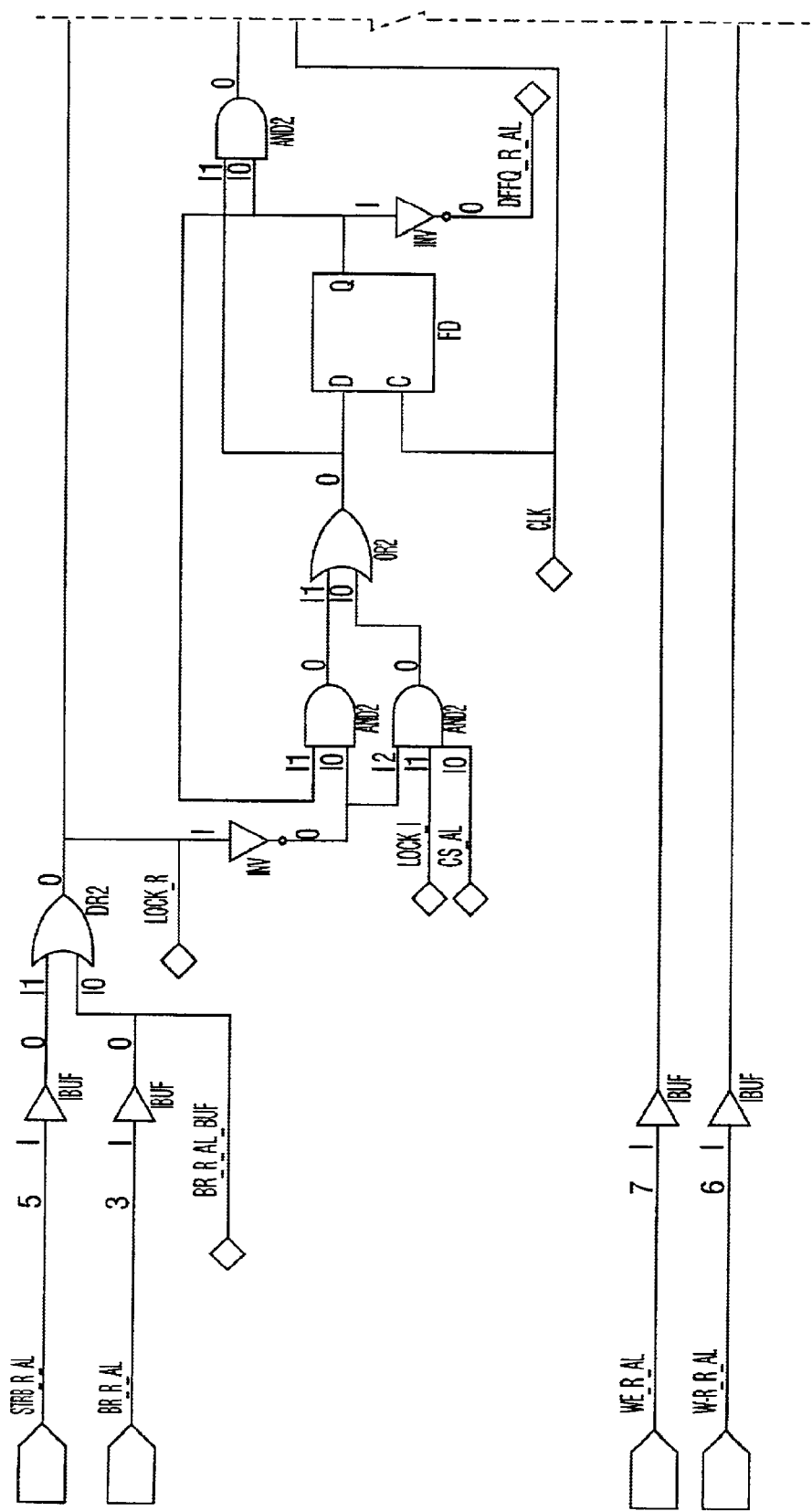
Figures 4, 35A:
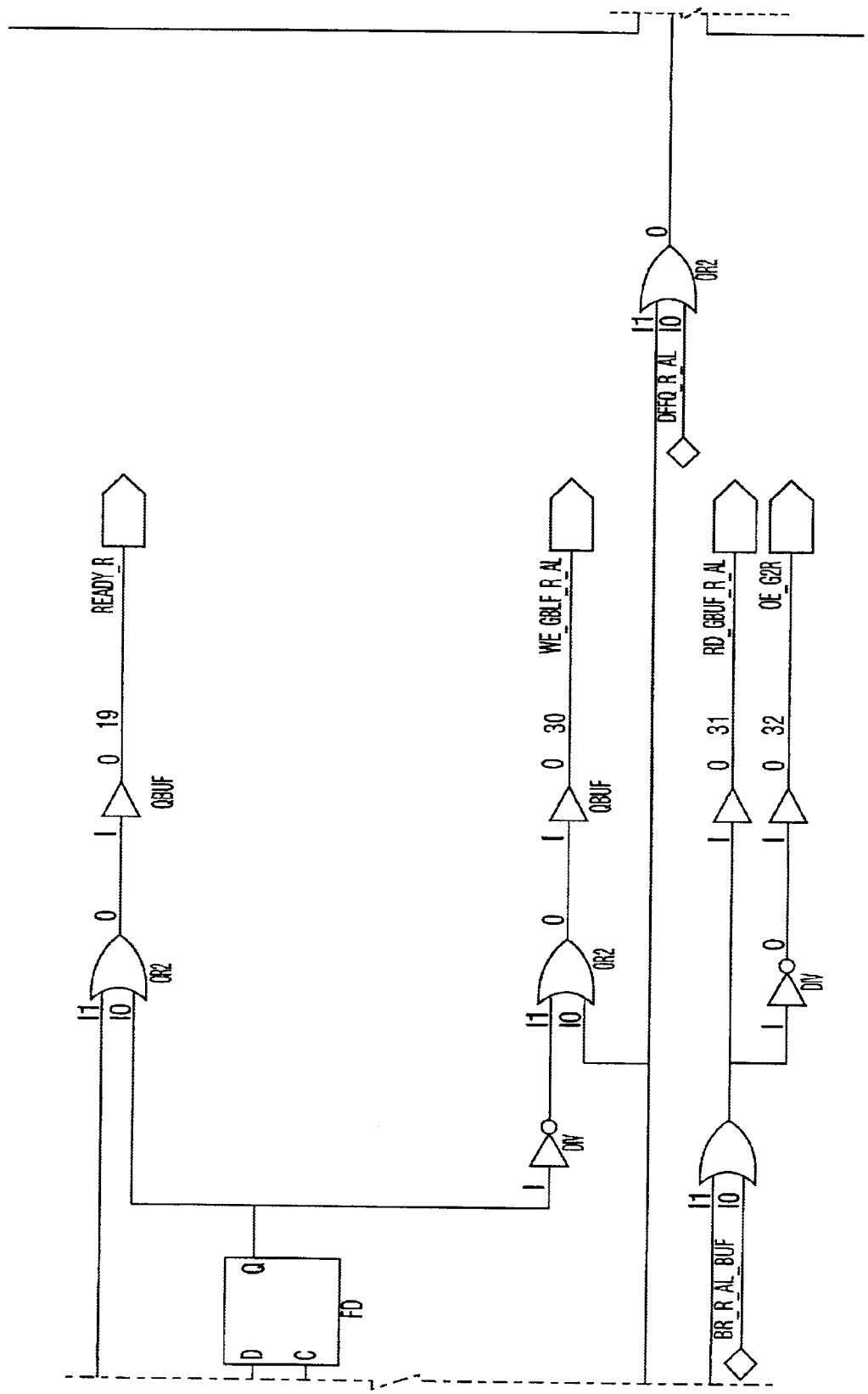
Figures 5, 35A:
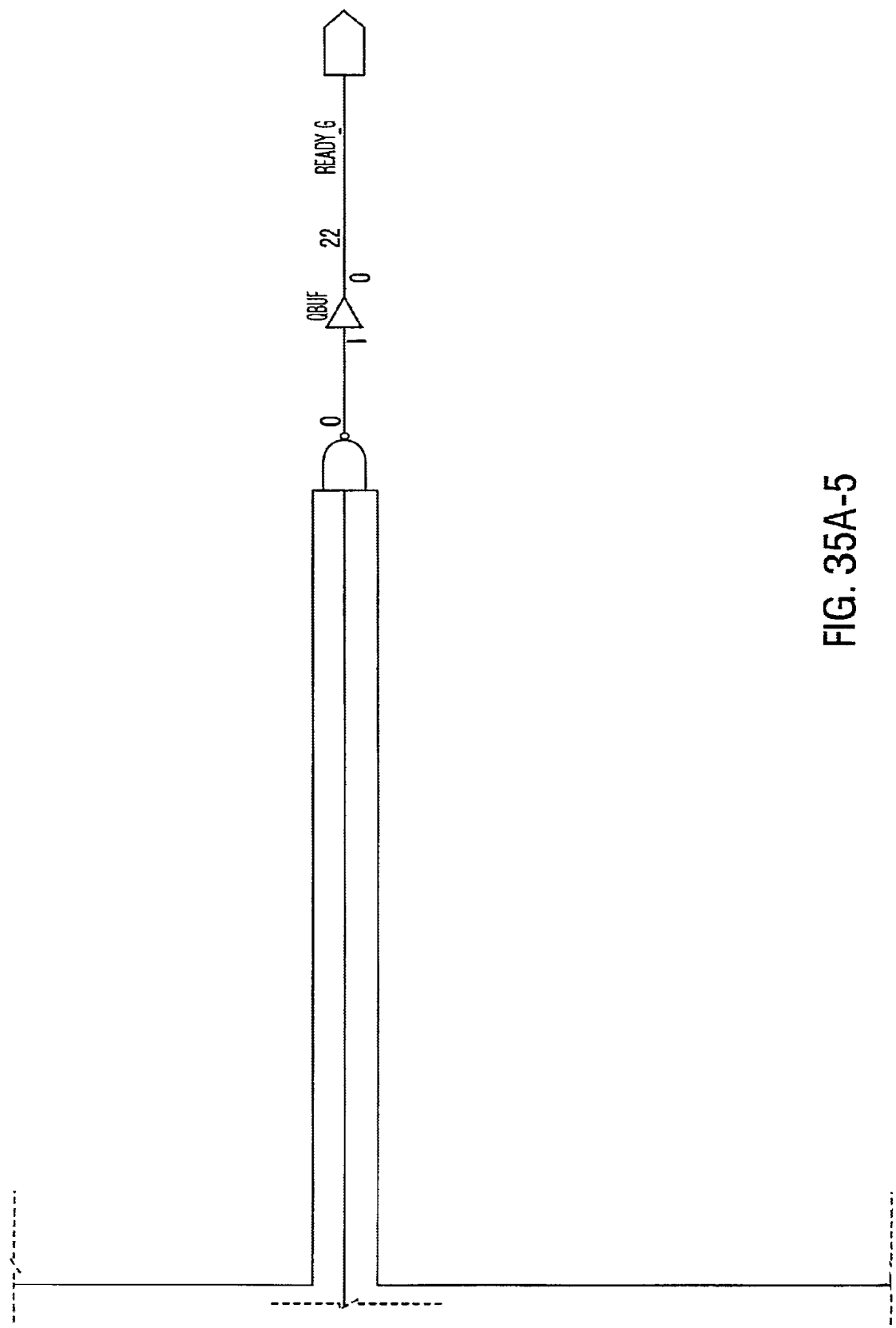
Figures 6, 35A:
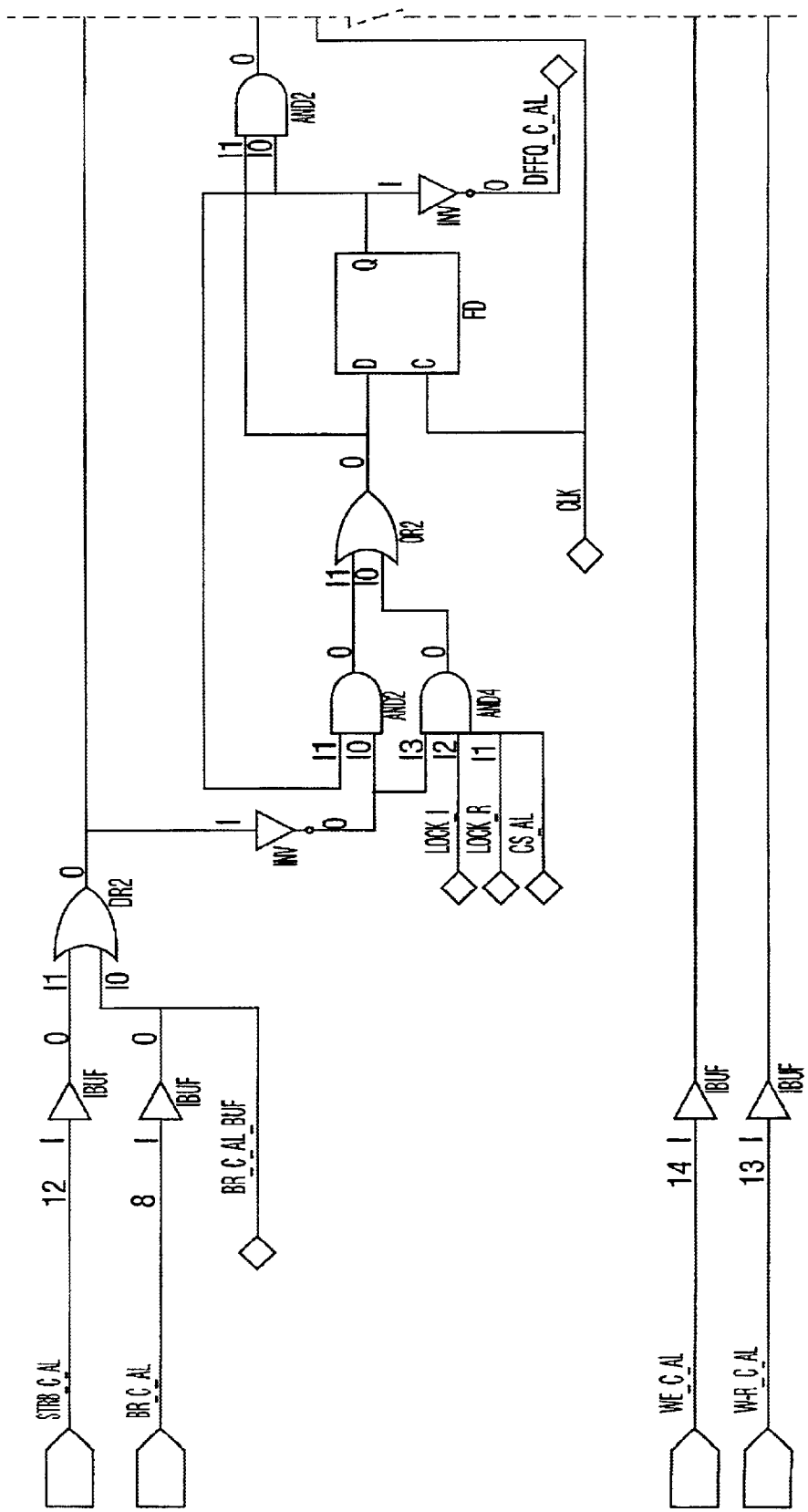
Figures 7, 35A:
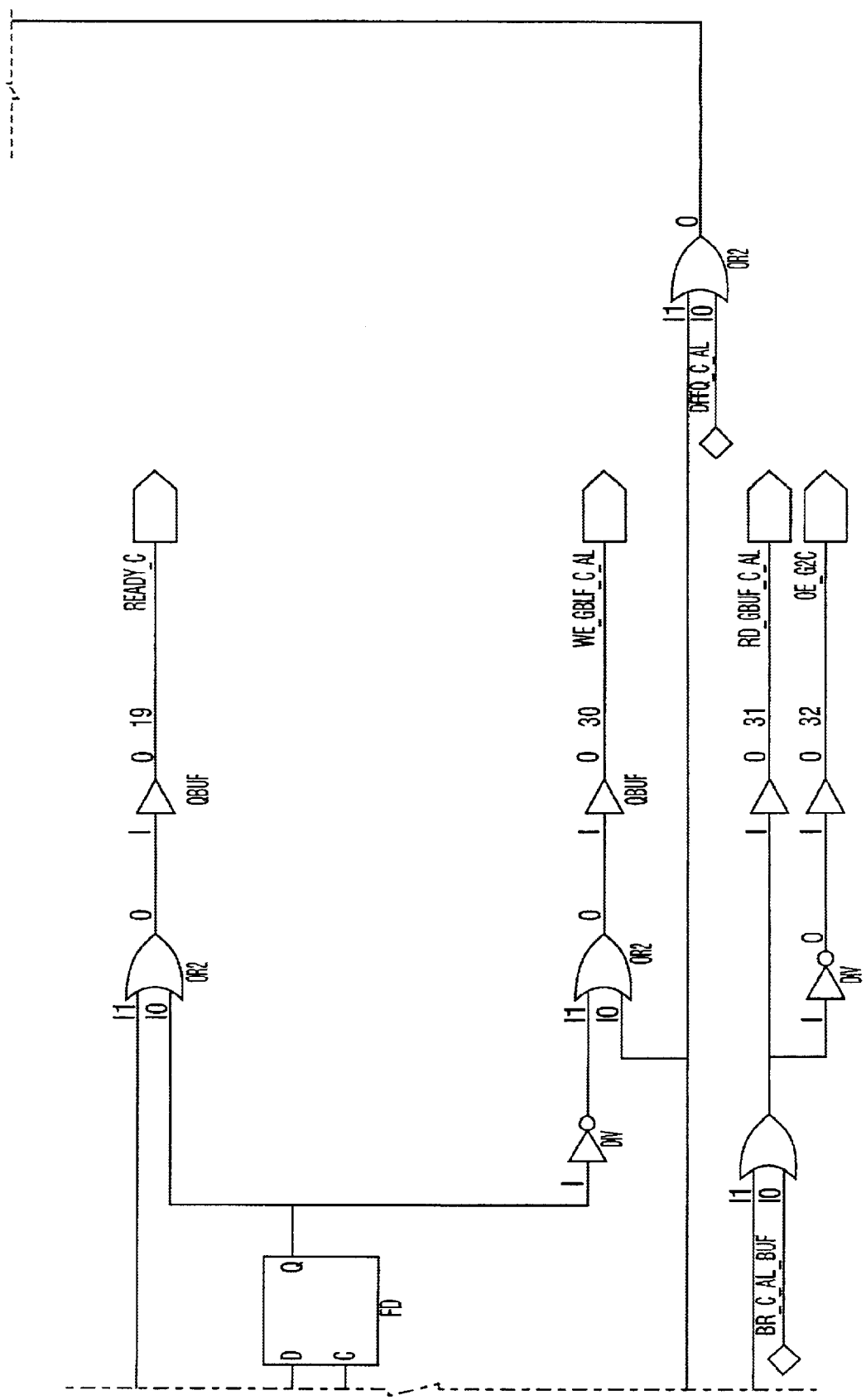
Figure 35B:
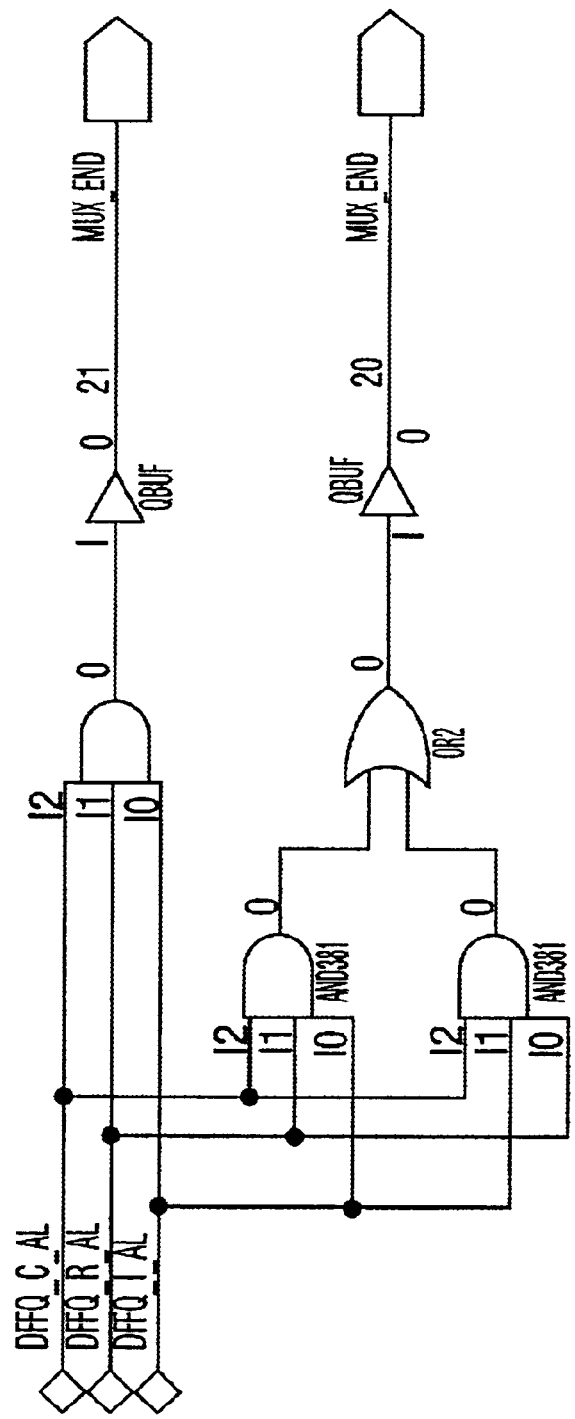
Figure 36:
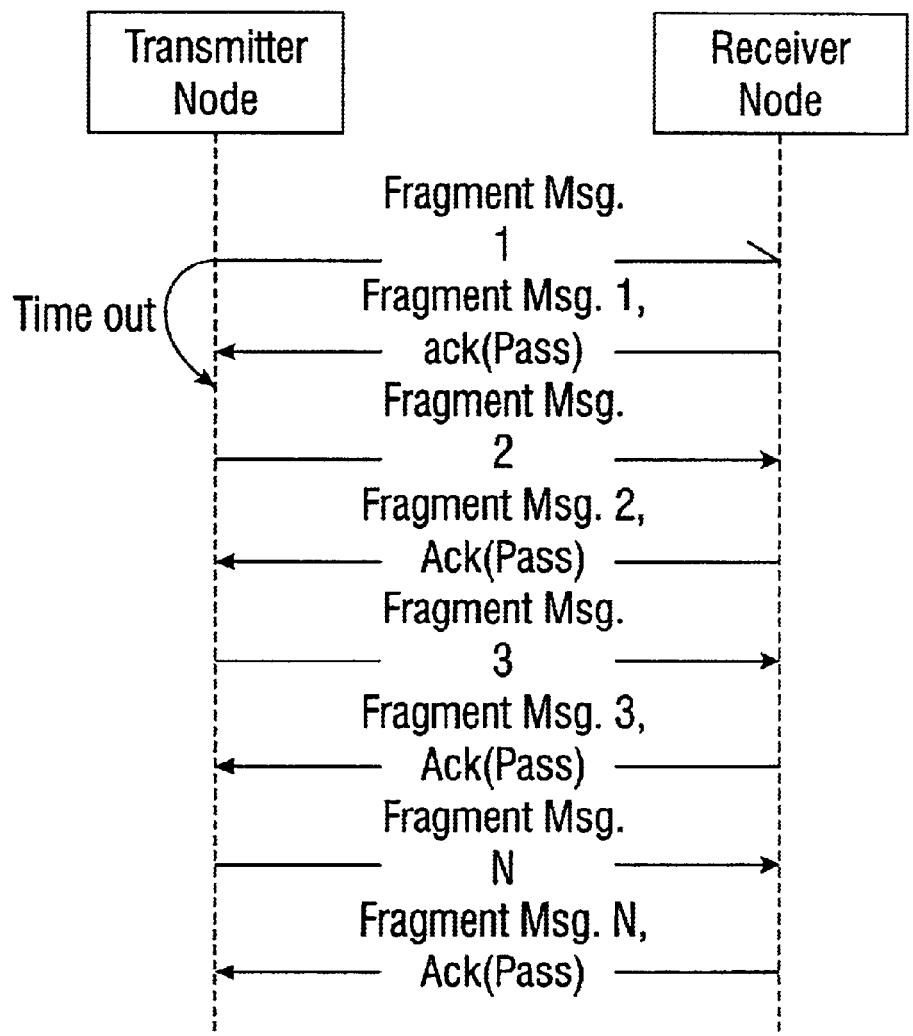
FIG. 36 is a communication diagram for a successful fragmented message transmission.
Figure 37:
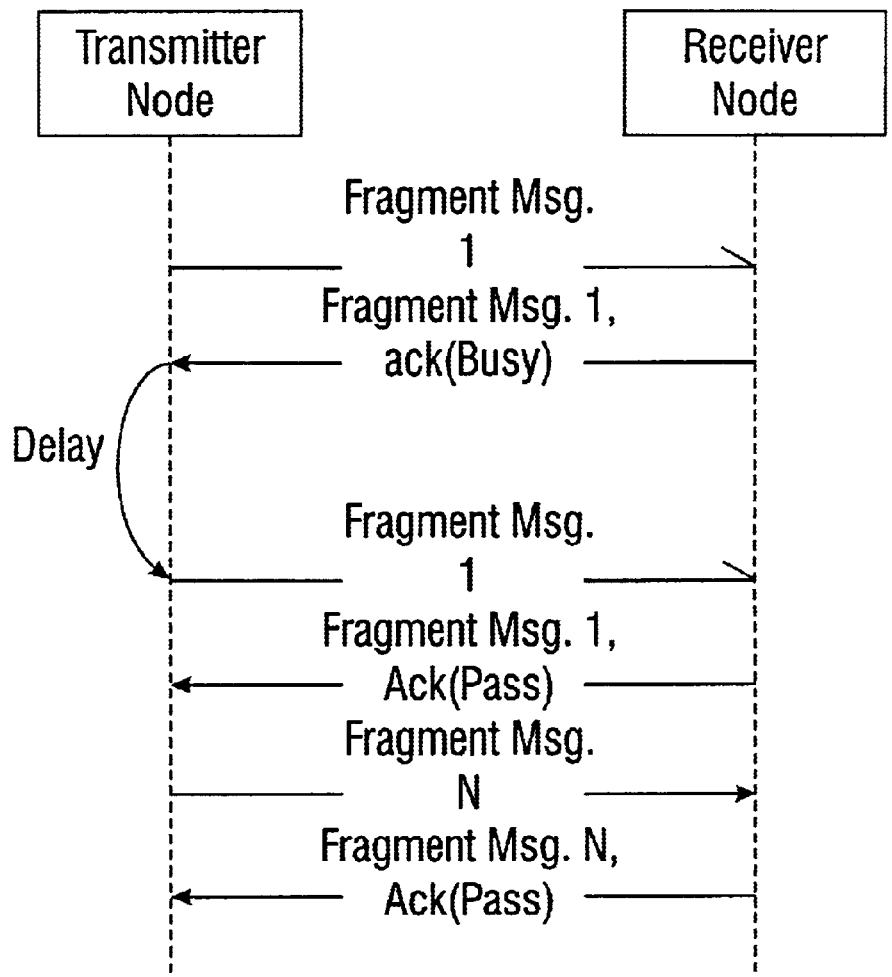
FIG. 37 is a communication diagram for the receipt of a fragmented message when the receiver is busy.
Figure 38A:
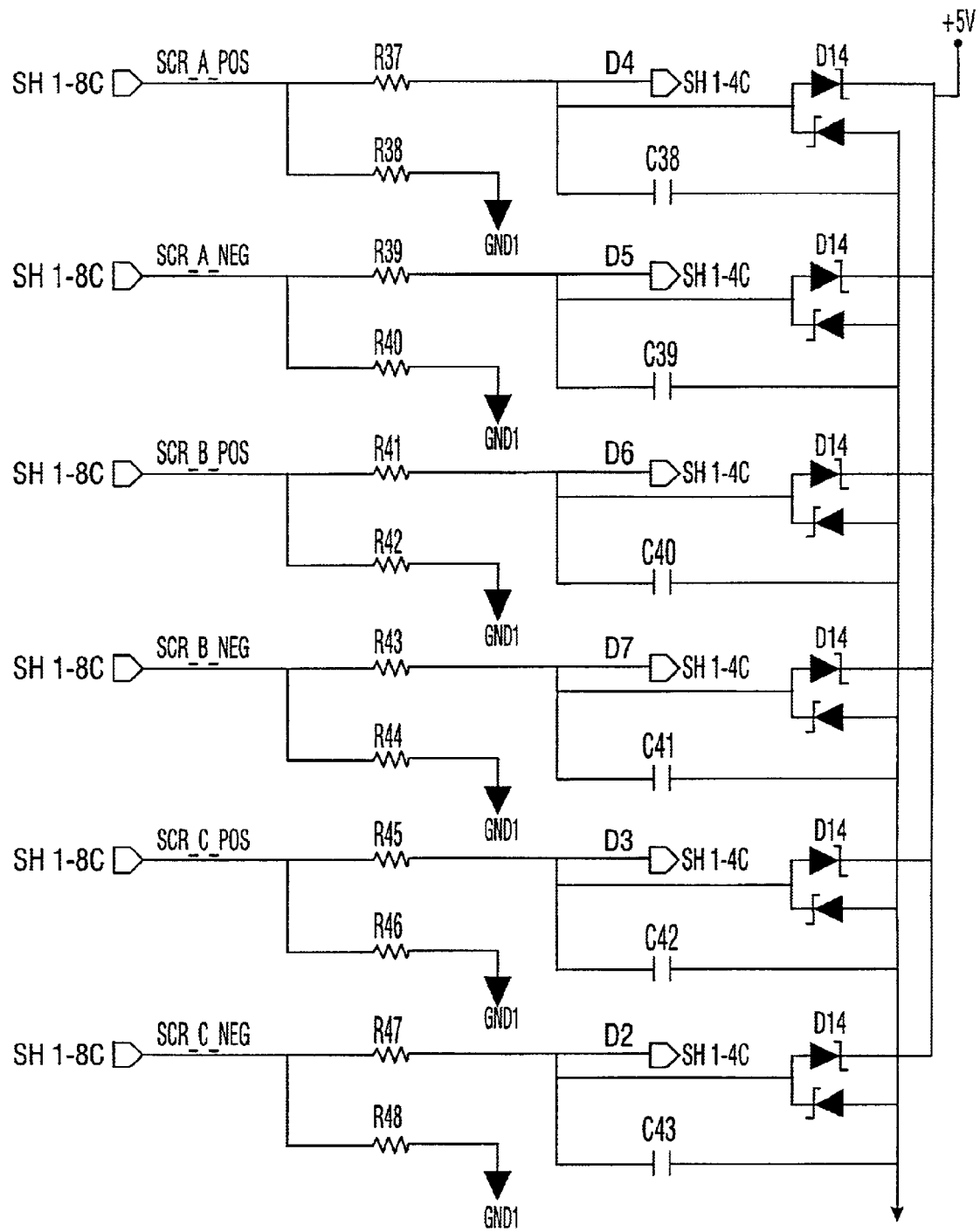
FIG. 38 is a schematic diagram of the rectifier firing pulse generation/control circuit.
Figure 38B:
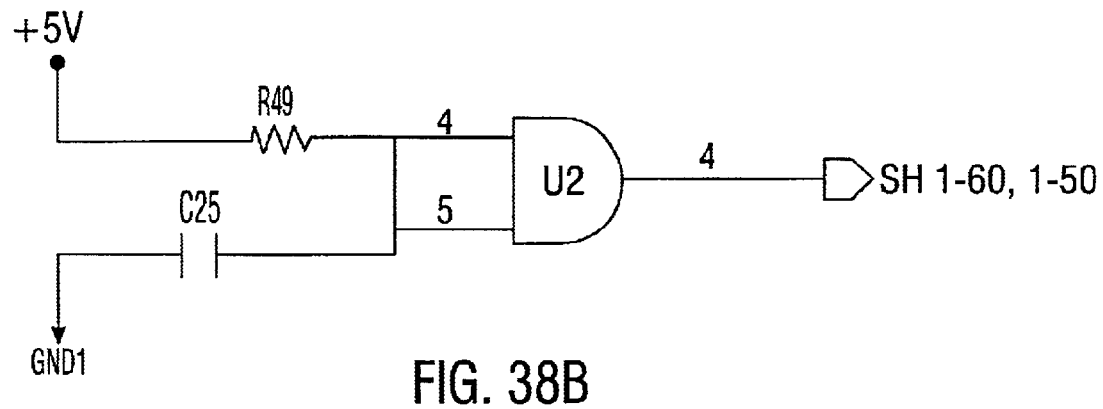
Figure 38C:
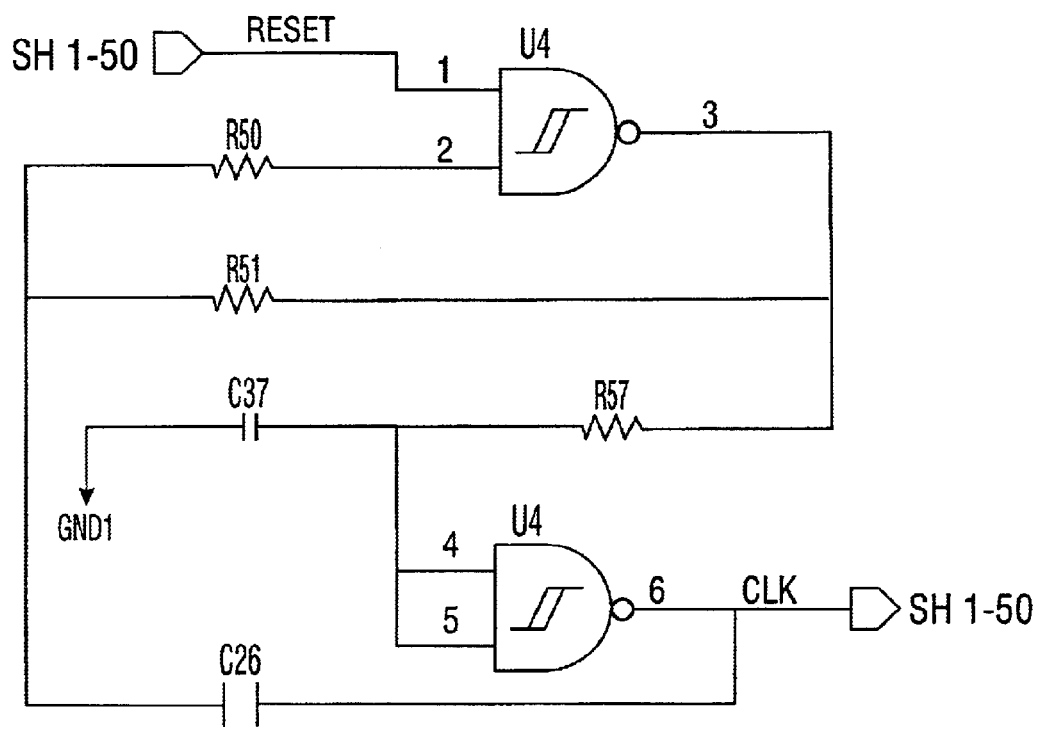
Figure 38E:
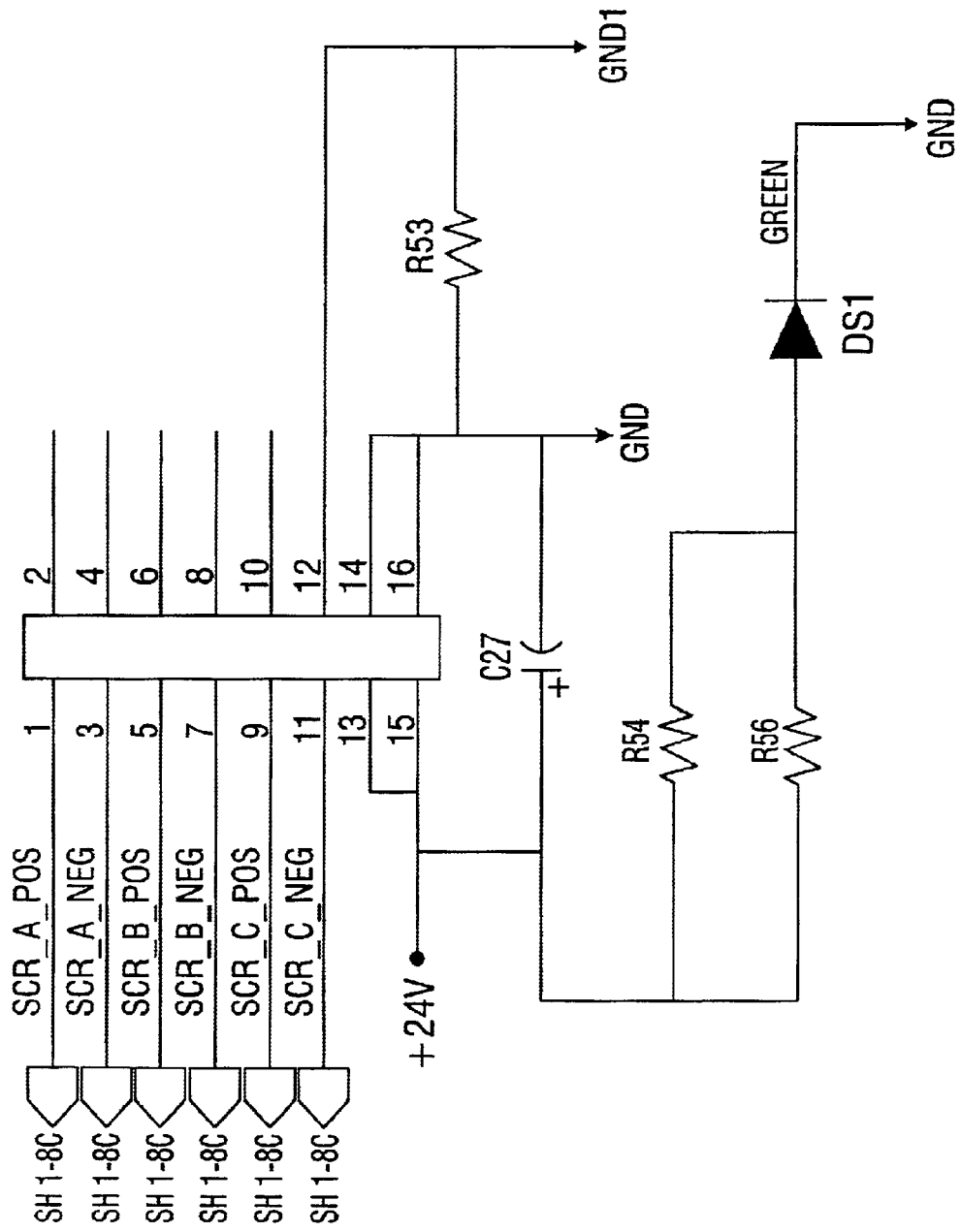
Figure 38F:
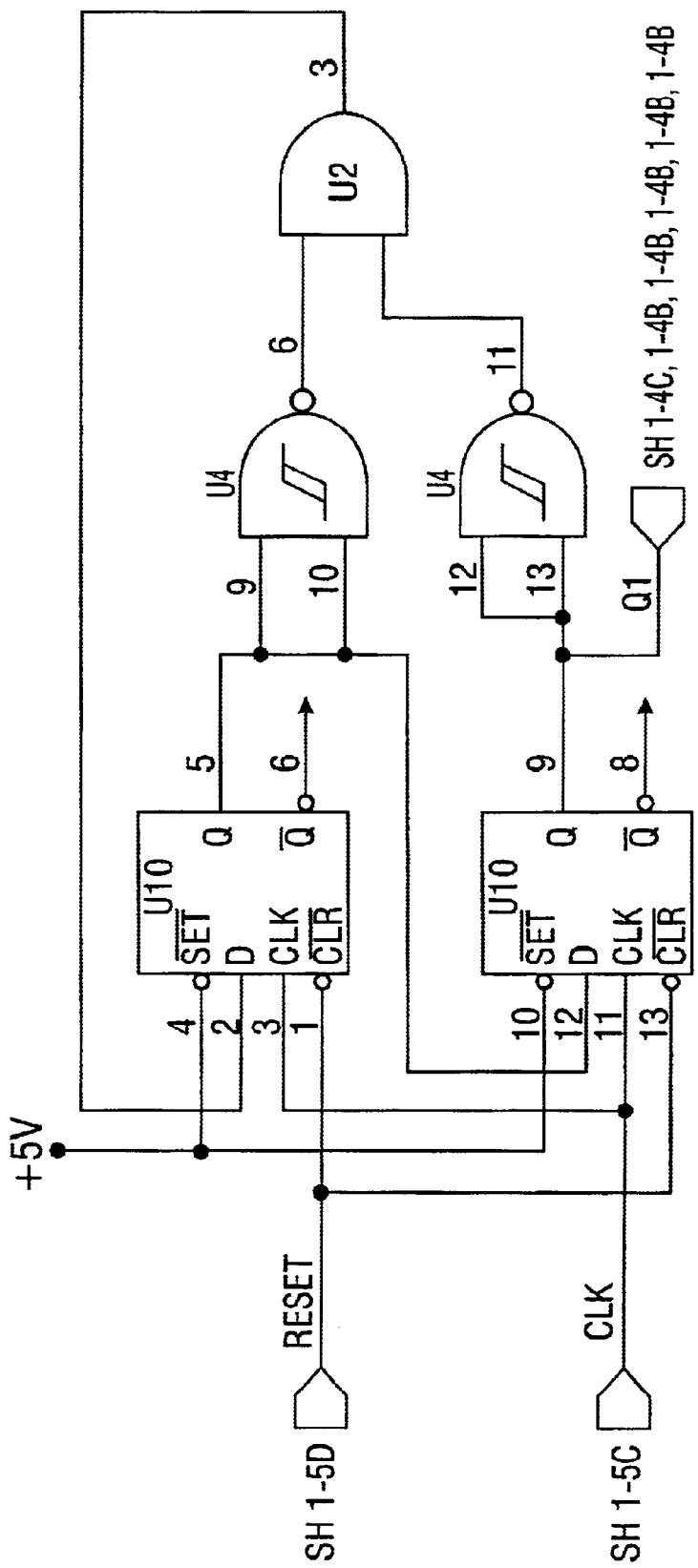
Figure 38G:
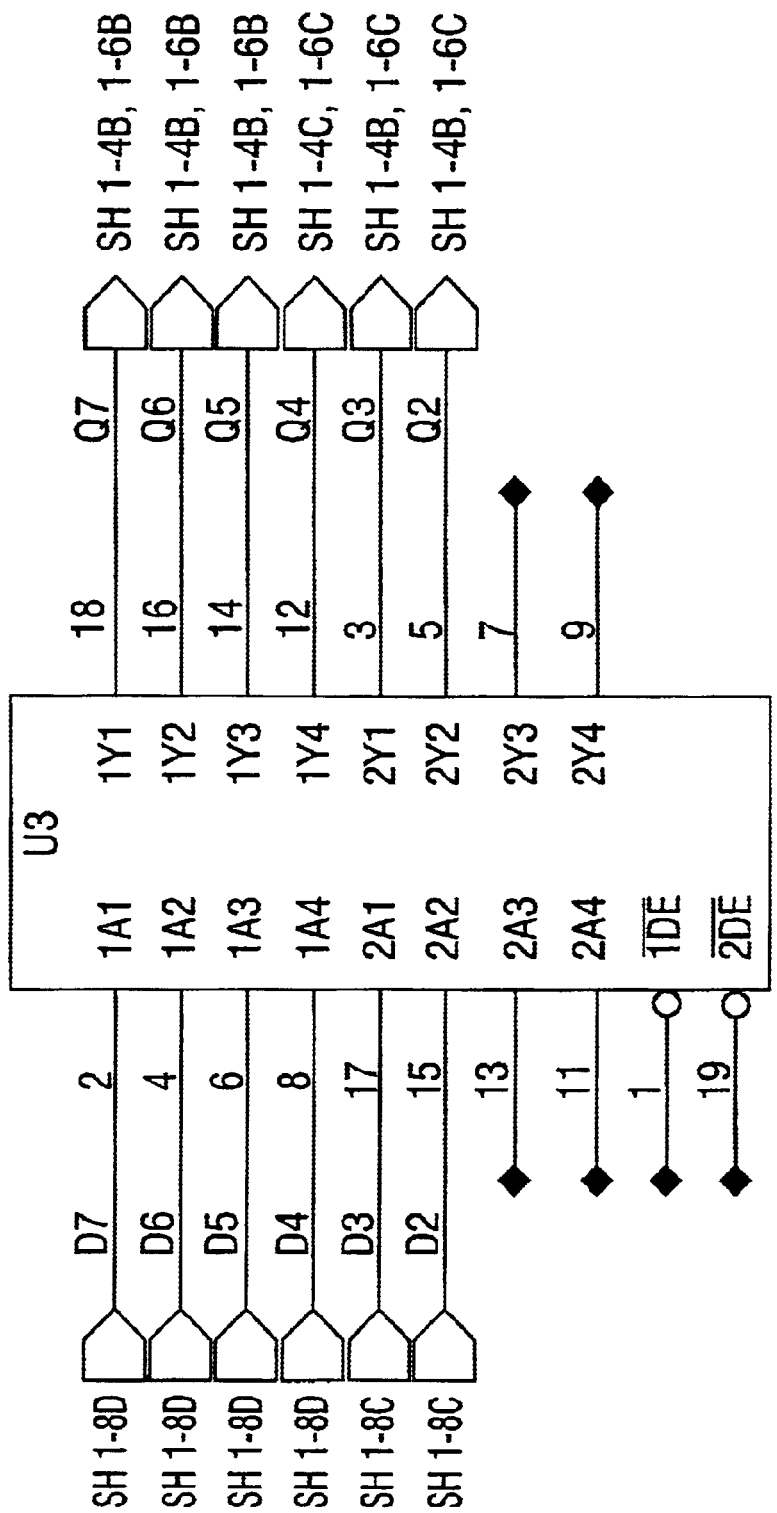
Figure 38H:
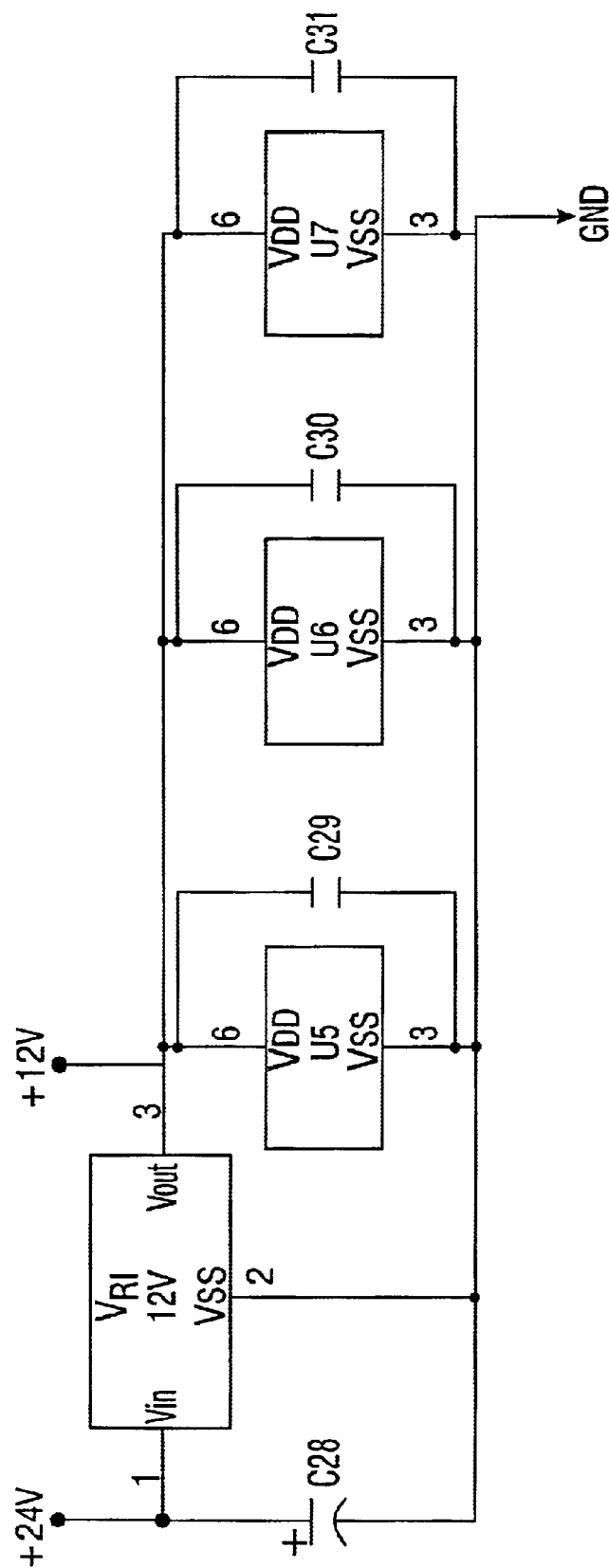
Figures 1, 38I:
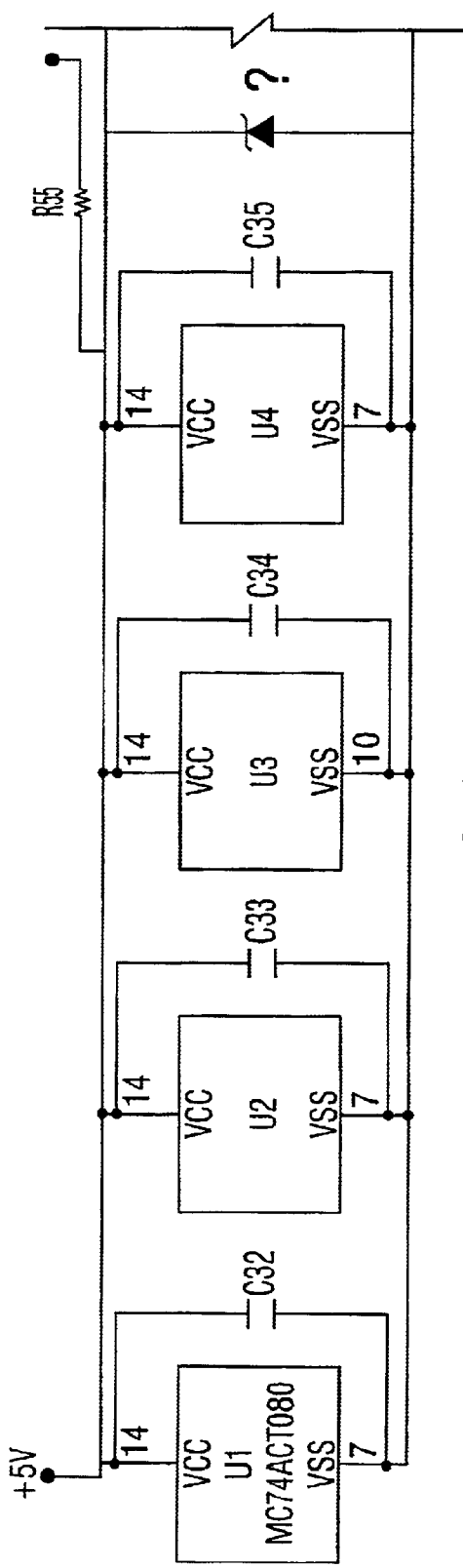
Figures 2, 38I:
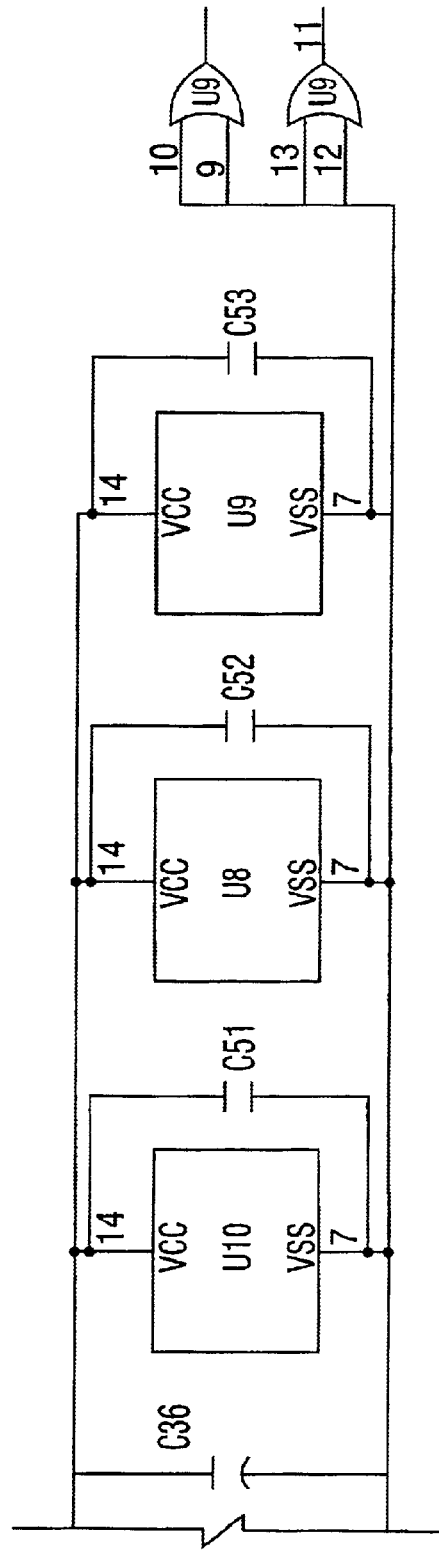
Figure 38J:
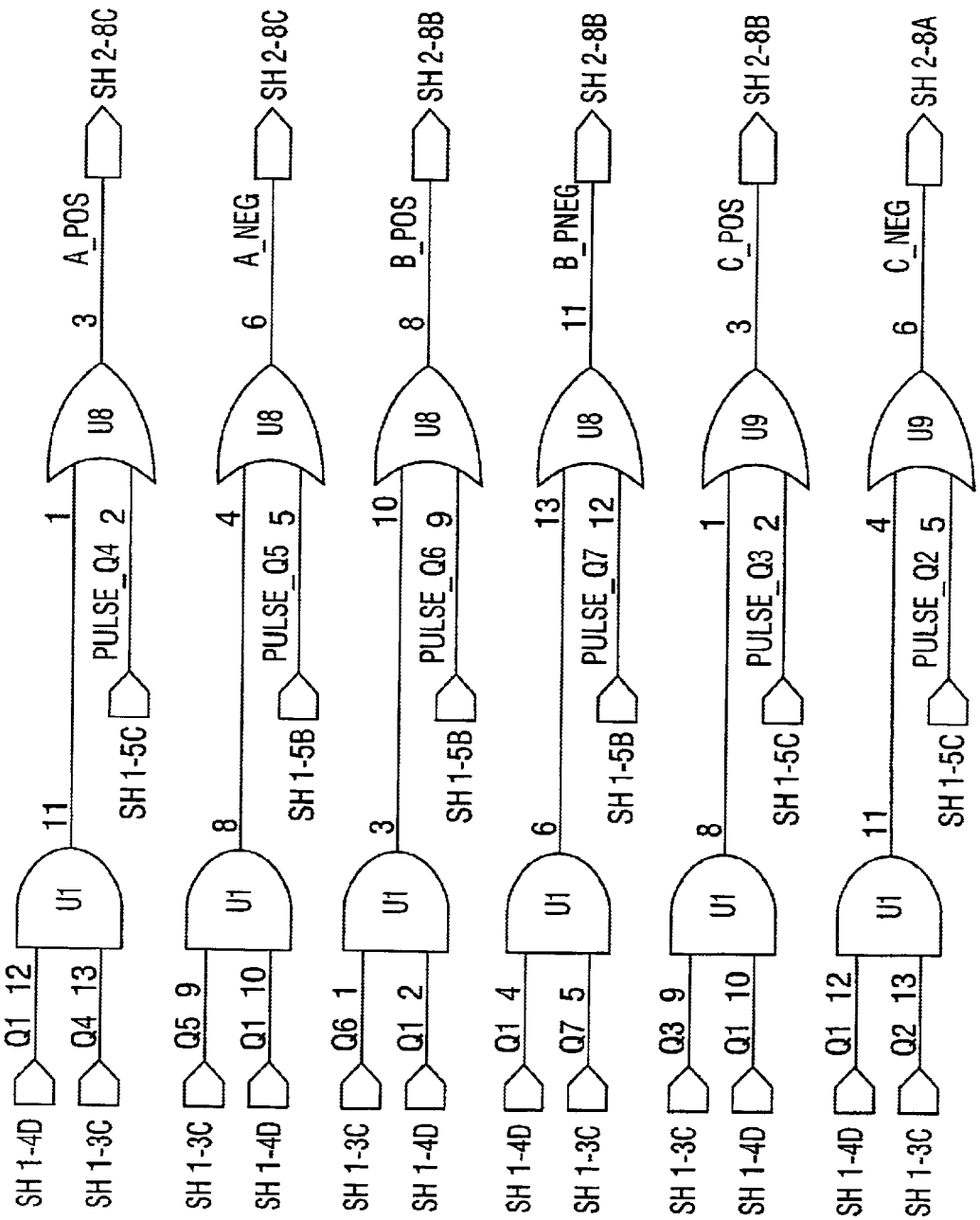

Using (41), during the current limit saturation, the servo compensator states will continue to oscillate at the harmonic frequency with constant magnitude. The resulting discrete servomechanism controller structure is shown in FIG. 32 and FIG. 33

C. PLL Features

The third group of Inverter DSP control functions relates to bypass static switch control, PLL control, and detecting abnormal operations. This group of functions monitors system measurements, both digital and analog, and makes decisions as to whether or not the inverter can safely support the load or is supporting the load adequately. If, for some reason, the inverter cannot or is not supporting the load, these functions notify the inverter DSP system of the problem.

The inverter DSP has 2 PLLs, one that locks to the bypass voltage and another that synchronizes the inverter voltage to the bypass voltage. The PLL that tracks the bypass voltage is the same PLL that uses DQ transformation as described above. The second PLL operates differently because the inverter's output frequency is not allowed to change rapidly. The seconds PLL's operation is described below.

The rate of change of frequency is referred to as a slew rate. This slew rate is limited by the inverter DSP because some loads are sensitive to frequency variations. This limit can pose a problem when trying to phase lock to an external source (like the bypass source). The basic PLL algorithm operates by determining the difference between the bypass phase angle and the inverter phase angle. If the difference is positive then the inverter frequency is increased so that the inverter phase angle catches up to the bypass phase angle. If the phase angle difference is negative, then the inverter frequency is decreased so that the bypass phase catches up to the inverter phase.

When the frequency slew rate is limited, the bypass phase angle will repeatedly pass the inverter phase angle. This happens because half the time the phase difference is positive and the other half of the time the phase difference is negative and so the inverter increases the frequency half the time and then decreases the frequency half the time thus it never catches up to the external source.

In the UPS of the present invention, this basic algorithm is modified such that the frequency difference is minimized first, then the phase difference is minimized. The modified algorithm works as follows. If the frequency difference between the bypass and inverter is positive, then the inverter frequency is increased but not by an amount greater than the maximum slew rate. When the absolute value of the frequency difference is within some predetermined range, the inverter's frequency is held constant. The absolute value of phase angle difference is then tracked and when it is within some predetermined range, the inverter frequency is again increased (or decreased as appropriate) to further reduce the frequency difference. When the absolute value of the frequency difference is within a second predetermined range, it is again held constant and the phase angle difference is allowed to decrease until the phase angle difference is within some second predetermined range. This process continues until both the frequency difference and phase angle difference is within some arbitrarily small range at which time the inverter's frequency and phase angle is set equal to the bypass's frequency and phase angle.

D. Transfer Features

A fourth group of Inverter DSP control functions are the transfer control functions, which are used when the UPS transfers from the normal inverter power source to the bypass power source or from bypass power to inverter power. Transfers between the power sources can be done manually via the different user interfaces or the UPS control board can automatically perform the transfers. An automatic transfer from the inverter source to the bypass source occurs if the UPS control decides that the inverter cannot continue to support the load. An automatic transfer from bypass source to inverter source occurs when the inverter DSP detects that all systems are functioning correctly and the load was previously automatically transferred to the bypass.

During a transfer from bypass power to inverter power, the outer voltage control loop regulates the inverter voltage (the voltage at the primary side of output transformer). The outer voltage control loop matches the bypass phase using information from the PLL. It matches the bypass magnitude, provided that the bypass is qualified. First, the output contactor is closed, putting the inverter and bypass in parallel. Next the inverter angle is adjusted so that it is leading with respect to the bypass. This causes the inverter to acquire the output load from the bypass. When the inverter has acquired the load, for example, it has 93% of the load, the bypass is turned off. A one-line cycle delay is initiated to allow the bypass to fully commutate off. After this delay, the outer voltage control loop switches to regulating the output voltage (the voltage at the secondary side of the output transformer). If the bypass is not qualified or the inverter and bypass are not properly synchronized, then the transfer to inverter does not occur.

There are two situations in which the inverter will transfer from inverter power to bypass power, normal transfer, also called manual transfer, and emergency transfer, also called automatic transfer, as mentioned above. An emergency transfer occurs when a fault is detected by the inverter DSP. If the bypass is qualified and the inverter and bypass are properly synchronized, then the bypass is turned on immediately. Next, the inverter is turned off, and finally the output contactor is opened. If the bypass and inverter are not synchronized, then the bypass is not turned on until the output contactor is opened. The unsynchronized transfer is called an interrupted transfer because the output load will be dropped momentarily (100 milliseconds or more) before the bypass re-energized the output. If the bypass is not qualified, then the inverter simply turns off and opens the output contactor, dropping the load.

For a normal transfer to bypass, the inverter first switches from controlling the output voltage to controlling the inverter voltage. The inverter voltage is matched to the bypass voltage phase and magnitude. A 5-cycle delay allows the control to switch into this mode. After the delay, the bypass is turned on and the output contactor is opened. The inverter keeps running, but the load has been transferred to the bypass seamlessly. Again, if the inverter and bypass are not synchronized, the output contactor will open before the bypass is energized (an interrupted transfer). Likewise if the bypass is not qualified, then the output load will be dropped.

The bypass source can also be paralleled with the inverter source in the event of a large transient overload at the output. This mode is called Pulse Parallel. In this mode, when the inverter DSP detects a large overload situation (like 250% or more), the control will turn-on the bypass switch, provided the bypass source is qualified and properly synchronized with the inverter. The inverter switches from controlling the output voltage to controlling the inverter voltage, but the output contactor stays closed, thus both sources are supporting the load. The inverter's current limit is reduced to protect it from the large overload. After a number of line-cycles (about 10), the bypass switch will be turned off if the overload has cleared. The inverter will switch to controlling the output voltage after a 1 line-cycle delay. If the overload remains, then the output contactor will be opened thus isolating the inverter from the overload. Pulse Parallel mode allows for the UPS to safely handle large overloads that only last for a short period of time. Loads that have such characteristic are motors starting, transformers energizing and energizing high crest factor loads.

E. Parallel Operation

The fifth group of control functions implemented by the Inverter DSP relates to controlling multiple UPS units in parallel. Parallel operation of multiple UPS units may be done for additional capacity or redundancy. To allow parallel operation, the Inverter DSP performs PLL sharing, load sharing, inverter synchronization, and load bus synchronization among the parallel-connected units. Digital load sharing control requires adaptive tuning to eliminate power mismatches among the parallel-connected units. The Inverter DSP can control parallel-connected units in 1+N mode, central mode, or load bus sync mode. Current imbalance between the paralleled units is eliminated by relative phase adjustment of the voltage supplied by each unit. The voltage supplied by each unit is adjusted to produce equal current sharing among the parallel connected units. A phase angle adjustment of the fundamental voltage reference shifts the real power supplied at a fundamental frequency, while an amplitude adjustment changes the fundamental frequency reactive power balance.

In addition to this, the present invention includes a method of enforcing harmonic current sharing for those harmonics included in the harmonic servomechanism voltage control. This is achieved by shifting the locations of the harmonic servo compensator poles based on the level of the harmonic distortion of the load currents at the corresponding harmonic frequencies. The poles are moved such that the gain and bandwidth of the control affecting each harmonic is reduced in the presence of the corresponding harmonic in the load current. This effectively builds in an output impedance for that harmonic component of the load currents, which encourages the separate modules to share the current harmonics.

The principle of gain (and bandwidth) reduction of the voltage loop in the presence of distortion components for harmonic sharing is commonly known as harmonic drooping. The harmonic drooping method of the present invention has an advantage over the prior art in that because the droop only affects the control gain (bandwidth) of each individual harmonic in the harmonic servo compensator, without affecting the fundamental one. Prior art controllers perform harmonic drooping by reducing the overall gain of the voltage loop based on the total harmonic distortion of the load current, which is undesirable because this will degrade the regulation and transient performance of the fundamental component of the output voltage control. This fact presents yet another advantage of using the harmonic servomechanism controller as the outer voltage loop in the present invention.

F. Adaptive Overload Compensation

Digital control of the inverter allows adaptive overload compensation. In general the overload control logic operates as follows. While running on inverter power in an overload situation, a timer is started and set to time out when the thermal capacity of the inverter or magnetic components is reached. The thermal capacity of the UPS is determined empirically, and a sample overload curve is illustrated in FIG. 23.

Figure 23:
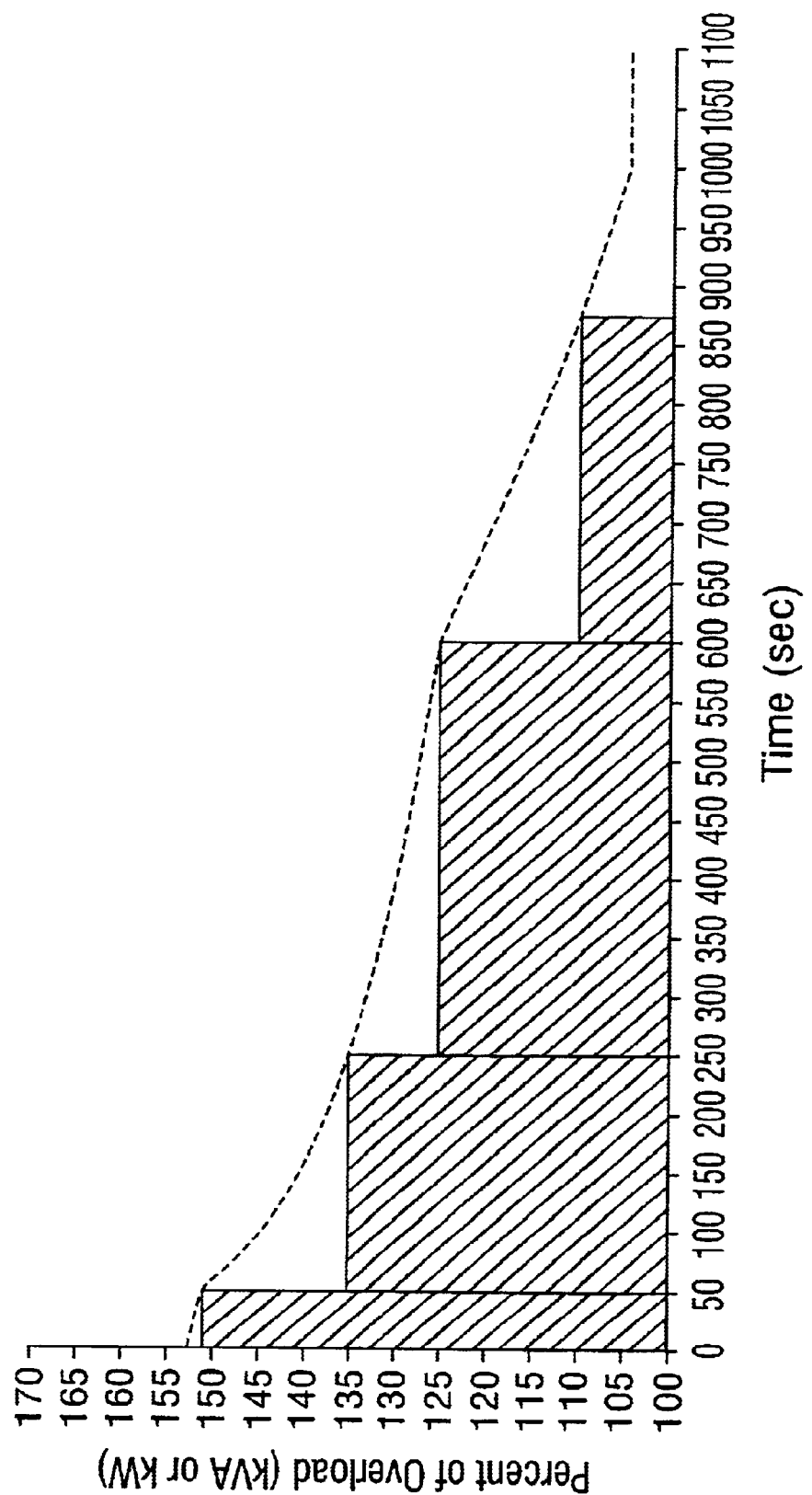
FIG. 23 is a sample overload curve for an uninterruptible power supply.

Turning to FIG. 23, the overload rating of a typical UPS is illustrated. The time in an overload condition is plotted along the horizontal axis. The percentage of UPS capacity is plotted along the vertical axis. The blocked in areas illustrate the observed data, and the dashed line illustrates an approximation curve programmed into the UPS controller. For example, the UPS can maintain a 150% load for approximately 60 seconds, but can maintain a 125% load for approximately 600 seconds.

Figure 24:
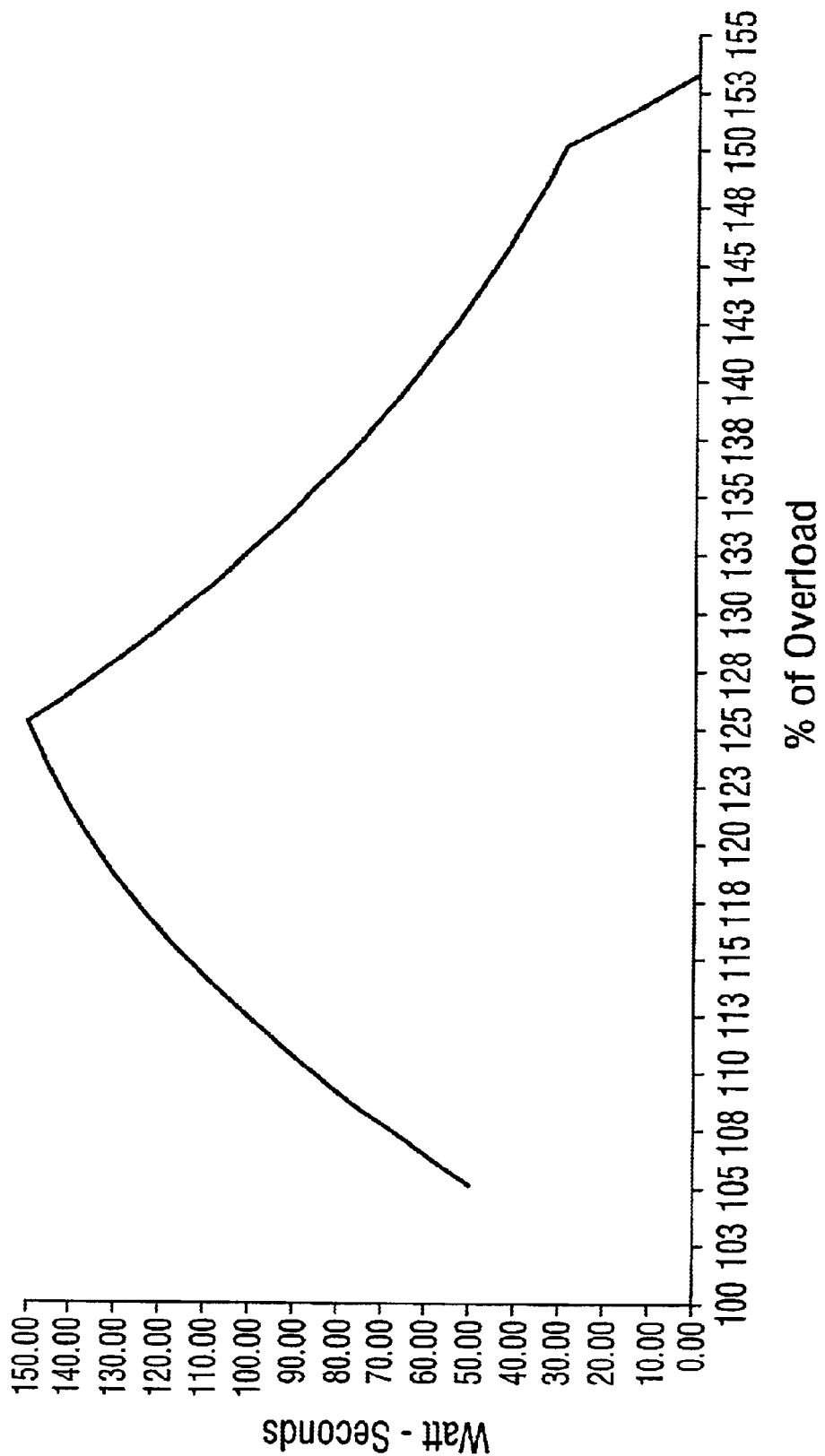
FIG. 24 is an equivalent energy curve corresponding to the overload curve illustrated in FIG. 23.

From the overload curve an equivalent energy curve may be derived, which represents the total amount of energy that is absorbed by the UPS heat sinks during an overload. This energy must be dissipated after the overload condition is removed before the inverter can support the load again. The time period from the end of the overload until the load can safely be returned to the inverter is defined as the unwind time. A sample equivalent energy curve derived from the overload curve in FIG. 23 is illustrated in FIG. 24.

The digital control of the UPS allows a variable unwind rate. For low total energy overloads, the UPS can unwind very quickly. The peak energy for this sample overload curve, Fit. 23, occurs at 125% as shown in FIG. 24. Note that less total energy is absorbed by overloads either greater than 125% or less than 125%. This adaptive determination of the required unwind time allows the UPS to return to inverter operation as quickly as possible, while still protecting the UPS components from thermal damage.

The adaptive unwind operation is as follows. When the overload begins, a timer is started which times out at the thermal capacity of the unit for the given load condition, see FIG. 23, for example. The UPS measures the energy into the heat sink indirectly by measuring the UPS kVA, power (kW) and current, as well as the time that the load is applied. The controller uses continuous measurements of the kVA, power, and current to determine an average overload. The UPS controller correlates these measurements to the empirical values discussed above. There is no need to measure the actual heat sink temperature. When the thermal capacity is exceeded, the UPS switches to bypass operation and computes the required unwind time. An unwind timer starts counting down, and when it reaches zero, the load can be safely supported by the inverter again.

The adaptive overload system can also compensate for intermittent non-continuous overloads. When the unit is overloaded, the unit operates as described above. If the overload condition corrects itself and the load returns to normal, the controller begins the unwind countdown. If another overload condition occurs before the unwind cycle is completed the new overload energy is added to the remaining overload energy that has not yet dissipated. This cycle may repeat several times, but each time the energy absorbed by the heat sink is tracked, and if it exceeds the limit, the load will be transferred to the bypass, hence this algorithm provides better overload protection for the UPS. This overload algorithm is also applied to the bypass source, but with a different overload curve.

G. Transistor Saturation Detection

Another novel aspect of the UPS of the present invention is the circuitry and technique for detection of current saturation of the inverter transistors. Transistor current saturation is undesirable in that it will cause catastrophic failure of the transistors as well as a short circuit of the DC bus. It is therefore desirable to shut off the transistors if saturation is detected. Prior art saturation detection techniques monitored the voltage between the transistor collector and emitter (for bipolar junction transistors or BJTs) or between the drain and source (for field effect transistors or FETs) to detect transistor saturation. The problem with detecting saturation using the voltage across the transistor is that the on-voltage across the transistor is typically very small, and the saturation voltage is very difficult to accurately detect.

Figure 18A:
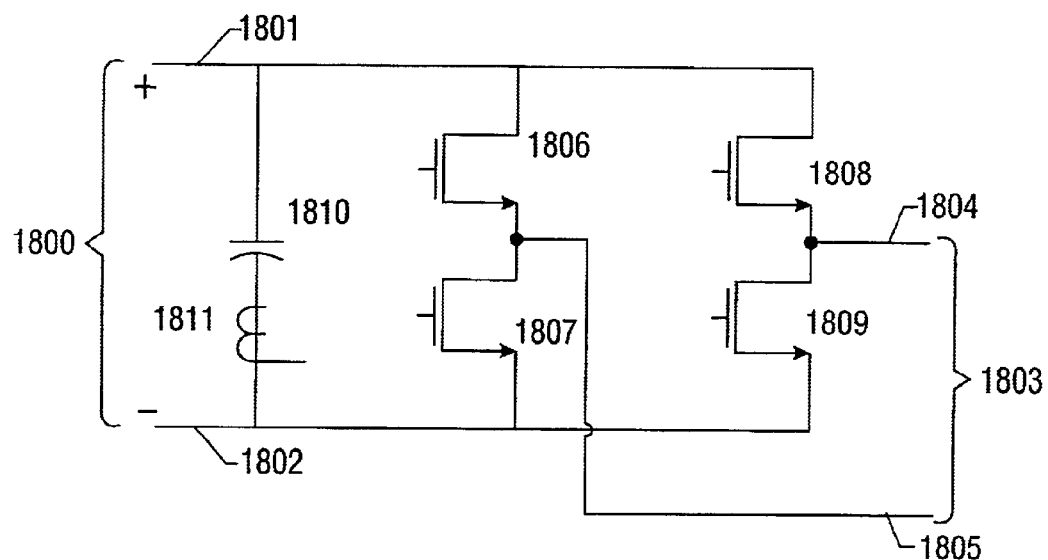
FIGS. 18A–C is a schematic diagram of the transistor saturation detection circuitry disclosed in the disclosed uninterruptible power supply.
Figure 18B:
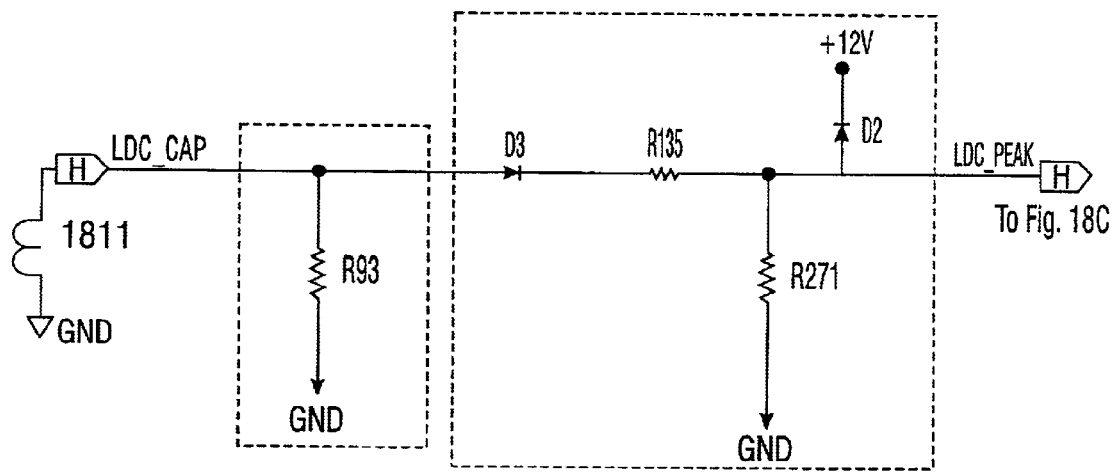

The present invention uses a novel saturation detection technique in which saturation is detected by monitoring the peak current out of the DC bus capacitor. This method is particularly advantageous for use with a UPS controlled by DSPs as opposed to conventional analog control circuits. The transistor saturation detection circuitry may be better understood with reference to FIG. 18. FIG. 18A illustrates a simplified diagram of a single phase inverter. The inverter comprises input DC bus 1800, which further comprises positive DC rail 1801 and negative DC rail 1802. DC bus capacitor 1810 is disposed between the positive and negative DC rails, i.e., across DC bus 1800. The inverter also comprises output AC bus 1803, comprising first and second rails 1804 and 1805, respectively. Finally, the inverter also comprises switching transistors 1806, 1807, 1808, and 1809.

In accordance with the present invention, saturation of the switching transistors is detected by measuring the current through DC bus capacitor 1810. Therefore current transformer ("CT") 1811 is disposed about a lead of said capacitor. CT 1811 is hard wired into the Inverter DSP. If a sufficiently large current is detected flowing through capacitor 1810 by CT 1811, the gate signals to switching transistors 1806, 1807, 1808, and 1809 are all turned off. The direct hardware link to the transistor driver circuits shuts off all transistors by shutting off the gate drive circuits.

Sensing the capacitor current may be used to determine when one or more of the switching transistors have failed, causing a short across the DC bus, or when a misfire of one or more switching transistors causes a short across the DC bus. The voltage generated by CT 1811 passes through peak detection circuit illustrated in FIG. 18B, which generates the signal illustrated. As noted above, the UPS controller will shut off all the transistors if the I_DC_PEAK signal is detected.

Figure 18C:
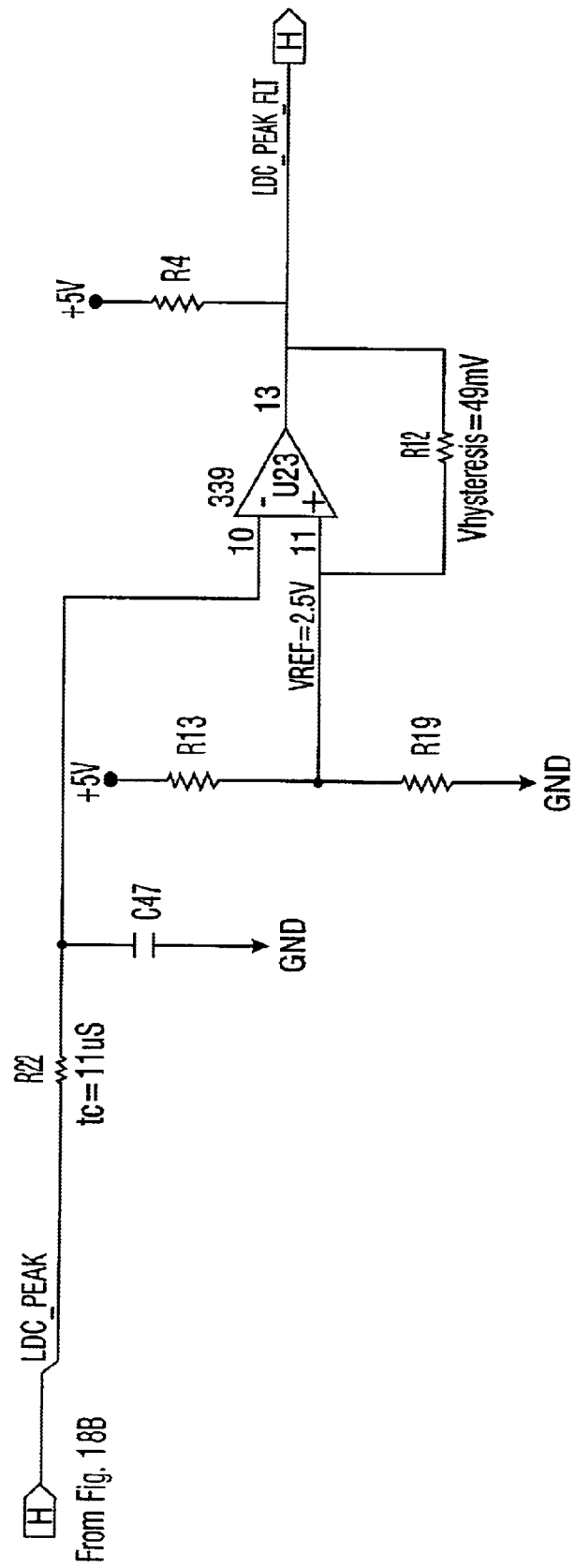

The I_DC_PEAK signal is filtered by the low pass filter circuit illustrated in FIG. 18C. The filtered output signal is identified as I_DC_PEAK_FLT'. The filtered signal is AND'ed with the signal IGBT_CRV_FLT to create the signal IGBT_FLT'. This signal is then input into the Inverter DSP, which turns off the IGBT drive signals via a hardwired circuit internal to the DSP. The I_DC_PEAK_FLT may also be used as a digital input that allows determination what caused an inverter shutdown.

A principal benefit of the transistor saturation detection circuitry is increased reliability at a reduced cost. Prior art saturation detection circuitry is required for every device (transistor). Conversely, the disclosed transistor saturation detection circuitry monitors and protects all devices with a single circuit. Thus, the system of the present invention results in increased reliability at a reduced cost, because of the simplicity of the invention.

H. Miscellaneous

The sixth group of Inverter DSP control functions are for processor input and output control, which includes analog input multiplexer setup, analog to digital converter reading, storing the analog input values in memory, calibrating and scaling the stored values, saving the instantaneous analog input values in the proper memories, storing the computed RMS values in the RMS array, reading the digital input port values, updating the corresponding variables, and writing to the digital output port.

REFERENCES

The following references, to the extent that they provide exemplary procedural or other details supplementary to those set forth herein, are specifically incorporated herein by reference.

Copending non-provisional patent application Ser. No. 09/783,273, entitled "Digital Control of Voltage Harmonic Distortion and Overload Current Protection for Inverters", filed Feb. 13, 2001.

Provisional U.S. Application Ser. No. 60/244,005, entitled "Uninterruptible Power Supply", filed Oct. 27, 2000.

What is claimed is:

1. An uninterruptible power supply comprising:
 a controlled rectifier having an input coupled to receive AC power and an output coupled to a DC bus;
 a battery coupled to the DC bus;
 an inverter having an input coupled to the DC bus and an output coupled to a load; and
 a control system coupled to the controlled rectifier and the inverter the control system comprising three microprocessors, wherein a first microprocessor functions as an overall controller, a second microprocessor controls the rectifier, and a third microprocessor controls the inverter;
 wherein the three microprocessors communicate via a common global memory.

2. The uninterruptible power supply of claim 1 further comprising a memory arbitration circuit including a complex programmable logic device programmed to allow priority-driven, non-preemptive access by the microprocessors to the common global memory.

3. The uninterruptible power supply of claim 1 comprising a plurality of components interconnected by a peer-to-peer controller area network, wherein the network accommodates fragmented messaging.

4. The uninterruptible power supply of claim 1 further comprising a battery current monitoring circuit comprising:
 a current sensor disposed to monitor the battery current;
 a first amplifier circuit receiving an output from the current sensor corresponding to discharging battery current, amplifying it by a first factor, and outputting it to the control system;
 a second amplifier circuit receiving an output from the current sensor corresponding to a charging battery current, amplifying it by a second factor greater than the first factor, and outputting it to the control system;
 wherein the control system selects as its input the output of the first amplifier when the battery is discharging and the output of the second amplifier circuit when the battery is charging.

5. The UPS of claim 1 having a three-phase input and independent zero-crossing detection circuits for each input phase, wherein the second microprocessor independently determines a phase shift introduced by each zero cross detection circuit and adjusts the firing signal timing for each rectifier phase to negate the phase shift.

6. The UPS of claim 5 wherein the second microprocessor is configured to change the firing sequence of the rectifier to compensate for a phase rotation of the three-phase input.

7. The UPS of claim 5 wherein the second microprocessor qualifies the input voltage by measuring the voltage on a first phase of said three-phase input, the frequency on a second phase of said three-phase input, and the phase sequence between either said first phase or said second phase and a third phase of said three-phase input.

8. The UPS of claim 1 wherein the second microprocessor implements a phase lock loop for synchronizing rectifier firing, wherein the phase lock loop includes a finite impulse response filter on the input voltages for removing low frequency harmonics from the input signal.

9. The UPS of claim 1 wherein the third microprocessor implements a nested control loop having an inner loop and outer loop, said inner loop regulating inverter current using a discrete sliding mode controller, and said outer loop regulating the inverter voltage using a harmonic servo-mechanism controller.

10. A method of controlling the output current of a controlled rectifier having its output connected to a DC bus with a battery coupled thereto, the method comprising:

sensing the DC bus voltage;

comparing the sensed voltage to a voltage setpoint;

adjusts the firing signal timing to minimize a difference between the sensed voltage and the voltage setpoint;

determining whether an input current of the rectifier or a charging current of the battery is above a predetermined limit; and switching control to a different control loop to maintain the input current or the charging current within the predetermined limit.

11. The method of claim 10 wherein the step of switching to a different control loop includes setting the value of an integrator element of the different control loop to a predetermined level to prevent a discontinuity in an output of the different control loop.

12. The method of claim 10 wherein the different control loop includes a non-linear element.

13. The method of claim 10, wherein on starting the rectifier, the voltage setpoint is gradually increased from an initial value to a final value.

14. The method of claim 10 wherein the voltage setpoint is selected to cause a desired charging current to flow into said battery.

15. The method of claim 14 wherein the voltage setpoint is selected from one of a higher value to accomplish faster charging or a lower value to accomplish slower charging.

16. The method of claim 14 wherein the voltage setpoint is selected to cause zero charging current to flow into said battery.

17. The method of claim 14 wherein the voltage setpoint is selected as a function of battery temperature.

18. A method of operating a plurality of uninterruptible power supplies in parallel comprising:

adjusting a phase angle of a voltage generated by each uninterruptible power supply to eliminate real power unbalances among the plurality of uninterruptible power supplies;

adjusting a magnitude of a voltage generated by each uninterruptible power supply to eliminate reactive power unbalances among the plurality of uninterruptible power supplies; and shifting a location of a harmonic servo compensator pole to reduce the bandwidth of the controller for each harmonic.

19. An uninterruptible power supply comprising:

a controlled rectifier having an input coupled to receive AC power and an output coupled to a DC bus;

a battery coupled to the DC bus;

an inverter having an input coupled to the DC bus and an output coupled to a load; and a control system coupled to the controlled rectifier and the inverter, the control system comprising three microprocessors, wherein a first microprocessor functions as an overall controller, a second microprocessor controls the rectifier, and a third microprocessor controls the inverter; and a plurality of components interconnected by a peer-to-peer controller area network, wherein the network accommodates fragmented messaging.

20. An uninterruptible power supply comprising:

a controlled rectifier having an input coupled to receive AC power and an output coupled to a DC bus;

a battery coupled to the DC bus;

an inverter having an input coupled to the DC bus and an output coupled to a load; and a control system coupled to the controlled rectifier and the inverter, the control system comprising three microprocessors, wherein a first microprocessor functions as an overall controller, a second microprocessor controls the rectifier, and a third microprocessor controls the inverter;

a three-phase input and independent zero-crossing detection circuits for each input phase wherein the second microprocessor independently determines a phase shift introduced by each zero cross detection circuit and adjusts the firing signal timing for each rectifier phase to negate the phase shift; and wherein the second microprocessor is configured to change the firing sequence of the rectifier to compensate for a phase rotation of the three-phase input.

21. An uninterruptible power supply comprising:

a controlled rectifier having an input coupled to receive AC power and an output coupled to a DC bus;

a battery coupled to the DC bus;

an inverter having an input coupled to the DC bus and an output coupled to a load; and a control system coupled to the controlled rectifier and the inverter, the control system comprising three microprocessors, wherein a first microprocessor functions as an overall controller, a second microprocessor controls the rectifier, and a third microprocessor controls the inverter;

a three-phase input and independent zero-crossing detection circuits for each input phase, wherein the second microprocessor independently determines a phase shift introduced by each zero cross detection circuit and adjusts the firing signal timing for each rectifier phase to negate the phase shift; and wherein the second microprocessor qualifies the input voltage by measuring the voltage on a first phase of said three-phase input, the frequency on a second phase of said three-phase input, and the phase sequence between either said first phase or said second phase and a third phase of said three-phase input.

* * * * *